(12) United States Patent
Rubin et al.

(10) Patent No.: US 12,078,834 B2
(45) Date of Patent: Sep. 3, 2024

(54) SYSTEMS AND METHODS FOR PARALLEL POLARIZATION ANALYSIS

(71) Applicant: PRESIDENT AND FELLOWS OF HARVARD COLLEGE, Cambridge, MA (US)

(72) Inventors: Noah A. Rubin, Cambridge, MA (US); Federico Capasso, Cambridge, MA (US)

(73) Assignee: PRESIDENT AND FELLOWS OF HARVARD COLLEGE, Cambridge, MA (US)

( * ) Notice: Subject to any disclaimer, the term of this patent is extended or adjusted under 35 U.S.C. 154(b) by 281 days.

(21) Appl. No.: 17/603,574

(22) PCT Filed: Apr. 14, 2020

(86) PCT No.: PCT/US2020/028157
§ 371 (c)(1),
(2) Date: Oct. 13, 2021

(87) PCT Pub. No.: WO2020/214615
PCT Pub. Date: Oct. 22, 2020

(65) Prior Publication Data
US 2022/0206205 A1    Jun. 30, 2022

Related U.S. Application Data

(60) Provisional application No. 62/834,343, filed on Apr. 15, 2019.

(51) Int. Cl.
*G01J 4/04*    (2006.01)
*G02B 1/00*    (2006.01)
(Continued)

(52) U.S. Cl.
CPC .............. *G02B 5/3083* (2013.01); *G01J 4/04* (2013.01); *G02B 1/002* (2013.01); *G02B 5/1833* (2013.01); *G02B 27/4261* (2013.01)

(58) Field of Classification Search
CPC ...... G02B 27/4261; G02B 5/1833; G01J 4/04
See application file for complete search history.

(56) References Cited

U.S. PATENT DOCUMENTS

2011/0102877 A1    5/2011    Parriaux
2011/0261441 A1    10/2011   Zheludev et al.
(Continued)

FOREIGN PATENT DOCUMENTS

WO    WO-2016/178740 A2    11/2016
WO    WO-2018/118984 A1    6/2018

OTHER PUBLICATIONS

Pietro Capaldo, "Nano-fabrication and characterization of silicon meta-surfaces provided with Pancharatnam-Berry effect", Mar. 1, 2019 (Year: 2019).*

(Continued)

*Primary Examiner* — Maurice C Smith
(74) *Attorney, Agent, or Firm* — FOLEY & LARDNER LLP

(57) ABSTRACT

An optical component includes a substrate and a metasurface comprising one or more linearly birefringent elements. The linearly birefringent elements define a grating configured to implement parallel polarization analysis for a plurality of polarization orders for incident light of an arbitrary polarization.

15 Claims, 26 Drawing Sheets

(51) Int. Cl.
  *G02B 5/18* (2006.01)
  *G02B 5/30* (2006.01)
  *G02B 27/42* (2006.01)

(56) References Cited

U.S. PATENT DOCUMENTS

2019/0025463 A1  1/2019  She et al.
2019/0079321 A1  3/2019  Wu et al.

OTHER PUBLICATIONS

Arbabi, Ehsan, "Full-Stokes Imaging Polarimetry Using Dielectric Metasurfaces", 2018 (Year: 2018).*
Noah A. Rubin "Polarization state generation and measurement with a single metasurface", Apr. 20, 2018 (Year: 2018).*
Muhammad Aun Abbas Zaidi, "Polarization Control and Measurement with Meta-optics", Massachusetts Institute of Technology Jun. 2019 (Year: 2019).*
Extended Search Report for corresponding EP Patent Application No. 20790964.9, issued on Dec. 2, 2022, 10 pages.
Arbabi, Ehsan et al., "Full Stokes imaging polarimetry using dielectric metasurfaces", whitepaper [online], Mar. 9, 2018, 10 pages, [retrieved Jun. 15, 2020], https://arxiv.org/pdf/1803.03384.pdf.
International Search Report and Written Opinion for International Patent Application No. PCT/US2020/28157, issued Sep. 4, 2020, 10 pages.
Mueller, J.P. Balthasar et al., "Metasurface Polarization Optics: Independent Phase Control of Arbitrary Orthogonal States Polarization", American Physical Society, PRL 118, 113901 (2017).
Rubin, Noah A. et al., "Polarization state generation and measurement with a single metasurface", Optics Express, vol. 26, No. 17, Aug. 20, 2018.
Office Action with English translation from corresponding Chinese Patent Application No. 202080038933.3, issued Nov. 29, 2023, 21 pages.
Search Report with English translation from corresponding Chinese Patent Application No. 202080038933.3, issued Nov. 29, 2023, 5 pages.
Office Action with English translation from corresponding Chinese Patent Application No. 202080038933.3, issued Jun. 1, 2024, 6 pages.

* cited by examiner

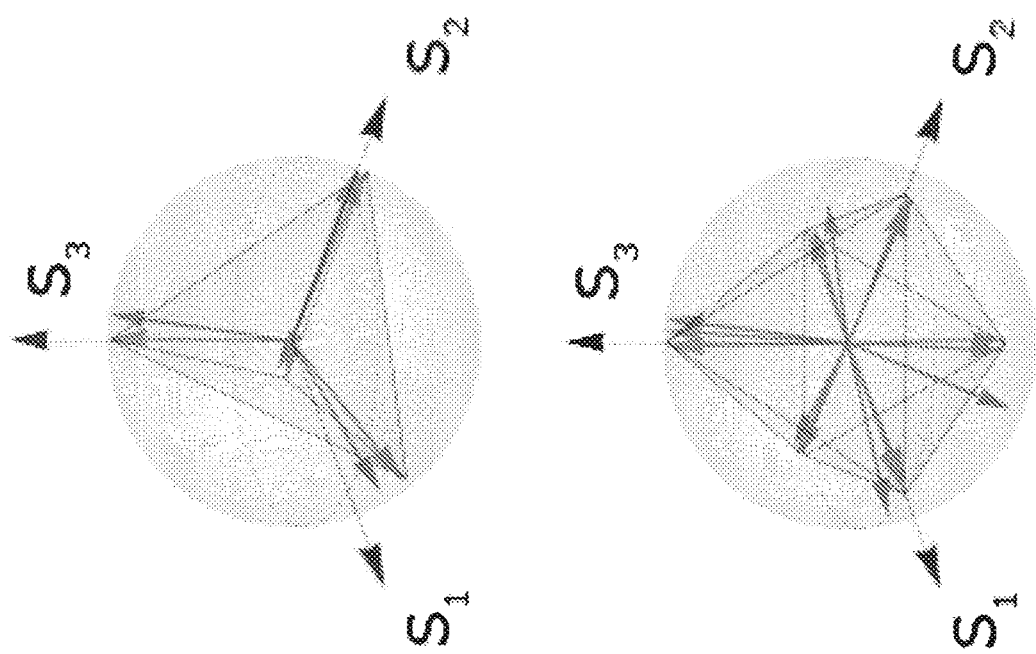

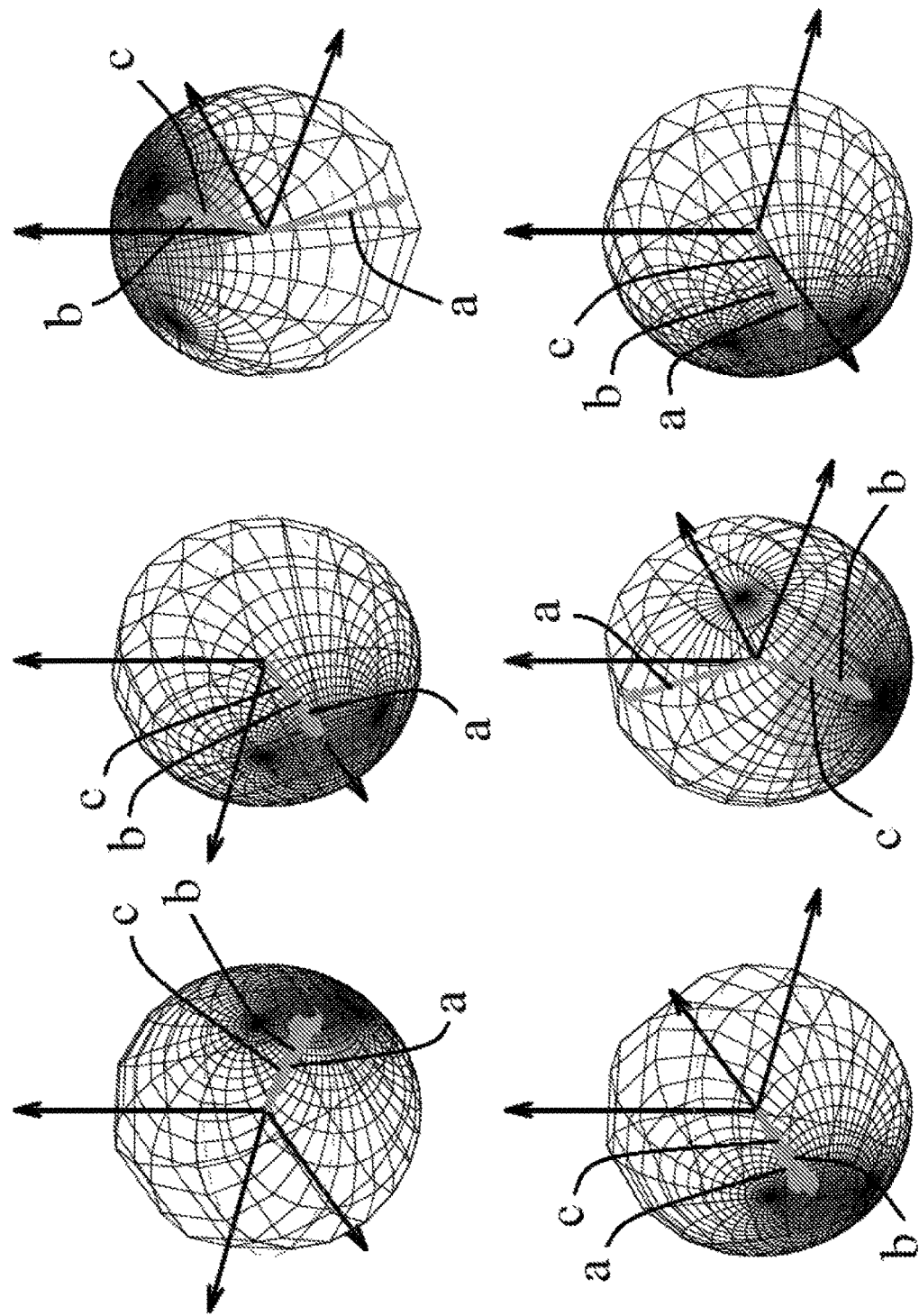

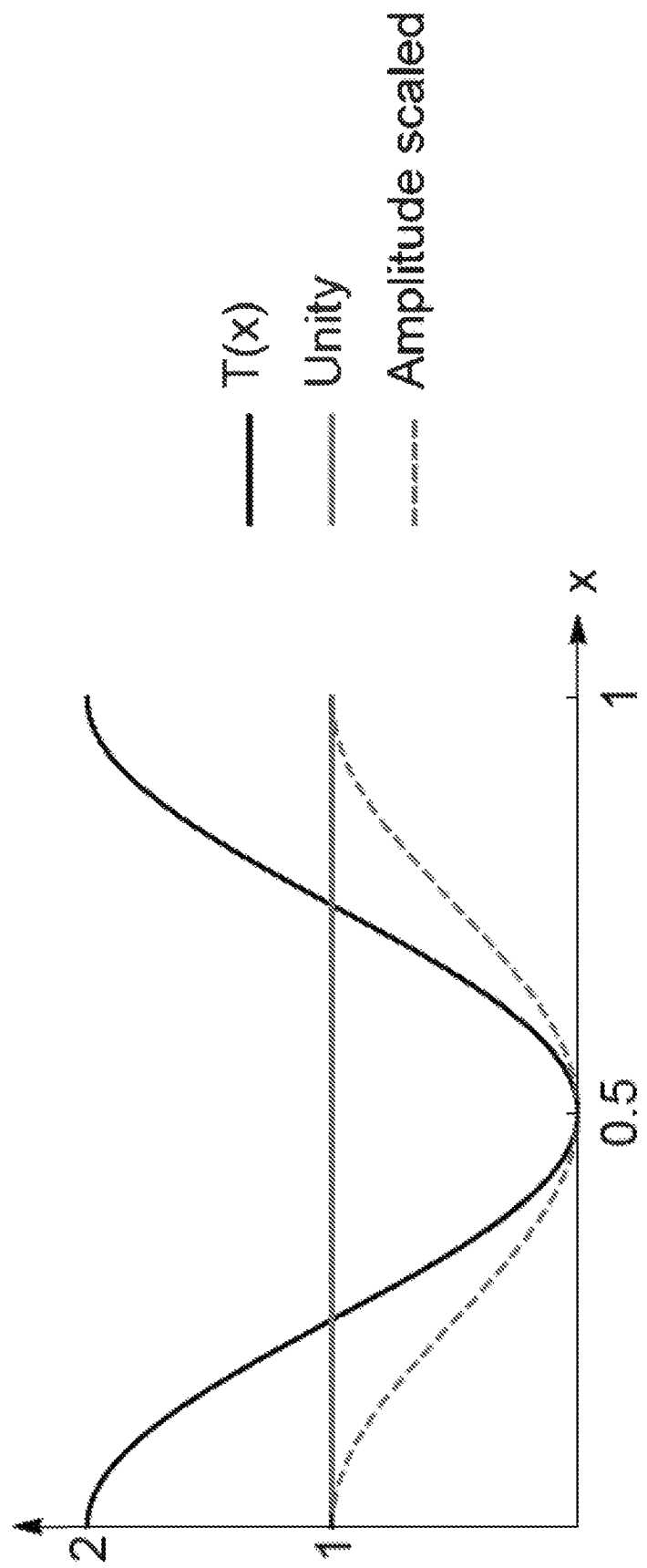

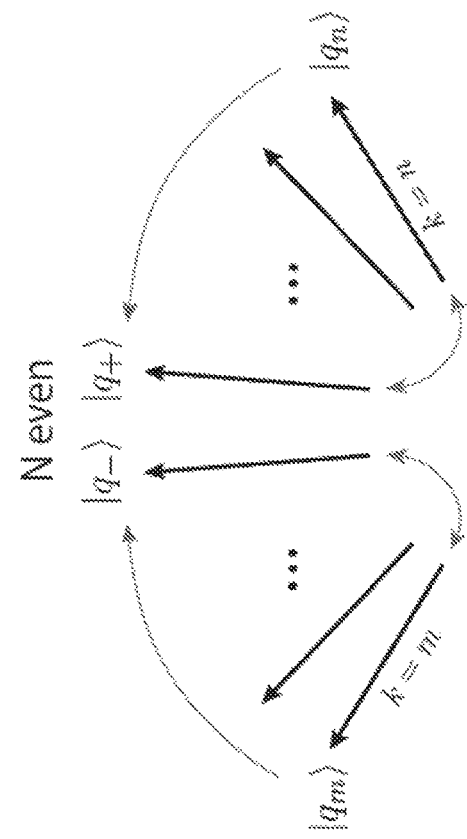
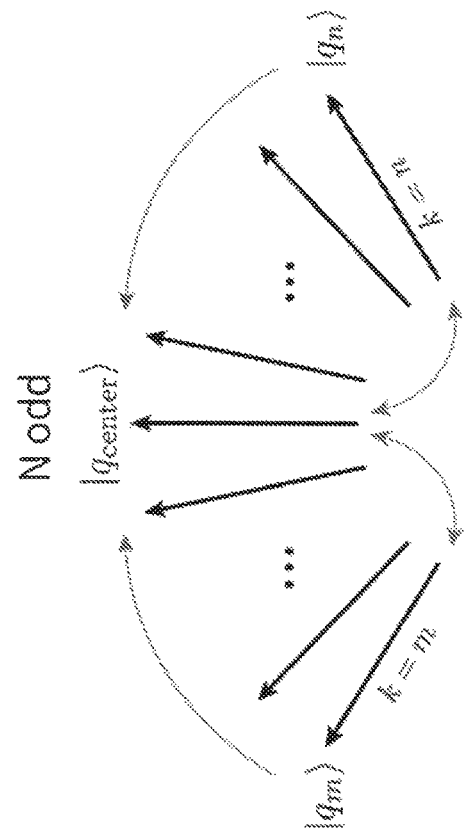
Fig. 9

Fig. 20
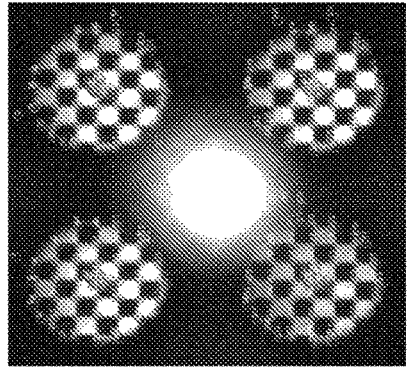
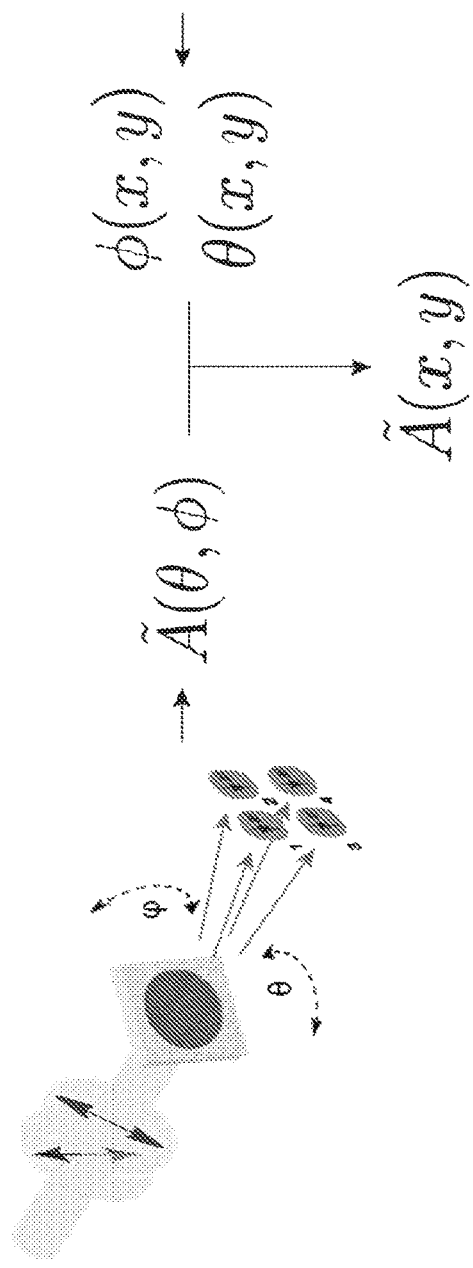

SYSTEMS AND METHODS FOR PARALLEL POLARIZATION ANALYSIS

CROSS-REFERENCE TO RELATED APPLICATIONS

This application is a National Stage Entry of International Application No. PCT/US2020/028157, filed on Apr. 14, 2020, which claims the benefit of and priority to U.S. Provisional Patent Application No. 62/834,343, filed on Apr. 15, 2019, the contents of which is are incorporated herein by reference in their entirety.

STATEMENT OF FEDERALLY SPONSORED RESEARCH OR DEVELOPMENT

This invention was made with government support under 1144152 and 1541959 awarded by the National Science Foundation. The Government has certain rights in the invention.

BACKGROUND

In this disclosure is presented a simple formalism for understanding polarization-dependent diffraction from polarization-sensitive gratings in the paraxial limit. One can motivate this formalism and use it to design gratings capable of parallel polarization analysis; in contrast to previous approaches, this is accomplished here with single gratings, rather than spatial interlacings or cascades of such gratings as has traditionally been done. One can fabricate and experimentally characterize these gratings. One can additionally show how one such grating can be integrated into an imaging system allowing for a compact full-Stokes imaging camera with no moving parts and no polarization optics (save for the grating element). Some imaging capabilities of this camera are demonstrated. This disclosure presents a significant generalization of polarization in diffraction, metasurfaces, and Fourier optics, suggests new directions of research in these areas, and offers new perspectives on polarization technologies.

SUMMARY

At least one aspect of the present disclosure relates to an optical component including a substrate and a metasurface including one or more linearly birefringent elements. The metasurface is disposed on the substrate. The one or more linearly birefringent elements define a grating configured to implement a parallel polarization analysis for a plurality of polarization orders for incident light of an arbitrary polarization.

In some embodiments, the grating is configured to implement the parallel polarization analysis without cascading the incident light through bulk polarization optics. In some embodiments, the grating is not spatially interlaced with any other gratings. In some embodiments, the metasurface is configured to implement full-Stokes polarimetry independent of any other optical components. In some embodiments, the plurality of polarization orders corresponds to a tetrahedron inscribed in a Poincare sphere. In some embodiments, the metasurface is configured to output light and analyze four different polarizations in parallel, wherein none of the four different polarizations are orthogonal to any of the others. In some embodiments, the one or more linearly birefringent elements comprise an array of dielectric pillars possessing form birefringence. In some embodiments, the plurality of polarization orders comprises six polarization orders corresponding to an octahedron inscribed in a Poincare sphere. In some embodiments, the metasurface implements a set of analyzers for arbitrarily specified polarizations on diffraction orders of the metasurface.

Another aspect of the present disclosure relates to an optical component including a substrate and a metasurface including one or more linearly birefringent elements. The metasurface is disposed on the substrate. The metasurface is configured to process incident light as a spatially-varying Jones matrix.

In some embodiments, the metasurface comprises a plurality of birefringent wave plates, and wherein one or more of an angular orientation, an absolute phase shift, and a phase retardance of at least one of the plurality of birefringent wave plates are configured to process the incident light as the spatially-varying Jones matrix. In some embodiments, the spatially-varying Jones matrix is linearly birefringent. In some embodiments, the spatially-varying Jones matrix is unitary. In some embodiments, the spatially-varying Jones matrix is an operator that operates on each of a set of diffraction orders of interest in parallel.

Another aspect of the present disclosure relates to an imaging system including a metasurface comprising one or more linearly birefringent elements, a lens, and an imaging sensor. The metasurface is configured to provide, to the imaging sensor, a plurality of polarization orders sufficient for the imaging sensor to determine a full-Stokes vector.

In some embodiments, the imaging sensor is configured to determine the full-Stokes vector using no polarization orders other than those provided by the metasurface. In some embodiments, the metasurface is a surface of a substrate being a single substrate. In some embodiments, the metasurface defines a grating that is not spatially interlaced with any other gratings, and the grating is configured to provide the plurality of polarization orders. In some embodiments, the metasurface defines a grating, and the grating is configured to provide the plurality of polarization orders without cascading the incident light through a plurality of gratings. In some embodiments, the metasurface is configured to receive incident light and to output the plurality of polarization orders without any moving parts. In some embodiments, the imaging sensor comprises at least four regions, and the metasurface is configured to provide, to each of the regions of the imaging sensor, a respective one of a plurality of images corresponding to a respective one of at least four independent polarization orders. In some embodiments, the imaging sensor is configured to provide the respective one of the plurality of images to each of the regions of the imaging sensor simultaneously.

BRIEF DESCRIPTION OF THE DRAWINGS

For a better understanding of the nature and objects of some embodiments of this disclosure, reference should be made to the following detailed description taken in conjunction with the accompanying drawings.

FIG. 2A through FIG. 2F show tensorial gratings for arbitrary parallel polarization analysis, according to some embodiments.

FIG. 5 shows transmission functions demanded by a grating producing exactly two non-zero diffraction orders, according to some embodiments.

FIG. 9 shows how a contradiction preventing a solution of an equation emerges at the midpoint of the diffraction pattern.

FIG. 20 shows synthesis of a full-Stokes polarization image, according to some embodiments.

DETAILED DESCRIPTION

At least some embodiments of the present disclosure relate to metasurface gratings.

In the most general situations of optical physics, Maxwell's Equations are solved in their full complexity. In a wide variety of practical scenarios, however, a simplification presents itself in the form of the scalar theory of diffraction from which the notion of a plane-wave expansion follows. In the plane-wave expansion (or angular spectrum) picture, an electromagnetic disturbance in a plane can be understood as being formed from the interference of many plane waves incident at different angles. These plane waves can be individually propagated forward to find the field anywhere else in space. This simple, intuitive understanding is the basis of the field broadly known as Fourier optics and underpins much of modern optical physics, notably holography and diffraction.

A scenario may be envisioned in which light (e.g., a normally incident plane wave, or some more sophisticated distribution of intensity and phase) encounters an obstacle which transforms the field. Plane-wave expansion means that a Fourier transform of the field immediately after the obstacle provides the information to propagate the field forward in space. In a traditional formulation of this problem, the field is assumed to be scalar-valued. How this formalism can be extended to include light's polarization state, and polarization-dependent obstacles, is a question that naturally arises. This is particularly poignant in light of recent advances (in the last few decades) in micro- and nano-fabrication and holography that have enabled the practical realization of obstacles with tailored, spatially-varying polarization properties on a subwavelength scale at optical frequencies.

Rigorously speaking, the traditional description of a plane wave's polarization state is not included in the plane-wave expansion picture. As a two-dimensional description of the electric field's path, the notion of a polarization ellipse is not suited to the three dimensional electric fields that result when plane waves having different propagation directions interfere, as is inherent in plane-wave expansion. Nonetheless, in the paraxial (small angle) limit where all plane-waves are nearly co-linear in $\vec{k}$, the traditional, two-dimensional description of light's polarization and plane-wave expansion remain consistent. Here (whether explicitly stated or not), one can work in this paraxial limit.

Figure 1:
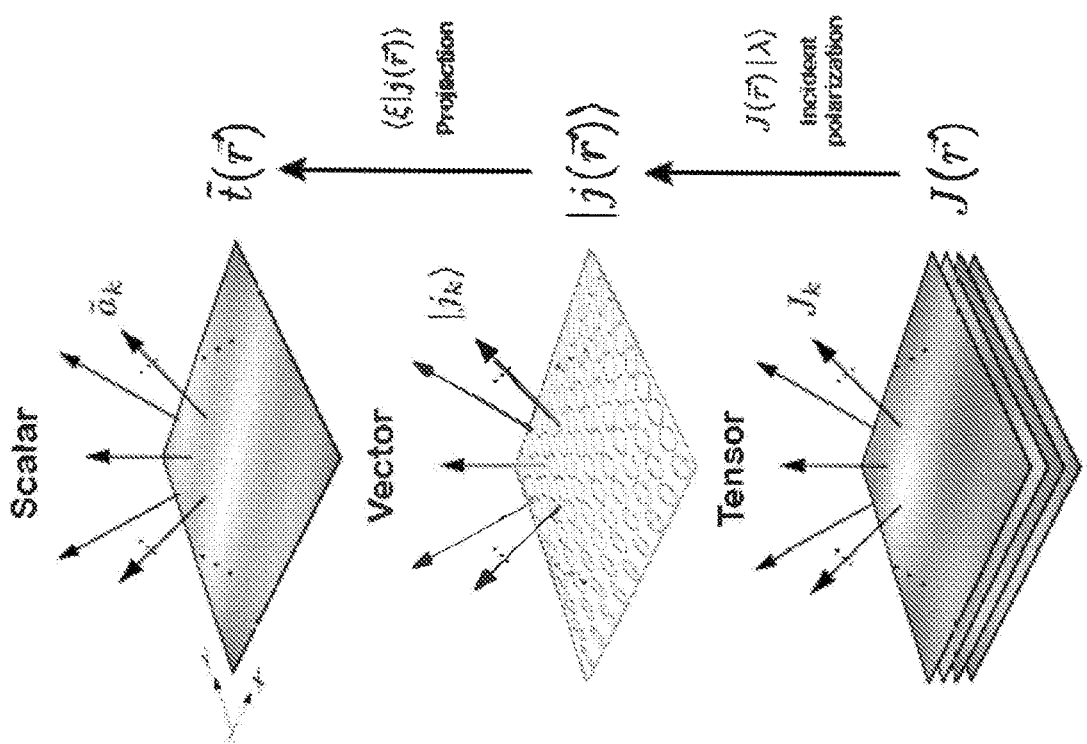
FIG. 1 schematically illustrates a hierarchical view of polarization-dependent paraxial diffraction, according to some embodiments.

In what follows, one can introduce three regimes of polarization-dependent diffraction that successively increase in generality, which is sketched in FIG. 1.

The first regime one can identify is that of scalar diffraction. In scalar diffraction, one can imagine light illuminating a planar surface, creating a complex-valued (amplitude and phase) field $\tilde{t}(\vec{r})$ after the obstacle. In Fourier (angular frequency) space, the grating is equivalently described by an infinite set of coefficients $a_k$, some of which are evanescent, given by the Fourier decomposition of $\tilde{t}(\vec{r})$). This is depicted at the top of FIG. 1. FIG. 1 shows a hierarchical view of polarization-dependent paraxial diffraction. In the scalar regime (top), a periodic electric field distribution $\tilde{t}(\vec{r})$ produces discrete orders with scalar weights $\tilde{a}_k$. In the vectorial regime (middle), the full polarization state $|j(\vec{r})\rangle$ allowed to vary periodically with space and produces diffraction orders with characteristic Jones vectors (polarizations) $\{|j_k\rangle\}$. Finally, in the tensorial regime, the Jones matrix of the grating may vary with space as $J(\vec{r})$—in this case, the Fourier coefficients $\{J_k\}$ are themselves operators, encoding polarization-dependent behaviors. The vectorial grating can be recovered from the tensorial one if a particular polarization $|\lambda\rangle$ is incident, and a scalar grating from a vectorial one if analyzed along a polarization $|\xi\rangle$.

The scalar regime may not acknowledge polarization. However, the scalar regime can be a base case for the hierarchy one can seek to establish. A strategy for understanding polarization-dependent diffractive optics—particularly in the field of metasurfaces—can include a reduction to two such scalar diffraction problems. Polarization-dependent elements can be designed so that when a given polarization is incident, the output polarization state is uniform as a function of space while amplitude and phase vary. When the orthogonal polarization is incident, the output polarization is again uniform and a second scalar transmission function is experienced. In this way, optical elements with different functions for chosen linear, circular, and more recently, arbitrary elliptical polarization bases can be realized. One can note that what is widely referred to as the "geometric" or "Pancharatnam-Berry" phase is a sub-case of this scalar approach, being used to create a scalar phase profile for circularly polarized light (though the geometric phase itself is considerably more general). Application of this scalar picture to polarization-dependent problems is a significant simplification and conceptual aid that allows the full complexity of polarization to be disregarded by assuming a field with uniform polarization.

Increasing this complexity by one degree implies a field in which a Jones vector, the polarization state, varies with space:

$$|j(\vec{r})\rangle = \tilde{a}(\vec{r}) \begin{pmatrix} \cos\chi(\vec{r}) \\ \sin\chi(\vec{r})e^{j\phi(\vec{r})} \end{pmatrix} \quad (1)$$

Here, one can use the braket notation for Jones vectors, with $\tilde{a}$ a spatially-varying, complex-valued amplitude, and $\chi$ and $\varphi$ the spatially-varying parameters of the polarization ellipse. One can refer to this as the vectorial regime of diffraction (not to be confused with full-vectorial diffraction, from Maxwell's Equations). Mathematically, one can proceed by projecting the polarization distribution $|j(\vec{r})\rangle$ onto grating orders by a Fourier transform. Having advanced one dimension from $\tilde{t}(\vec{r})$ to $|j(\vec{r})\rangle$, the Fourier coefficients themselves become vectorial, that is, themselves polarization ellipses given by the set $\{|j_k\rangle\}$. Equivalently, the spatially-varying distribution of polarization ellipses $|j(\vec{r})\rangle$ can be imagined as the (paraxial) interference of many beams of different polarizations $\{|j_k\rangle\}$. This is sketched in the center of FIG. 1. This picture of vectorial diffraction has been previously recognized in its full generality, variously in the fields of polarization gratings, polarization holography, and more recently, metasurfaces as well.

Implicit in both the scalar and vector regimes presented above is the notion of an incident wave. The grating modifies this incident wave to generate a spatially-varying complex field (in the former) or polarization state distribution (in the latter). In the most general case, which one can here dub the regime of tensorial diffraction, the behavior of the grating can be decoupled from the amplitude and polarization state of any particular illuminating plane wave. Indeed, the most general way of viewing a polarization-dependent grating is one where the polarization operator, the Jones matrix itself, is the spatially-varying quantity:

$$J(\vec{r}) = \begin{pmatrix} J_{11}(\vec{r}) & J_{12}(\vec{r}) \\ J_{21}(\vec{r}) & J_{22}(\vec{r}) \end{pmatrix} \quad (2)$$

The notion of a plane wave expansion again extends naturally to this tensorial regime. The Fourier weights of the plane waves, however, are now operators too, the Jones matrices $\{J_k\}$. When the spatially-varying operator nature of a grating is acknowledged, the diffraction orders are independent of any light that might illuminate the grating, and instead have a behavior $J_k$ that in a sense addresses all possible incident plane wave polarizations at once. The tensorial grating $J(\vec{r})$ can be reconstructed from the interference of the weights $J_k$ imposed on spatial carrier waves. But in contrast to the traditional picture of wave interference, it is polarization operators, not electric fields, that are interfering. This is sketched in the bottom of FIG. 1.

This tensorial way of viewing paraxial diffraction has not been widely acknowledged or used in the literature of polarization and diffractive optics. It is, essentially, nothing more than a straightforward extension of simple Fourier analysis to a higher-dimensional space. However, its real power lies in the fact that it can be inverted. Suppose there is a set of desired polarization devices to be realized (e.g., polarizers, waveplates, optically active elements, or any behavior that can be described in a Jones matrix) given by the operators $\{J_k\}$ and a corresponding set of diffraction orders of interest $\{l\}$. An operator with a spatially-varying Jones matrix of the form:

$$J(\vec{r}) = \sum_{\vec{k}\in\{l\}} J_k e^{j\vec{k}\cdot\vec{r}} \quad (3)$$

will/can constitute a single diffractive optical element realizing all of these (potentially complicated) polarization-dependent functions in parallel, and provides a mathematical prescription for its design and realization.

Finally, note that these three regimes of polarization-dependent diffraction—scalar, vectorial, and tensorial—are in fact intimately related. If a plane wave with Jones vector $|\lambda\rangle$ is incident on a tensorial grating $J(\vec{r})$, a vectorial grating $|j(\vec{r})\rangle = J(\vec{r})|\lambda\rangle$ results with polarization weights $|j_k\rangle = J_k|\lambda\rangle$. If that vectorial grating is projected (analyzed) along a particular polarization $|\xi\rangle$ a scalar grating $\tilde{t}(\vec{r}) = \langle\xi|j(\vec{r})\rangle$ results with scalar Fourier coefficients $\tilde{a}_k$. After all, a scalar grating is a single spatially-varying complex number, a vectorial grating contains two, and a tensorial grating contains four. This hierarchy is depicted in FIG. 1.

II. Parallel Polarization Analysis by Unitary Polarization Gratings

A. Fundamentals

The formalism presented in the last section is general. Eq. 3 provides a prescription for the realization of a diffractive element implementing quite arbitrary polarization behavior, but it is not specific with regards to the nature of the desired optical functions (contained in $\{J_k\}$) or a suitable optical medium to realize the synthesized $J(\vec{r})$.

Here one can pursue more specificity, beginning with the former question. Of particular interest in polarization optics are polarization analyzers, that is, polarizers. Polarizers are perhaps the most fundamental element of polarization optics, and are of practical importance in the measurement of polarization (polarimetry). Moreover, in previous investigations of polarization-dependent diffractive optics, gratings that analyze (or "split") different polarization states on their orders have been a subject of focus, especially for integrated polarimetry. Given this, in some embodiments one can focus on gratings whose orders $J_k$ implement polarization analyzers (though such a choice is not fundamental).

An element behaving as a polarizer can be described with a matrix that is a dyadic, or in the parlance of linear algebra, an outer product. Its Jones matrix can be expressed as $$J = \tilde{a} |p\rangle \langle q| \tag{4}$$

Eq. 4 describes a Jones matrix analyzing for the chosen Jones vector $|q\rangle$: When $|q\rangle$ is incident, intensity transmission is maximum, but if instead the orthogonal polarization $|z\rangle$ with $\langle z|q\rangle = 0$ arrives, the output light is quenched. The light emerging from J will/can carry the polarization state $|p\rangle$. A traditional polarizer familiar from laboratory experience has $|p\rangle = |q\rangle$, but this is not central to a polarizer's Malus' Law-like intensity transfer characteristic. Finally, $\tilde{a}$ is a complex (scalar-valued) weight.

Having decided that the $\{J_k\}$ should act as polarization analyzers (Eq. 4), the desired tensorial grating $J(\vec{r})$ can be easily computed by Eq. 3. But what physical optical element can implement the resulting $J(\vec{r})$? Here, one can make another specific choice (that, again, is not fundamental to the nature of tensorial diffraction): a highly advantageous realization medium takes the form of metasurfaces composed of arrays of dielectric pillars possessing form birefringence. Locally, the Jones matrix of these metasurfaces may be well-approximated by a linearly birefringent waveplate, where angular orientation, absolute phase shift, and phase retardance are all continuously adjustable and independent quantities, given by $$J(\vec{r}) = R(-\theta(\vec{r})) \begin{pmatrix} e^{i\phi_x(\vec{r})} & 0 \\ 0 & e^{i\phi_y(\vec{r})} \end{pmatrix} R(\theta(\vec{r})) \tag{5}$$

Stated differently, such a metasurface can realize a sampled tensorial grating in which $J(\vec{r})$ is locally of the form of Eq. 5, with $\theta$, $\phi_x$, and $\phi_y$ all spatially-varying quantities. By inspection, Eq. 5 describes a Jones matrix that is 1) unitary everywhere, that is, $J^\dagger J = 1$ for all $\vec{r}$, with 1 the 2×2 identity matrix, and more specifically, 2) linearly birefringent, having linear polarizations as its eigenvectors for all $\vec{r}$.

From the general picture of tensorial diffraction put forward in Sec. I, the two specific choices that the diffraction orders of the grating should behave as analyzers and that its realization must/can locally take the form of Eq. 5 were made. But are these particularities mathematically consistent with one another? That is, for a general choice of diffraction orders $\{l\}$ implementing the polarization analyzers $J_k = \tilde{a}_k |q^*_k\rangle\langle q_k|$ for $k \in \{l\}$, will the $J(\vec{r})$ required by Eq. 3 take the form of a unitary, linearly birefringent waveplate for all $\vec{r}$ (Eq. 5)?

In the supplement, one can rigorously investigate this question. There, one can show that the linear birefringence requirement of Eq. 5 implies that the $J_k$ should be symmetric. In the case of $J_k$ that are analyzers, this indicates that each should take the form $J_k = \tilde{a}_k |q^*_k\rangle\langle q_k|$, that is, that the output polarization of the analyzer should be the complex conjugate of the Jones vector being analyzed for. Physically, this means that the analyzer leaves the polarization ellipse's shape unchanged while reversing the handedness of its rotation.

However, even with linear birefringence accounted for, the grating $J(\vec{r})$ must/can be unitary everywhere. One can show in the supplement that this restriction in particular implies that, if one can insist on a tensorial grating with exactly n orders that are all polarization state analyzers, the form of Eq. 5 can (only) be matched everywhere if n=2 and the polarizations analyzed for are strictly orthogonal.

B. Design Strategy and Optimization

In other words, a tensorial grating implemented by a metasurface locally obeying Eq. 5 may not have arbitrarily many diffraction orders acting as polarization state analyzers, with no light leaking into other orders. But what if some light is allowed to leak into other diffraction orders? Then, the $J_k$ of some orders could behave as analyzers for arbitrary polarization states with a limited amount of leakage into other diffraction orders (implementing their own $J_k$) so that the overall grating formed in Eq. 3 is still unitary everywhere. This motivates an interesting physical perspective on these tensorial gratings as coupled systems in which neighboring diffraction orders compensate for desired polarization-dependent behavior in a way that preserves unitarity.

How can this be done to concentrate as much optical power in the diffraction orders of interest, minimizing the leakage? This is an optimization problem. Here, one can wish to implement a grating $J(\vec{r})$ that locally takes on the form of Eq. 5 with a set of diffraction orders $\{l\}$ that each have $J_k$ that are analyzers for an arbitrarily specified set of polarization states $\{|q\rangle\}$, as defined in Eq. 4. Moreover, one can wish to do this with as little light leaking into diffraction orders outside of $\{l\}$. One can define the quantities $I_q^k = \langle q|J_k^\dagger J_k|q\rangle$ the power on diffraction order k when the preferred polarization is incident, and $I_z^k = \langle z|J_k^\dagger J_k|z\rangle$ the power on diffraction order k when the orthogonal polarization is incident. A way of stating this optimization problem would be to maximize $\Sigma_{k \in \{l\}} I_q^l$ in order to minimize leakage into undesired orders and to keep the contrast between $I_q$ and $I_z$ as high as possible to constrain the $J_k$ to act as analyzers (cf. Eq. 4). This can be addressed with, for instance, a gradient-descent based method.

Detailed discussion of this optimization procedure is included in the supplement (where one can also describe a path to an analytical form of the solution using variational methods).

In the next section, one can use this approach to design and realize these gratings.

III. Experiment

A. Case Studies

Herein is presented a conceptual framework and scheme for the design of tensorial gratings implementing arbitrary, parallel polarization analysis. A grating that analyzes incident light along different polarization states in parallel is of particular interest in the field of polarimetry, or polarization state measurement. In order to reconstruct the full Stokes vector of an incident beam, at least four projective measurements can be made along different polarization states. In order to maximize the fidelity of this reconstruction, these states should be as distinct from one another as possible, which can be accomplished by choosing polarization states corresponding to platonic solids inscribed in the Poincare sphere (polarization state space). To that end, one can apply the formalism of tensorial diffraction and the scheme motivated above to two case studies:

Tetrahedron: This grating analyzes four polarization states on its four innermost diffraction orders corresponding to a tetrahedron inscribed in the Poincare sphere, one of which is circular.

Octahedron: This grating analyzes six polarization states corresponding to an octahedron inscribed in the Poincaré sphere. These are $|x\rangle$, $|y\rangle$, $|45\rangle$, $|135\rangle$, $|R\rangle$, and $|L\rangle$, perhaps the most familiar polarization ellipses. These are analyzed on six inner diffraction orders.

Certain comparative works have addressed the question of designing a diffraction grating capable of splitting, and thus analyzing, light based on its polarization state. However, by and large, these works have taken a scalar approach, seeking to impart opposite blazed grating phase profiles on orthogonal polarization states. Consequently, several individually designed gratings must/can be interlaced (often dubbed "spatial multiplexing") or cascaded in series to create a grating whose orders analyze for any more than two polarization states. Awareness of the tensorial approach suggests that this is not necessary—all functionalities can be integrated into a single grating, and functionalities not possible by interlacing individual beamsplitting gratings can be achieved. The tetrahedron example above, for example, cannot be realized in this way as none of its four polarizations are orthogonal to any of the others.

Figure 2A:
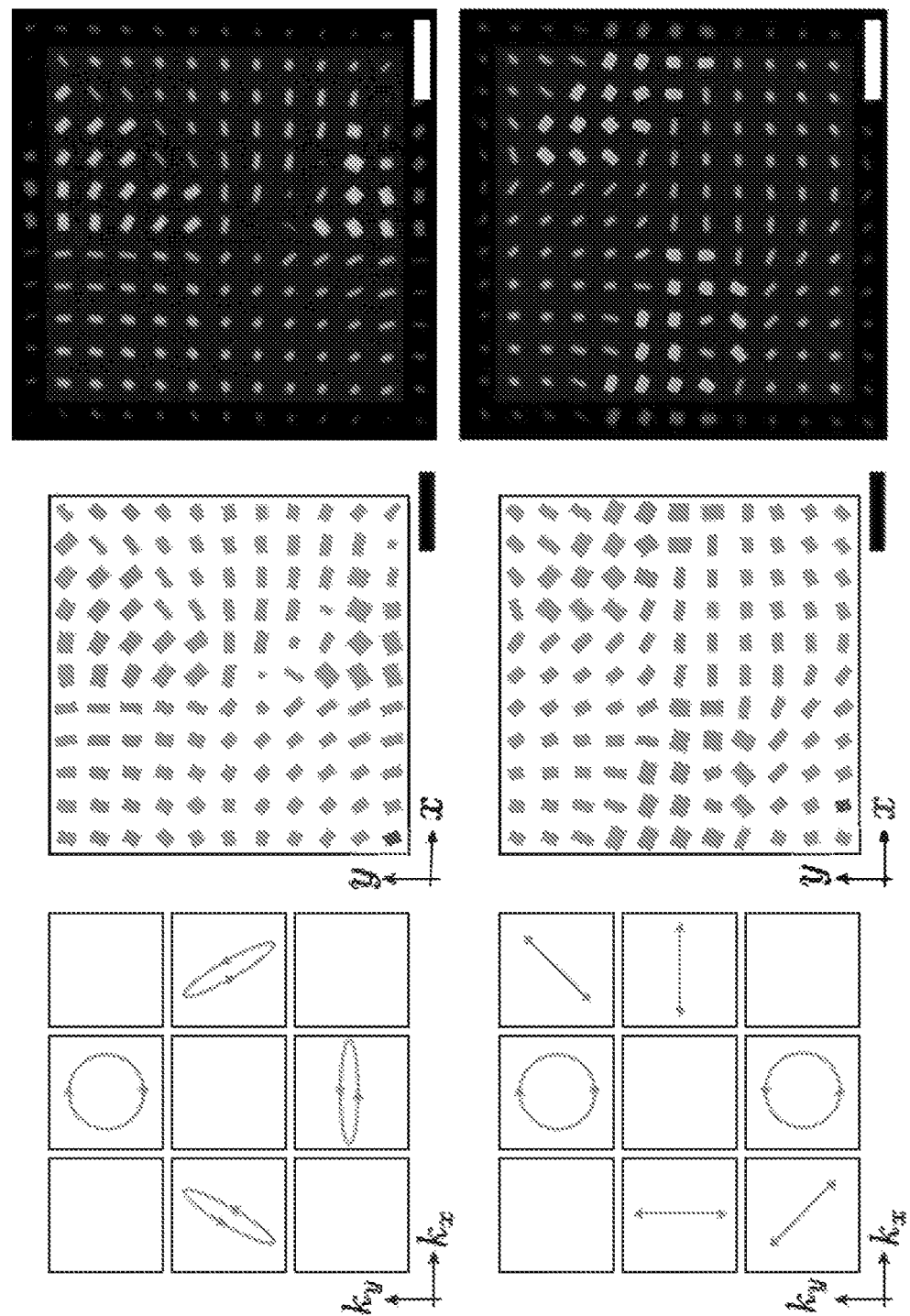
Figure 2B:
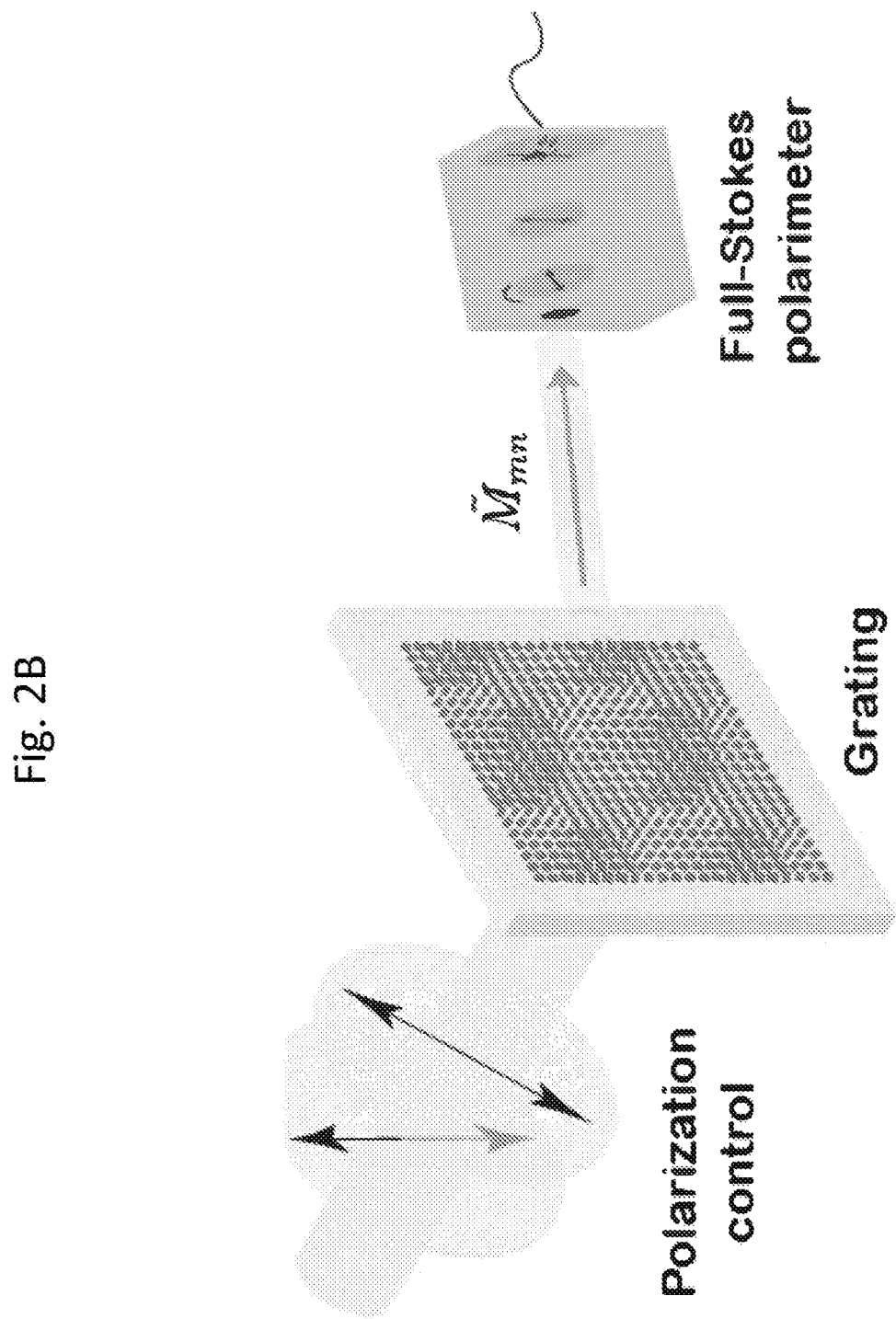
Figure 2C:
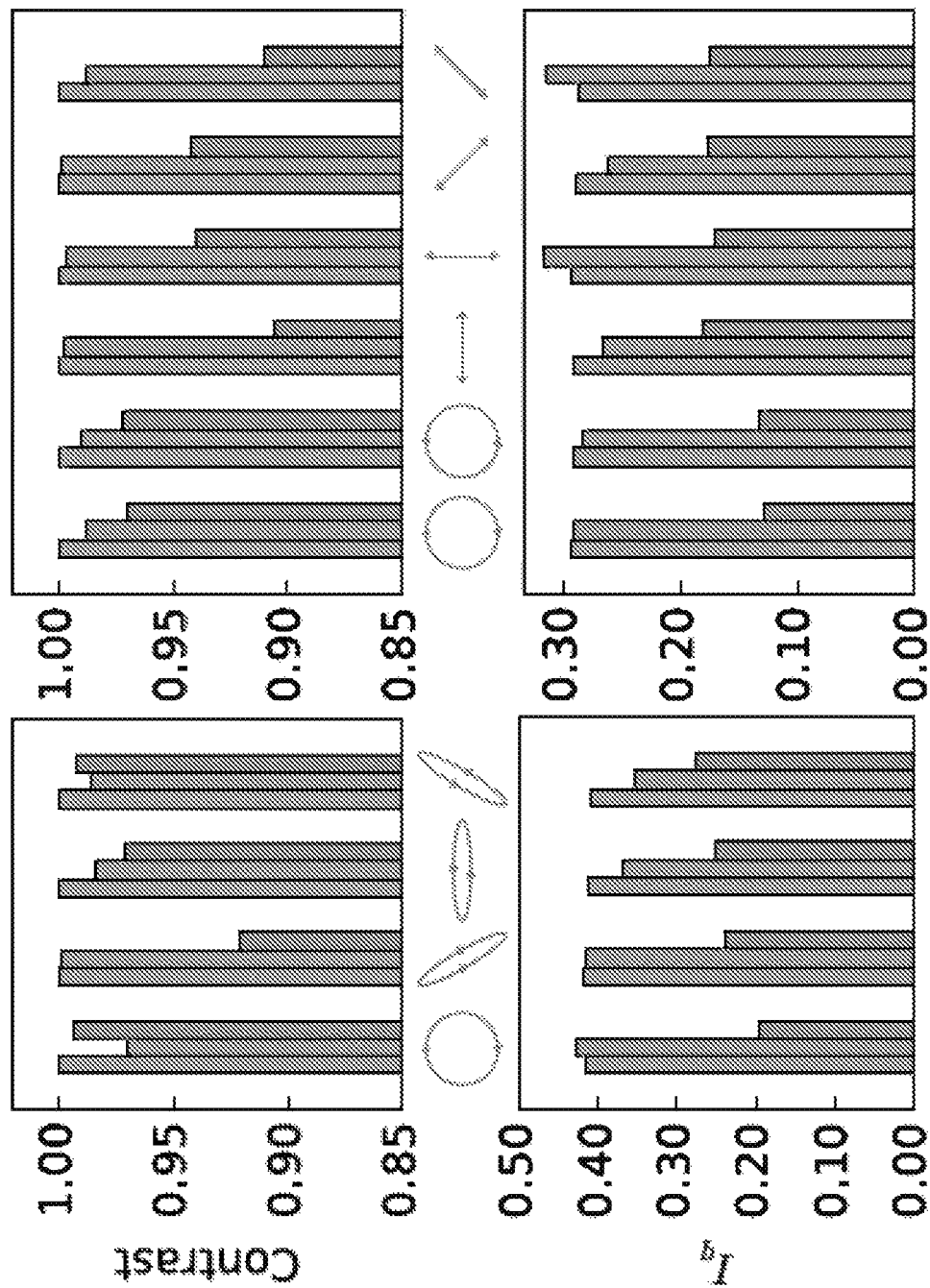
Figure 2E:
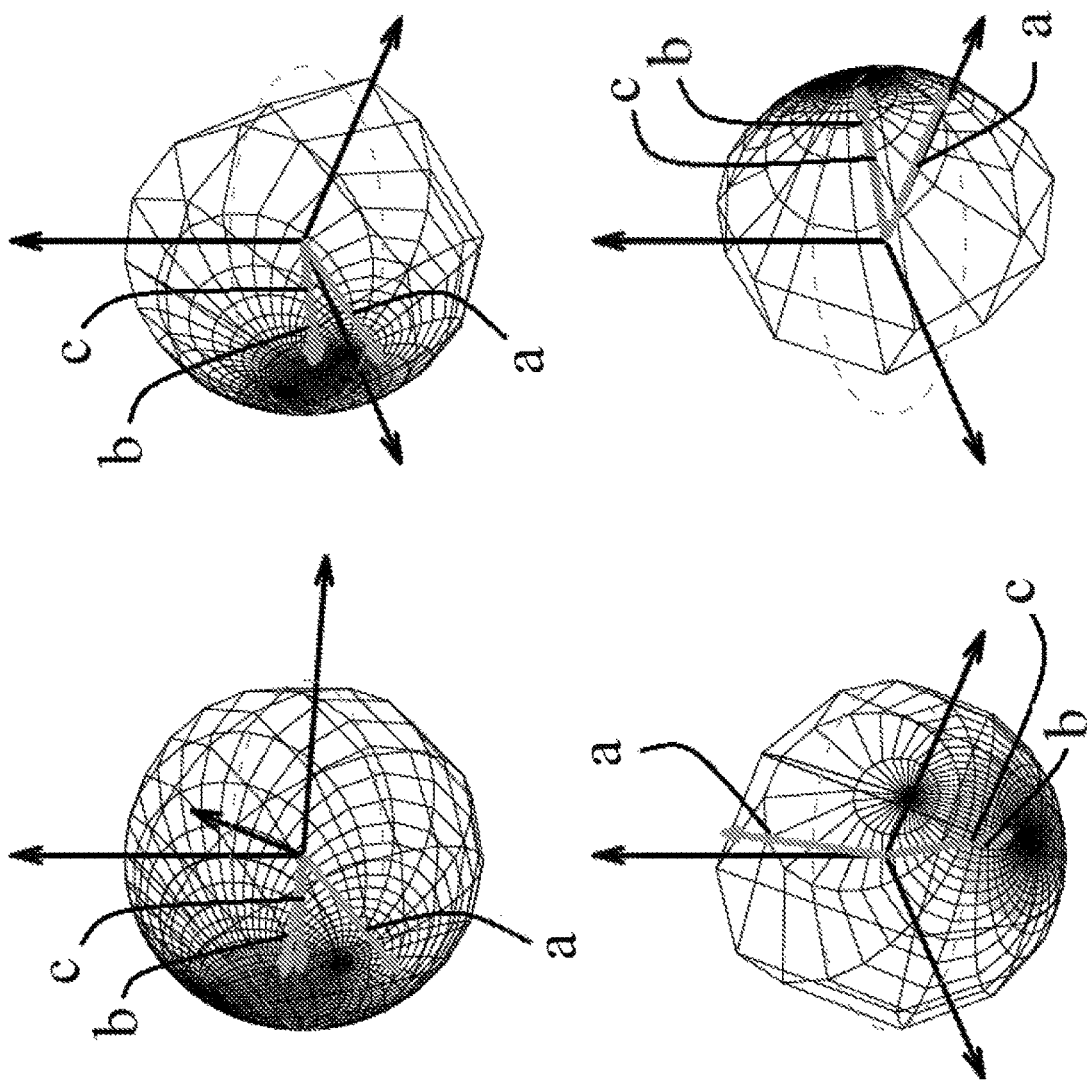

The gratings described above are to be implemented with square, two-dimensional gratings (though this is not a fundamental choice). FIG. 2A through FIG. 2F show tensorial gratings for arbitrary parallel polarization analysis. FIG. 2A shows using an optimization design scheme, gratings are designed to analyze for four (top) and six (bottom) polarization states corresponding to polarizations of the vertices of a tetrahedron (top) and octahedron (bottom) inscribed in the Poincare sphere. On the left, the diffraction orders and the polarizations they analyze are drawn in k-space. In the right two columns, the 11×11 element grating unit cells composed of $TiO_2$ rectangular pillars are shown which perform this analysis on these orders at $\lambda$=about 532 nm in design (middle) and as-fabricated (SEM, right). FIG. 2B shows a schematic of Mueller matrix polarimetry: the grating is illuminated by light of variable polarization while recording the output on a single diffraction order with a full-Stokes polarimeter to measure its Mueller matrix $\tilde{M}_{(m,n)}$. FIG. 2C shows the contrast (top row) and intensity normalized to incident power (bottom) of each grating order are shown for the tetrahedron (left) and octahedron (right) gratings. For each order, results from the analytical grating design (optimized), a full-wave simulation of the grating, and experimental measurements are given. Each order is labelled by the polarization ellipse it analyzes for. FIG. 2D shows the polarizations analyzed by each grating in from the analytical grating design, simulation, and experiment. FIG. 2E and FIG. 2F show, for each order of the tetrahedron (E) or octahedron (F) gratings, a Poincaré sphere represents the output polarization on the grating order as a function of input polarization. The wireframe shows how points on the Poincaré sphere are mapped into new points by each order's experimentally measured Mueller matrix $\tilde{M}_{(m,n)}$. On each sphere, an arrow "a" denotes the measured analyzer polarization $|q_{(m,n)}\rangle$ from FIG. 2D, an arrow "b" denotes the equator-mirrored polarization $|q^*_{(m,n)}\rangle$, and an arrow "c" denotes the average output polarization over all points which, according to the formalism here, should largely overlap with the "b" arrow as shown in the drawings. A darkened area or cap shows the average deviation from this mean output polarization.

A map of the diffraction orders (in $\vec{k}$ space) and the desired analyzer polarization ellipses ($\{|q\rangle\}$) is depicted in the leftmost column of FIG. 2A. These diffraction orders and desired polarization states can be fed into the aforementioned optimization, yielding a $J(\vec{r})$ that is locally of the form of Eq. 5 (unitary, linearly birefringent). The locally-required Jones matrix to the geometries of actual structures can be mapped by referring to a library of such structures in a material platform/wavelength regime of interest. In some embodiments, that material platform is $TiO_2$ pillars. The high optical index of these structures allows operation at technologically-important visible wavelengths, aiding the imaging application discussed in Sec. IV. Other embodiments are possible and neither $TiO_2$ nor visible wavelengths are necessary. Moreover, the gratings presented here contain 11 such elements to a side, separated at a stride of about 420 nm. This choice is made to suit the imaging application of Sec. IV while keeping the diffraction angle at $\lambda$=about 532 nm paraxial ($\theta_D \sim 6.6°$).

Grating unit cells for the tetrahedron and octahedron cases are shown in FIG. 2A (top and bottom, respectively), both in design (drawing) and as-fabricated (electron micrograph, right). Each is tessellated hundreds of times to create a grating.

B. Mueller Matrix Polarimetry

The tensorial gratings described above are designed to implement particular polarization-dependent functions on their diffraction orders. To verify that this is accomplished in practice, the polarization-dependent behavior of each diffraction order of interest can be measured. In polarization optics, the Jones and Mueller matrices describe polarization-dependent behavior. But of the two, the Mueller matrix is directly measurable, being a description of optical intensities rather than electric fields.

To that end, one can perform Mueller matrix polarimetry, that is, the experimental determination of the 4×4 Mueller matrix $\tilde{M}_{(m,n)}$ of each grating order (m, n) of interest. This is accomplished by successively illuminating the grating with laser light at $\lambda$=about 532 nm in several (at least four) different input polarization states with known Stokes vectors $\{(\vec{S}_{in})\}$. For each input Stokes vector, a full-Stokes polarimeter can be placed on the order of interest to record the corresponding output Stokes vectors, $\{(\vec{S}_{out})\}$. The matrix $\tilde{M}_{(m,n)}$ linking $\{(\vec{S}_{in})\}$ to $\{(\vec{S}_{out})\}$ can then be numerically determined from the data. This process is sketched schematically in FIG. 2B and discussed in more detail in the supplement.

C. Results

The result of the design procedure is an analytical $J(\vec{r})$ which can be numerically Fourier transformed to obtain the Mueller matrix of each order, and the corresponding unit cell geometries can also be simulated (using, e.g., FDTD) yielding simulated Mueller matrices for each order (supplement). Coupled with the experimentally determined Mueller matrices from the fabricated gratings, there are thus three domains—numerics, simulation, and experimental reality—in which to compare the gratings, each decreasing in mathematical abstraction. If the three agree, the general approach of tensorial diffraction presented here can be said to hold up in practice.

It is inherently difficult to make a direct comparison of matrix quantities. Instead, since each diffraction order of interest is supposed to act as a polarization analyzer, it makes sense to ask the following questions: Do the orders act as analyzers? For which polarizations? And, with what efficiency?

The present disclosure address these questions in that order, beginning with FIG. 2C. The left side of FIG. 2C is dedicated to the tetrahedron case, while the right is dedicated to the octahedron case. Each column of bars in FIG. 2C represents one diffraction order designed to analyze for the polarization ellipse plotted below (or above) it. Each group contains three bars, one for the numerically optimized result, one for simulation, and one for measurement. In the top half of FIG. 2C, the contrast, that is, the normalized difference between the intensity on that order when its preferred polarization is incident versus the orthogonal one, is plotted. In this regard, the optimized result numerically predicts near perfection (100%). From full-wave simulation, the predicted contrast decreases somewhat, and then again somewhat in the measured gratings. However, the orders of the measured gratings show polarization contrasts in excess of 90% in all cases. From this, it is clear that all desired orders of both gratings act as polarization state analyzers, as desired.

Second, it must/can be verified that the orders not only act as analyzers, but act as analyzers for the desired polarization states specified in the design. In FIG. 2D, the polarization states for which each grating order has maximum output intensity, the analyzer polarizations, are plotted on the Poincare sphere alongside the platonic solids that represent the desired states. It can be seen that in the numerically optimized grating, simulation, and measurement the analyzer polarizations are close to their desired counterparts (there are no drastic mixups in FIG. 2D, whereby one analyzer polarization lands very far away appearing to be closer to another falsely exaggerating correspondence).

That both gratings show high contrast for the desired polarization states is evidence that the tensorial approach to designing these gratings is valid. Next, one can turn to the question of efficiency. Being tensorial, the grating's diffraction efficiency cannot be quantified with a single number—it is polarization-dependent. In FIG. 2C one can plot $I_q$, the maximum intensity that can be observed on an order which occurs when its preferred polarization from FIG. 2D is incident (as a fraction of the power of the illuminating beam), for each order of the tetrahedron (left) and octahedron (right) gratings. Note that even given a perfect grating that directs all light into the desired orders, $I_q$ cannot be 100% unless all other orders analyze for orthogonal polarizations. There are thus symmetry constraints dictated by energy conservation (supplement) that limit $I_q$ to one-half and one-third for the tetrahedron and octahedron gratings, respectively. It is seen in FIG. 2C that the optimized result and simulation predict something close to these limits. In measurement, one can see that $I_q$ is somewhere between one half and two-thirds what might be expected. This is a discrepancy that one can expect could be resolved with increases in the control of the fabrication process. Already, the efficiency of both gratings is high enough to enable practical use. Averaged over all possible input polarizations, the diffraction efficiency in terms of power in the orders of interest over incident power exceeds 50% (supplement).

One can also note that in FIG. 2C there are cases in which measurement seems to outperform simulation, or simulation outperforms the numerical approach for a particular order. Taken in isolation, this may seem erroneous, but the grating is a complex, coupled system defects that detract from the performance of several grating orders may well unexpectedly benefit another.

Finally, note that the data contained in FIGS. 2C and 2D did not actually require the determination of the full Mueller matrix since efficiency, analysis polarization state, and contrast can all be extracted from just the first row of the Mueller matrix which dictates the intensity of the outgoing beam. The remainder of the Mueller matrix controls the output beam's polarization state, which one may have not addressed. This is the subject of FIGS. 2E and 2F where each sphere represents the behavior of one diffraction order of the tetrahedron or octahedron grating, respectively. The Poincare sphere is uniformly sampled at 1600 points which form the intersection of a wireframe. All of these polarizations are numerically operated on by each order's experimentally measured Mueller matrix $\tilde{M}_{(m,n)}$ with the result plotted as a new, distorted wireframe. If each order behaved as a perfect analyzer in the manner of Eq. 4, all points in the original sphere would be mapped into a single point in the distorted diagram at the Stokes vector corresponding to $|p\rangle$. Since in experimental reality this is not the case, the spheres in FIGS. 2E and 2F contain points distributed over the entire sphere, but the extent to which the points on these spheres are concentrated in one direction and very sparse elsewhere is a testament to the fact that each diffraction order does indeed act as an analyzer, especially true of the tetrahedron grating.

For each grating order, an arrow "a" corresponds to the vector being analyzed for (as depicted previously in FIG. 2D), that is, $|q_{(m,n)}\rangle$ in the notation of Eq. 4. An arrow "c" shows the average output polarization state on the grating order, while a darkened spherical cap shows the mean deviation from this state. Finally, an arrow "b" depicts $|q^*_{(m,n)}\rangle$, which has flipped handedness with respect to $|q_{(m,n)}\rangle$ and is thus mirrored about the equator of the sphere. According to the picture presented above, the linear birefringence of the grating elements implies that the output takes on the form of $|q^*_{(m,n)}\rangle$. This is supported by the close overlap of the "b" and "c" arrows in each plot of FIGS. 2E and 2F, and lends further validity to the tensorial approach.

IV. Full-Stokes Polarization Imaging

Now, apply these tensorial gratings in an area of practical interest. Both the octahedron and tetrahedron gratings as presented above could function as compact and integrated full-Stokes polarimeters (devices that can determine the polarization state of a beam) with no other optical components and no moving parts. Metasurface-based polarimeters have recently attracted significant interest. However, for a variety of academic and industrial areas, a polarization camera, or imaging polarimeter, is far more practical. A polarization camera captures the full or partial Stokes vector at each point in an image. In the case of the four-element Stokes vector, this involves four image acquisitions along independent polarization directions, which may be taken sequentially in time (limiting temporal resolution and often requiring moving parts), by patterning a focal plane array with micro-polarizers (requiring expensive fabrication, usually without offering full-Stokes vector determination), or by simultaneous capture of the image along four paths each with independent polarization optics (significantly increasing system bulk and complexity).

Grating-based approaches are used in some comparative applications. Owing to the limitations of those applications, however, multiple gratings—either cascaded in series or patterned adjacent to one another—are used to implement the measurements for full-Stokes vector determination. In what follows, one can show that the tensorial approach of some embodiments enables for the development of a flexible full-Stokes imaging camera without this complication. The camera and grating developed may have wide-ranging application in machine vision and other areas.

A. Design of an Imaging System

Figure 3A:
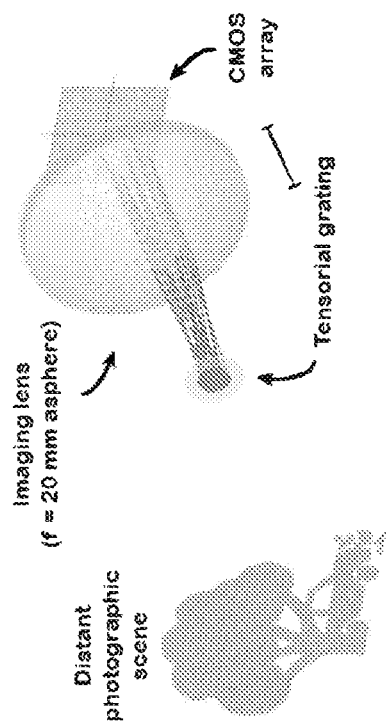
FIG. 3A shows a tensorial grating is integrated with an aspheric lens to image four diffraction orders onto four quadrants of a CMOS imaging sensor, according to some embodiments.

The task here is to integrate one of the gratings described above into a photographic imaging system. The tetrahedron grating is chosen because it offers the possibility to determine the Stokes vector with (only) four measurements, the minimum necessary. One can develop an imaging system comprised of a tensorial grating (implemented with a $TiO_2$ metasurface with linearly birefringent elements) followed by an aspheric lens (f=20 mm, whose choice is discussed in the supplement) and finally a CMOS imaging sensor. This is schematically depicted in FIG. 3A. Relative to FIG. 1, the grating is rotated by 45° so that each of its orders forms an image of the scene on one quadrant of the imaging sensor. Each quadrant will/may then contain a version of the photograph analyzed along its characteristic polarization—these images can be simultaneously acquired and the Stokes vector $\vec{S}$ reconstructed pixel-wise (FIG. 3B), forming a polarization image.

Simple ray tracing is used to optimize all aspects of the system: the separation of the grating and the asphere, the separation of the asphere and the imaging sensor, and finally, the grating period (and thus, the diffraction angle $\theta_D$). The goal of the optimization is to take parallel ray bundles over a ±5° field-of-view (FOV)—which are assumed to emerge from a very distant object—and focus them as well as possible (defined in terms of the commonly-used Strehl ratio) within the bounds of a quadrant of the image sensor used. Moreover, the tensorial grating carries an azimuthally symmetric (scalar) phase profile which is added to the tensorial grating during the design and is experienced by all diffraction orders. This produces a weak lensing effect that aids in imaging. Though the design focuses on just a single grating order, all other grating orders will/can be imaged to their respective quadrants by default since the imaging system is rotationally symmetric about its optical axis.

FIG. 3A shows a tensorial grating is integrated with an aspheric lens to image four diffraction orders onto four quadrants of a CMOS imaging sensor. A ray trace of one diffraction order is shown. The camera is designed to image far-away objects, so each color corresponds different parallel ray bundles incident on the grating over a ±5° field-of-view (FOV). The scale bar is 6 mm. Not shown: a 10 nm bandpass filter at about 532 nm and an aperture in front of the grating to limit the FOV.

Figure 3C:
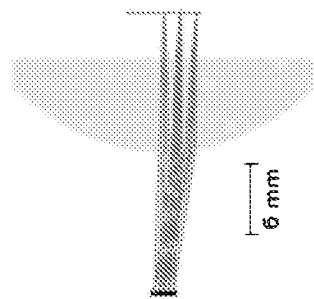
FIG. 3C shows a side view of the ray trace in FIG. 3A, according to some embodiments.
Figure 3B:
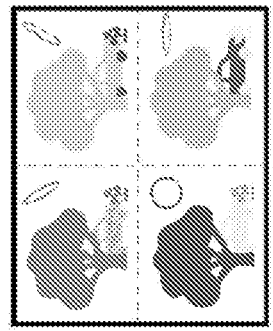
FIG. 3B shows that each copy of the image on each quadrant has been analyzed along a different polarization, according to some embodiments.

FIG. 3B shows each copy of the image on each quadrant has been analyzed along a different polarization. Pixel-wise differences in intensity at different points in the scene can be used to synthesize a single polarization image of the scene in which $\vec{S}$ is known at each point.

FIG. 3C shows a clear side view of the ray trace in FIG. 3A. Top, middle, and bottom correspond to ray bundles incident at +5°, 0°, and −5°, respectively.

Figure 3E:
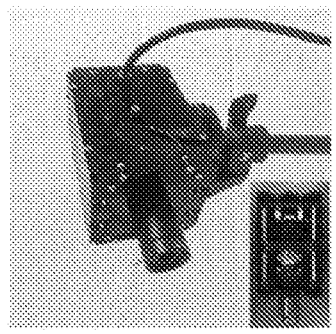
FIG. 3E shows that the imaging system in FIG. 3A can be packaged into a practical prototype with adjustable focus, according to some embodiments.
Figure 3D:
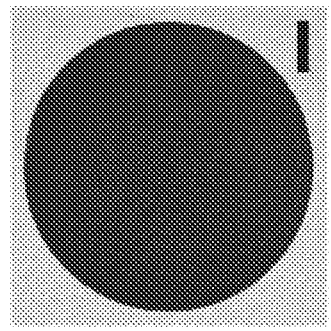
FIG. 3D shows optical microscope image of the grating sample, according to some embodiments.

FIG. 3D shows optical microscope image of the grating sample, which is 1.5 mm in diameter and shows Fresnel zones owing to the weak lensing effect imposed on top of the tensorial grating. The scale bar is 250 μm.

FIG. 3E shows the imaging system in FIG. 3A can be packaged into a practical prototype with adjustable focus.

A real ray trace of the imaging system is shown in FIG. 3A, and a clear side view is given in FIG. 3C. The different ray colors correspond to parallel ray bundles incident at different angles on the tensorial grating. The optimized grating has N=11 elements at about a 420 nm pitch, yielding $\theta_D$=6.6° at λ=about 532 nm (this is the reason the grating unit cells in Sec. III are 11×11 in size as well). In FIG. 3D a microscope image of the 1.5 mm sample is shown. The sample is surrounded by metal to block stray light and displays Fresnel zones that stem from the additional lens phase profile imparted on top of the grating whose periodicity is too small to be discerned at this magnification.

Finally, the entire imaging system can be packaged into a prototype for practical use in polarization photography. Such a prototype is shown in FIG. 3E and permits for focus adjustment (its size could be reduced greatly at the expense of this freedom). An aperture in front of the camera permits control of the FOV and a 10 nm bandpass filter at about 532 nm prevents the dispersive nature of the gratings from interfering with imaging. More detail is deferred to the supplemental information.

B. Polarization Imaging

The grating-based camera can then be used for practical full-Stokes polarization imaging. The raw sensor acquisition approximates FIG. 3B. To consolidate the four images into one polarization image, the four images must/can be aligned (registered) to one another forming the vector $\vec{I}=[I_0\ I_1\ I_2\ I_3]^T$ at each pixel of the image. If the camera is calibrated, that is, if the polarizations analyzed for by each diffraction order are precisely known, the Stokes vector at each pixel can be computed as $\vec{S}=A^{-1}\vec{I}$ here A is a matrix whose rows are these analyzer Stokes vectors. Image registration and polarimetric calibration are addressed simultaneously with an angle-dependent method which is described in the supplement.

In a polarization image, $\vec{S}=[I_0\ I_1 I_2\ I_3]^T$ is known at each pixel, but the Stokes vector in its entirety does not admit easy visualization. Instead, images can be formed from scalar quantities derived from the Stokes vector. In the literature of polarization imaging, two parameters of the polarization ellipse are commonly used and visualized. The first is the azimuth angle, given by arctan $(S_2/S_1)$, which yields the physical orientation of the polarization ellipse. The second is the degree of polarization, given by $p=\sqrt{S_1^2+S_2^2+S_3^2}/S_0$, which quantifies the degree to which light is (or is not) fully polarized. Finally, an image can be formed of just $S_0$ which, as the intensity of the light, yields the image that would be acquired by a traditional, non-polarization sensitive camera.

Figure 4:
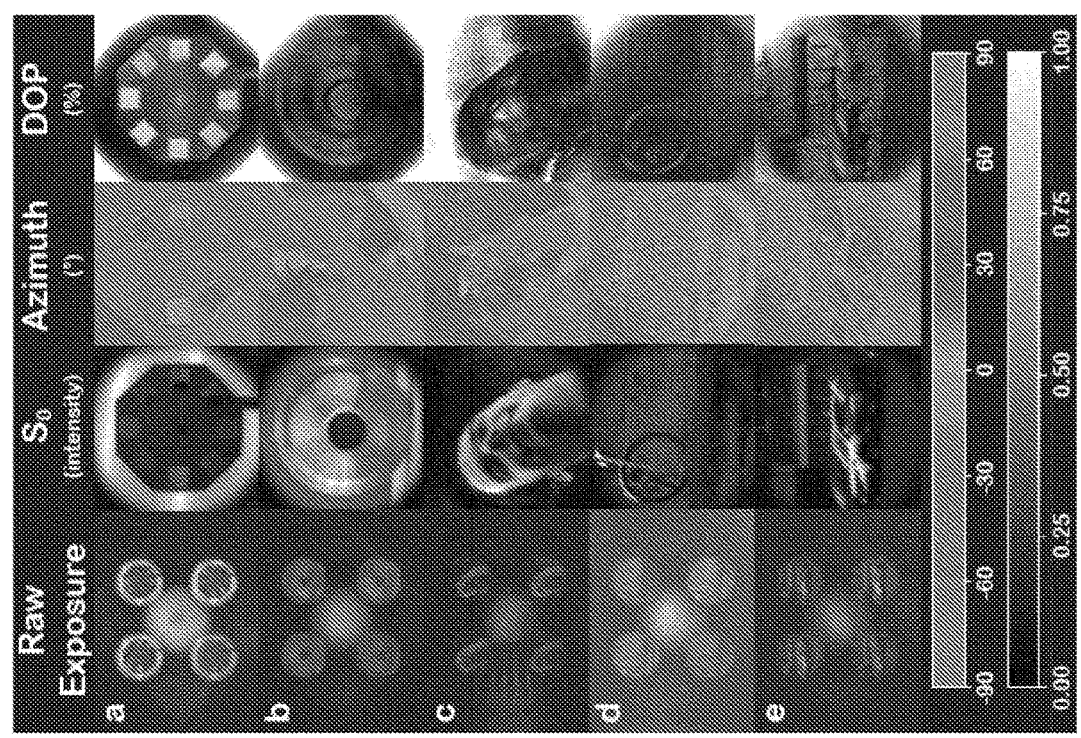
FIG. 4 shows indoor and outdoor photography with a camera, according to some embodiments.

In FIG. 4, exemplar photographs captured by the polarization imaging system are shown. For each, images of the raw acquisition on the sensor, $S_0$ (a standard monochrome photograph), the azimuth angle, and the DOP are shown. In all of these images, the illuminating light is unpolarized and diffuse, that is, incident from all directions. The indoor images in FIG. 4 are taken under diffuse LED illumination while the outdoor images are acquired in broad daylight. The following describes each example in turn.

FIG. 4, sections (a) through (e), shows indoor (sections (a)-(c)) and outdoor (sections (d)-(e)) photography with the camera depicted in FIG. 3. In each case, the raw unprocessed exposure, $S_0$ (the traditional monochrome intensity image), the azimuth of the polarization ellipse (in degrees, given by arctan $(S_2/S_1)$), and the degree-of-polarization (DOP, given by $\sqrt{S_1^2+S_2^2+S_3^2}/S_0$) are shown. See Sec. IV for detail on each case.

FIG. 4(a) constitutes a simple test. The target is a paper frame holding eight sheets of polarizing film whose axes are arranged radially outwards—image-forming light is allowed to transmit through these sheets. A traditional photograph sees no difference between the sheets ($S_0$), but an image of the azimuth accurately reveals their angular orientations. Moreover, the DOP image shows that light passing through the sheets is polarized relative to the surrounding surface.

FIG. 4 (sections b-e) examines the polarization-dependence of specular reflection. When unpolarized light specularly reflects, it becomes partially polarized; the direction of this partial polarization is perpendicular to the plane of incidence in contrast to diffusely reflected light which remains unpolarized. In FIG. 4 section (b), a conventional soda bottle is imaged head-on. From an intensity image alone ($S_0$), nothing could be ascertained as to the bottle's shape, but the azimuth image displays smooth continuous change around the top of the bottle. This evidences the conical shape of a soda bottle top, and could be used to characterize its 3D shape; indeed, the polarized nature of specular reflection has been proposed as a means of depth imaging. FIG. 4 section (c) illustrates the same concept for a more complicated object—a face. The 3D nature of the face is not known a priori from the $S_0$ image (as opposed to, say, a mere printed photograph of a face), but the azimuth image traces its 3D contour and could be used in 3D facial reconstruction.

Finally, FIG. 4 sections (d) and (e) depict outdoor scenes. In (d) a bicycle is seen parked on a grassy field after rain on the Harvard campus. In front of it is a boundary between grass and asphalt, as well as a puddle. In the azimuth image, a very strong delineation is seen between the wet pavement, where the polarization direction is well-defined parallel to the ground, and the grass and puddle, where the azimuth is somewhat random because the reflection is diffuse. Moreover, the azimuth reveals the presence of an asphalt walkway in the rear of the image, which is difficult to see in the intensity image. In FIG. 4(e), a row of cars is photographed. Cars illuminated by sunlight are a favorite target of the polarization imaging literature because the windshields tend to yield strong polarization signatures. This is seen for all three cars in the azimuth image, where the windshields and auto bodies have definite polarization azimuths, and the DOP image, where light from the windshields is highly polarized relative to the rest of the car.

The examples contained in FIG. 4 prove natural and powerful applications of this device to machine vision, remote sensing, and other areas. Though these have been recognized in machine vision and polarization imaging before, the camera presented here requires no polarization optics beyond a single grating, can acquire data (e.g., all data needed for polarization analysis) simultaneously with no moving parts, can be used with a simple imaging sensor (with no micropolarizers), and can be made to be compact and mass-producible. Moreover, the method by which the grating was designed—just a single grating with an imaging lens—suggests that these types of gratings can be designed around existing imaging systems to create polarization-sensitive ones.

V. Conclusion

The present disclosure has motivated a hierarchical picture of polarization-dependent diffraction in paraxial Fourier optics that includes the scalar, vectorial, and tensorial regimes. The tensorial picture of diffraction describes diffractive elements that, rather than orders with simple scalar weights, can enact polarization-dependent behaviors $\{J_k\}$ on their diffraction orders. One can specify here to the case of $J_k$ that are polarization analyzers and motivated an optimization-based scheme for their design. One can fabricate two such gratings in the form of dielectric metasurfaces and presented a thorough characterization of their performance. Since these gratings analyze incident polarizations in parallel, they can be used to determine the polarization state of light. One can show how the gratings can be integrated into an imaging system to do this in a spatially-resolved fashion, producing a polarization camera with no additional polarization optics, moving parts, or specialized sensors. This camera was demonstrated in several photographic scenarios of practical interest.

This disclosure is an advance in the understanding and design of polarization-dependent diffractive optics beyond simple phase profiles. While polarization analyzers have been discussed herein, the tensorial approach presented is quite general: gratings implementing a wide variety of polarization operators (e.g., waveplates, and more exotic behavior) could be implemented. Moreover, the constraint of linearly birefringent elements is by no means fundamental, and with the freedom afforded by lithographic fabrication, elements with more complex polarization responses could be used to realize these behaviors. Finally, gratings enabled by this tensorial approach present a simple means of full-Stokes polarization imaging that can be extended to other imaging systems and wavelength regimes. Compact, passive devices such as the one presented here could enable the widespread use and adoption of polarization imaging in machine vision and related areas.

Supplement

S1. Mathematical Exposition

Here, one can attempt to provide a more fluid picture of the logic underpinning some of the methodology and results underpinning the approach to tensorial diffraction stated in the main text, offering clarity that space constraints there did not allow. In the course of this development, one can prove several results that were stated in the main text. This section is organized in order to make a parallel with the simpler case of scalar diffraction gratings which simply direct light in different directions in a way that is not polarization sensitive. The following begins with these.

A. Beam Splitting by Diffraction Gratings

A diffraction grating is an obstacle that varies periodically with space. Being periodic, light encountering a grating splits into a finite number of diffraction orders. If a diffraction grating having periodically-varying transmission function $t(x)$ is illuminated by a unit-amplitude plane wave normally incident on the grating, grating order k will/may propagate at an angle $$\theta_k = \arcsin\frac{k\lambda}{d}$$

where $\lambda$ is the wavelength of the illuminating light and d is the periodicity of the grating. Additionally, each diffraction order has a complex-valued scalar weight $a_k$ gives the amplitude of the electric field on that order and thus the intensity and efficiency of order k. This weight is given by the coefficient of the term $e^{-ikx}$ in the Fourier series of t(x):

$$a_k = \frac{1}{2\pi}\int_{-\pi}^{\pi} e^{-ikx}\tilde{t}(x)dx. \tag{S1}$$

Here, one can have taken $d=2\pi$ for convenience. A question which naturally arises is how a grating can be designed that splits an incoming plane wave into a finite number of orders with equal intensity (or, more generally, some specified weighting) or, equivalently, can combine a finite number of beams into one plane wave. This question is of practical importance for optical system design.

A grating that maps one input plane wave to one diffraction order will/can always be given by a linear phase ramp, in accordance with the Fourier transform shift theorem, so this is a trivial example.

The next simplest example would be to consider a grating in which light is equally split into two diffraction orders, say (for sake of demonstration), the first and zeroth orders. Then, the required transmission hologram is straightforwardly given by the sum:

$$\tilde{t}(x) = \frac{1}{\sqrt{2}}(1 + e^{ikx}). \tag{S2}$$

By mathematical construction, if a grating having this transmission function is illuminated by a normally incident, unit-amplitude plane wave, exactly two orders of equal strength will/can emerge. However, it is worth noting that this t(x) will/may not map the unit-amplitude plane wave into an output with uniform amplitude. Indeed, the power transmission function specified by $\tilde{t}(x)$ is now spatially-varying:

$$T(x)=\tilde{t}(x)*\tilde{t}(x)=1+\cos kx. \tag{S3}$$

FIG. 5 shows transmission functions demanded by a grating producing exactly two non-zero diffraction orders. The x axis is in units of d, the grating period. T(x) is plotted over one period of the grating d in FIG. 5. There is a symmetry that assures that $\int_0^d T(x)dx=1$ (overall energy conservation). This was accounted for in Eq. S2 with the factor $1/\sqrt{2}$. However, at some points a transmission above 1 is required, while at others, a transmission below 1 is demanded. While energy is conserved overall, it is not conserved point-to-point: gain and loss may be locally required. That is, this mandates a grating in which energy is globally conserved, but a redistribution of light among different parts of the grating unit cell is required.

At this point, one may wonder what would happen if only loss is implemented (it is practically easier to modulate local absorption). If Eq. S3 is scaled by a factor of ½, it will/can attain a maximum value of one (no gain) and only loss will/can be demanded (this is also depicted in FIG. 5, by a dashed curve).

However, this has a price: Now $\int_0^d T(x)dx=\frac{1}{2}$ and half of the incident energy must/can be absorbed by the grating to split the light into just two orders. If one generalizes to the case of N orders of equal intensity, it is easy to see that the power scaling factor will/may become 1/N to ensure loss-only amplitude modulation. In order to send light in N directions with a grating, must/can one accept an efficiency of $\eta=1/N$?

B. Beam Splitting by Phase-Only Scalar Gratings

Next, pose a somewhat related question. Is it ever possible to split light into a finite number of diffraction orders with 100% efficiency with no modulation of loss or gain? This would imply that the grating is phase-only, with $\tilde{t}(x)=e^{i\varphi(x)}$.

It is possible to prove that a phase-only grating may (only) have one or infinitely many diffraction orders, and so, a phase-only grating can never be the solution to the general beam splitting scenario laid out above. One can prove this here. The proof proceeds by contradiction.

In what follows, one can assume that the grating is illuminated by a unit-amplitude plane wave so that the field following the grating is also $e^{i\varphi(x)}$. Let the grating order coefficients (the Fourier coefficients) of the periodic grating be given by the set $\{a_k\}$. Furthermore, assume that all diffraction orders of the grating for which $a_k=0$ lie between k=m and k=n, with n>m. Suppose n−m=N. The phase-only grating can then be written as a Fourier expansion $$e^{i\phi(x)} = \sum_{k=m}^{n} a_k e^{ikx}. \tag{S4}$$

Being phase-only, one can have $$e^{-i\phi(x)}e^{i\phi(x)} = 1 = \sum_{k=m}^{n}\sum_{\ell=m}^{n} a_\ell^* a_k e^{i(k-\ell)x}. \tag{S5}$$

Clearly, the sum may possess no amplitude modulation (it may have no dependence on x). All exponential terms for which k−l≠0 must cancel. One can write a system of equations:

$$a_m^* a_n = 0 \tag{S6}$$
$$a_m^* a_{n+1} + a_{m-1}^* a_n = 0$$
$$a_m^* a_{n+2} + a_{m-1}^* a_{n+1} a_{m-2}^* a_n = 0$$
$$\vdots$$
$$a_m^* a_{m-2} + a_{m-1}^* a_{m-3} + \ldots + a_{n+2}^* a_n = 0$$
$$a_m^* a_{m-1} + a_{m-1}^* a_{m-2} + \ldots + a_{n+1}^* a_n = 0$$
$$\sum_{k=n}^{m}|a_k|^2 = 1$$

There are N+1 conditions that must/can be fulfilled. The first equation assures that the highest order exponential does not contribute to the sum (this will/can be a term that goes as $e^{iNx}$). The next equation covers terms having exponentials of order N−1, and so forth. Finally, at the base of the system, one can obtain an equation for "first-order" exponentials where "nearest neighbor" grating order coefficients are multiplied together. The last equation assures that the DC term has unit magnitude; this can be interpreted as a statement of energy conservation.

Figures 6A, 6B:
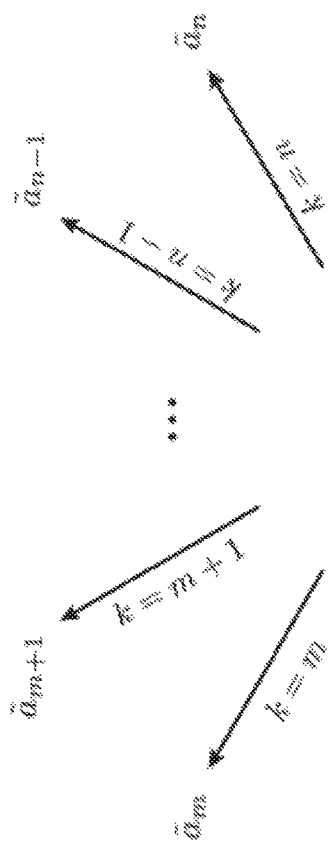
FIG. 6A shows schematic of diffraction into a finite number of orders between k=m and k=n by a diffraction grating, according to some embodiments.
FIG. 6B shows each equation in Eq. S20 examines the all pairs of orders separated by a given integer distance, starting with N in the first equation and proceeding downwards with the base case being nearest-neighbor diffraction orders, according to some embodiments.

FIG. 6A shows schematic of diffraction into a finite number of orders between k=m and k=n by a diffraction grating. FIG. 6B shows each equation in Eq. S20 examines the all pairs of orders separated by a given integer distance, starting with N in the first equation and proceeding downwards with the base case being nearest-neighbor diffraction orders.

The first equation implies that one of $a_m$ or $a_n$, the weights of the outermost diffraction orders, must/can be zero. Suppose one were to choose $|a_m|=0$. The next equation implies $|a_{m-1}|=0$, and the next that $|a_{m-2}|=0$. As one traces through the equations, one will/can eventually conclude that all coefficients must/can be zero except for $a_n$. Therefore, for a phase-only grating (if a finite number of terms is assumed), it may be that only one can have an intensity differing from 0 (there can also be an infinite number of diffraction orders). This is the familiar case of a blazed grating with a linear phase profile in x. A phase-only grating may also possess an infinite number of diffraction orders whose $a_k$ differ from zero; this case was not covered by the above proof because a finite number of orders between k=n and k=m was assumed.

C. Optimization of Phase-Only Gratings

The above proof shows that beam-splitting with a diffraction grating can never be accomplished with 100% efficiency. But it has not answered the question of whether one can do better than 1/N.

It stands to reason that since 100% of incident light passes through a phase-only grating, a high proportion of it could go into a limited set of diffraction orders with some leakage into all other diffraction orders. What is the best that a phase-only grating can do, concentrating as much light as possible in a limited set of desired diffraction orders while minimizing this leakage?

First, state the problem: Given a set of diffraction orders whose indices are given in the set $\{l\}$, find the function $\varphi(x)$ with period d that maximizes the efficiency functional $n(\varphi(x))$ given by:

$$\eta(\phi(x)) = \frac{\sum_{k \in \{l\}} |a_k|^2}{\sum_{k=-\infty}^{k=+\infty} |a_k|^2} \tag{S7}$$

under the constraints that the magnitude of coefficients $a_k$, and thus the power of the diffraction orders, are in a desired relative proportion. One can insist that $|a_k|=c\gamma_k$ for a constant c and a specified set of weights $\{\gamma_k\}$. The $\{a_k\}$ are given by Eq. S1.

This is inherently a problem of variational calculus. Along with the method of Lagrange multipliers (to address the constraints), it can be shown that the optimum phase function has the form $$h(x, \{\alpha_k\}, \{\mu_k\}) = e^{i\phi(x)} = \frac{s(x, \{\alpha_k\}, \{\mu_k\})}{|s(x, \{\alpha_k\}, \{\mu_k\})|} \tag{S8}$$

TABLE S1

| N | $\eta_{phase}$ | $\eta_{loss}$ |
|---|---|---|
| 2 | 0.8106 | 0.500 |
| 3 | 0.9256 | 0.3333 |
| 4 | 0.9119 | 0.2500 |
| 5 | 0.9212 | 0.2000 |
| 6 | 0.8817 | 0.1667 |
| 7 | 0.9684 | 0.1429 |

$$s(x, \{\alpha_k\}, \{\mu_k\}) = \sum_{k \in \{l\}} \mu_k e^{i\alpha_k} e^{ikx}. \tag{S9}$$

Table S1: Comparison of diffraction efficiency for gratings that implement the optimized phase-only gratings defined by Eqs. S8 and S9 ($\eta_{phase}$) and those that implement loss-only modulation ($\eta_{loss}=1/N$, as in FIG. 5) as a function of N, the number of diffraction orders into which light is directed. This assumes equal intensity on these orders for simplicity.

This gives an analytical form for the optimum. The weights $\mu_k$ and phases $a_k$ must/can be determined based on the constraints of the original problem. Romero & Dickey showed that this results in a system of 2N−3 (non-linear) equations, where N is the number of diffraction orders to be controlled, which can be numerically solved with, e.g., Newton's method.

Eqns. S8 and S9 are notable because they take the problem of finding the optimum, continuous grating phase function $\varphi(x)$, which is an infinite dimensional problem (defining the function at every point in the unit cell), and reduce it to one with a dimension of 2N−3 which is numerically easy to address.

In Table S1 one can compare the efficiency $\eta_{phase}$ obtained by a phase-only grating optimized using this approach with the efficiency $\eta_{loss}=1/N$ that would be realized with loss-only modulation, as discussed above, for the problem of equally splitting light into N diffraction orders. Even if there is no general proof showing that $\eta_{phase} > \eta_{loss}$ N, inspection of Table S1 suggests that this is indeed the case, and this appeals to intuition since a phase-only grating is lossless. It seems a phase-only grating can be more successful in splitting light than one designed with a more direct approach. Moreover, the phase-only approach is more compatible with readily accessible grating implementations, such as surface-relief gratings and, more recently, metasurfaces.

D. Parallel Polarization Analysis by Tonsorial Gratings

Here, one can use the tensorial approach introduced in the main text to examine diffraction gratings that implement polarization analyzers (polarizers) on their diffraction orders. These gratings were the focus of the main text. This section will closely parallel the development of Sec. S1 A. In one, it is desired to split light into (only) N diffraction orders. In this section, it is desired to do the same, but with polarization in mind. In particular, the light on order k should take on an intensity dictated by Malus' law as dictated by its preferred polarization $|q_k\rangle$.

More specifically, one can specify a set of diffraction orders $\{l\}$. For each order $k \in \{l\}$, one can specify that its tensorial Fourier coefficient $J_k$ should take the form $J_k = \tilde{a}_k |p_k\rangle$ ⟨q_k| where $\tilde{a}_k$ is a scalar weight, |q_k⟩ is the Jones vector of the polarization that the order analyzes for, and |p_k⟩ is the output polarization of the order, as in the main text.

For any choice of these parameters, one can follow the approach of the main text and immediately write $$J(\vec{r}) = \sum_{\vec{k}\in\ell} \tilde{a}_k |p_k\rangle\langle q_k| e^{i\vec{k}\cdot\vec{r}}. \tag{S10}$$

(For the sake of correspondence with the main text, the present disclosure casts this problem in 2D, but the same arguments would all hold in 1D.) By mathematical construction, this grating will/can have exactly N orders which each behave as polarization state analyzers for the proscribed polarization states {|q_k⟩}. At this point in Sec. S1 A, one computed the power required by the computed t(x) as T=$\bar{t}$*$\bar{t}$. What is the equivalent for the matrix quantity $J(\vec{r})$? The equivalent transmission is given by $$T = \tfrac{1}{2} Tr(J^\dagger J). \tag{S11}$$

Figure 7:
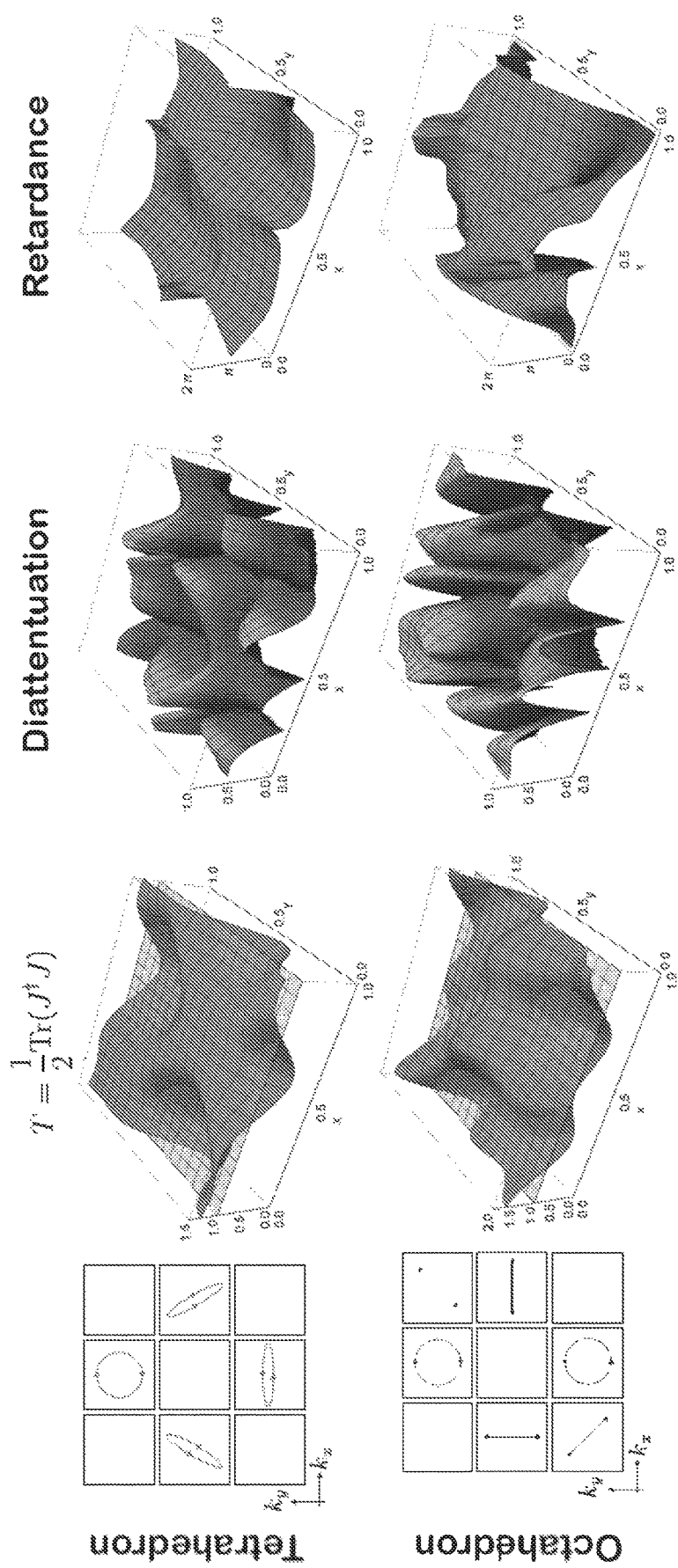
FIG. 7 shows, for each of the two cases, a grating analyzing for a tetrahedron (top) or octahedron (bottom) of polarization states, according to some embodiments.

Here, Tr is the matrix trace. This T is a power transmission averaged over all possible incident polarizations on the Poincaré sphere. In fact, T is the expression for the upper-leftmost element of the Mueller matrix M corresponding to J—this makes sense because this element of the Mueller matrix controls intensity transmission. It is also readily seen that if J is unitary (that is, if $J^\dagger J=1$), T=1 which is commensurate with the definition of a unitary matrix. Next, in analogy to the two beam splitting example of Sec. S1 A, one can compute the $J(\vec{r})$ by Eq. S10 for some specific example and examine what variation of T over the grating unit cell it involves. As these examples, one can choose two 2D examples in analogy with the gratings considered in the main text. In particular:

An ideal tetrahedron grating: This grating sends all light into just four diffraction orders. Each diffraction order acts as an analyzer for one of the four Jones vectors corresponding to the Stokes polarization states of a tetrahedron inscribed in the Poincaré sphere on the orders {l}={(0, −1), (0, 1), (1, 0), (0, −1)}. This is shown in the top left of FIG. 2A of the main text, and reproduced in FIG. 7. FIG. 7 shows, for each of the two cases in the main text, a perfect 2D tensorial grating analyzing for a tetrahedron (top) or octahedron (bottom) of polarization states is synthesized by means of Eq. S10—these polarization states and their corresponding diffraction orders are shown at the left, reproduced from main text FIG. 2A. Each grating yields a $J(\vec{r})$ over its periodic 2D unit cell that can be analyzed to yield the three plots at the right. These are, from left to right, T (the polarization-averaged intensity transmittance given by Eqn. S11, with a flat surface showing unity), the required diattenuation, and the required retardance. In some sense, this figure is analogous to FIG. 5 in matrix space. The orientation of the tetrahedron is not unique, but throughout this disclosure one can choose one in which one vertex is at the north pole of the sphere, corresponding to circularly polarized light, and another vertex is aligned along the S_1 axis of the Poincaré sphere. These two choices are enough to constrain the exact polarization states of the tetrahedron.

An ideal octahedron grating: This grating sends all light into six diffraction orders. Each diffraction order acts as an analyzer for one of the six Jones vectors corresponding to the Stokes polarization states of an octahedron inscribed in the Poincaré sphere on the orders {l}=(0, −1), (0, 1), (1, 0), (0, −1), (1, 1), (−1, −1). These polarization states are |x⟩, |45⟩, |135⟩, |R⟩, and |L⟩, perhaps the most familiar polarization ellipses. This is shown in the bottom left of FIG. 2A of the main text, and reproduced in FIG. 7.

In what follows, one will/can assume that for each order of these gratings, |p_k⟩=|q*_k⟩, that the output polarization on the diffraction order is the same as the polarization analyzed for except with flipped handedness. In the main text it was stated that this restriction is implied by the use of linearly birefringent waveplate-like elements in the realization of $J(\vec{r})$. This will/can be proven below, but one can already work under this assumption here.

For each of the two cases above, one can form the sum suggested by the Fourier expansion of Eq. S10. The last piece of this sum is the weight coefficients {$\tilde{a}_k$}. As shall be explained below, insisting on overall energy conservation and equal intensity diffraction orders means that all the {$\tilde{a}_k$} should be $1/\sqrt{2}$ in the tetrahedron case and $1/\sqrt{3}$ in the octahedron case. Next, one can examine the spatially-dependent transmission (cf. Eqn. S11) that these would require. This has been done in FIG. 7 for both the perfect tetrahedron and octahedron cases. For each of these examples, the polarization-averaged transmission ½ Tr($J^\dagger J$) is plotted, along with a flat plane representing unity. It can be shown that, in both examples $$\iint_{\vec{r}\in\Omega} \tfrac{1}{2} Tr(J(\vec{r})^\dagger J(\vec{r})) d\vec{r} = 1 \tag{S12}$$

where Ω denotes one unit cell of the grating, meaning that energy is conserved overall. This is built into the construction of this problem by choice of the {$\tilde{a}_k$}, as discussed in the next section, much like in the scalar case above where overall energy conservation was assured by energy conservation in the Fourier series. However, by inspection of the plots in FIG. 7, it can be seen that T is not unity everywhere in the unit cell. Just as in the simple scalar grating described above, amplitude gain is required at some places and loss at others in a way that preserves overall intensity but mandates a redistribution of intensity.

So far, this tensorial diffraction example has been completely analogous to the simple scalar example of Sec. S1 A. In that discussion a proposed solution to this problem is loss-only modulation. That notion can be extended to this case—if $J(\vec{r})$ is scaled down by $$\max_{\vec{r}\in\Omega} \tfrac{1}{2} Tr(J(\vec{r})^\dagger J(\vec{r})) \tag{S13}$$

each order will/can behave as an analyzer for the preferred polarization specified in the design with no local gain required, at the expense of an overall scaling in efficiency by the same factor.

These tensorial examples are not analogous in every way to the simple scalar case of Sec. S1 A, however. Being tensorial, a full 2×2 matrix quantity must/can be implemented at each point of the grating unit cell, so the scalar quantity T cannot paint a complete picture. In other words, the polarization transforming properties of the required $J(\vec{r})$ must/can be implemented at each point to achieve the desired functionality on each diffraction order.

This is shown in FIG. 7 as well. For each grating, the required diattenuation (a unitless ratio) and retardance (an angle) are plotted at each point in the unit cell. Diattenuation is the degree to which a polarization element acts like a polarizer. A diattenuation of 1 means that there is perfect transmission for one preferred polarization and perfect extinction for another. Retardance is the waveplate-like character of a Jones matrix which quantifies the amount by which one polarization is delayed relative to another. A general Jones matrix operator can have both of these properties at once, and not necessarily along the same axes. These quantities vary significantly, and rapidly, point-by-point across the unit cell. It can be seen that to directly implement the Jones matrix corresponding to Eq. S10, a medium that can control overall transmission amplitude as well as precise polarization properties would be rigorously required at each point.

Perfection as mandated by the expansion in Eq. S10, then, requires agile, complex control of polarization and amplitude in a way that varies quickly with space over the periodic unit cell. This presents a challenge to practical implementation with real materials and real structures, beyond the realm of mathematics. In the scalar example of Sec. S1 A, the present disclosure turned at this point to phase-only gratings, which could not solve the stated problem perfectly (in that some light had to leak into neighboring diffraction orders) but nonetheless could be implemented with practical diffraction gratings and could be shown to achieve high efficiencies in an optimized case.

Is there an equivalent in this tensorial example, a mathematical simplification of $J(\vec{r})$ corresponding to gratings that easily realized in practice?

E. Parallel Polarization Analysis by Linearly Birefringent, Tensorial Gratings In the next section, one can consider tensorial gratings in which $J(\vec{r})$ is constrained to act as a linearly birefringent, unitary matrix—that is, as a simple waveplate—everywhere. Structures of these kinds can be implemented simply with metasurfaces composed of dielectric pillars exhibiting form birefringence. If the dielectric has high index contrast with the surrounding medium, it may confine light in its interior. If the pillar's transverse profile has two perpendicular mirror symmetry axes (as is the case with, e.g., a rectangle), two modes will/can propagate in the pillar which, due to the anisotropy, will/can propagate with different indices. As a result, the pillar can behave as a waveplate-like element whose Jones matrix can be written as $$J = R(-\theta)\begin{pmatrix} e^{i\phi_x} & 0 \\ 0 & e^{i\phi_y} \end{pmatrix} R(\theta). \quad (S14)$$

Here, $R(\theta)$ is a 2×2 rotation matrix by the angle $\theta$ corresponding to the physical angle by which the pillar element is rotated. The phases $\varphi_x$ and $\varphi_y$ can be continuously and independently controlled by adjusting the transverse dimensions of the pillar's cross-section. A library of pillar dimensions $(w_x, w_y)$ and the phases $\varphi_x, \varphi_y$ they impart can be assembled by full-wave simulation, and the rotation angle $\theta$ can obviously take on any value between 0° and 360°. So, the present disclosure does not dwell on this here except to say that if $J(\vec{r})$ is everywhere of the form of Eq. S14 tensorial there exists a convenient, established medium for their practical realization.

In some embodiments, then, one can insist that the Jones matrix $J(\vec{r})$ of the tensorial grating should everywhere be of the form of Eq. S14. As described in the main text, Eq. S14 implies two specific restrictions:

$J(\vec{r})$ must/can be unitary everywhere. This implies that the local Jones matrix may modify polarization states but not intensity. A unitary matrix may delay the components of a Jones matrix relative in phase.

More specifically, $J(\vec{r})$ must/can be linearly birefringent. The eigenvectors of a unitary matrix are strictly orthogonal. However, these eigenvectors can be linear, circular, or elliptical—this requirement means they must/can always be linear.

1. Linear Biregringence Implies $|p_k\rangle = |q^*_k\rangle$

It is simple to show that Eq. S14 will/can always describe a symmetric matrix for any choice of $\theta$, $\varphi_x$, and $\varphi_y$ because the eigenbasis of J will/can always be a rotated version of the x/y system. In other words, the fact that J is linearly birefringent means that it is also symmetric in the x/y polarization basis (the basis in which Eq. S14 is written). If everywhere $J(\vec{r})$ is of the form of Eq. S14, $J^T(\vec{r})=J(\vec{r})$. It is also true that if many matrices which are themselves symmetric are added together, the resultant sum will/can be symmetric as well.

A grating formed from a spatially-varying Jones matrix has diffraction orders whose behavior can be described by a Jones matrix which is a Fourier integral of $J(\vec{r})$ over the grating unit cell. This Fourier transform is a weighted sum of symmetric matrices—if $J(\vec{r})$ is everywhere symmetric, all $J_k$, the Jones matrices governing the behavior of the diffraction orders, must/can be as well.

If one of the $J_k$ is to take the form of an analyzer, that is, if an order is to act like a polarizer in some embodiments, it must/can be symmetric. Under what conditions is an analyzer matrix symmetric? An analyzer Jones matrix is given by $J=\tilde{a}|p\rangle\langle q|$. Parameterizing the output polarization as $|p\rangle=[p_1 p_2]^T$ and the polarization being analyzed for as $|q\rangle=[q_1 q_2]^T$, one can have $$J = \tilde{a}|p\rangle\langle q| = \tilde{a}\begin{pmatrix} q_1^* p_1 & q_2^* p_1 \\ q_1^* p_2 & q_2^* p_2 \end{pmatrix} \quad (S15)$$

By inspection, this J is symmetric if $q^*_1 p_2 = g^*_2 p_1$, or if $p_1 = q^*_1$ and $p_2 = q^*_2$—succinctly, if $|p_k\rangle = |q^*_k\rangle$.

2. Relation to Comparative Work on "Metasurface Polarization Optics"

On the Poincaré sphere this means that the vector corresponding to $|p_k\rangle$ must/can be mirrored about the equator with respect to $|q_k\rangle$ or, physically, that its polarization ellipse must/can be the same shape with the electric field rotating in an opposite sense ("flipped handednesss").

This conclusion has been identified in comparative work in which the goal was to impart two independent phase profiles on an arbitrary basis of polarization states. That work did not operate under as general a framework as this one, making use of the scalar approach, designing gratings in which the output polarization is uniform when one of the polarization basis vectors is incident. That work can be cast in the tensorial framework presented here: If the polarization basis of interest is given by $|\lambda^+\rangle$ and $|\lambda^-\rangle$ with $\langle\lambda^+|\lambda^-\rangle=0$, then the spatially-varying Jones matrix of those works is given by $$J(x,y)=e^{i\phi^+(x,y)}|(\lambda^+)*\rangle\langle\lambda^+|+e^{i\phi^-(x,y)}|(\lambda^-)*\rangle\langle\lambda^-| \qquad (S16)$$

where $\varphi^+(x, y)$ and $\varphi^-(x, y)$ are the two phase profiles of interest to be experienced by the polarization basis $\lambda^+$ and $\lambda^-$ which are carried by the $0^{th}$ order of diffraction. Eq. S16 shows that any polarization basis can experience independent phase profiles, which is a sub-case of the tensorial approach of some embodiments. Consequently, the proof that $|p_k\rangle=|q^*_k\rangle$ for an analyzer produced in the diffraction pattern of a linearly birefringent grating given here is more general.

3. A Unitary, Linearly Birefringent Grating for Polarization Analysis May Only have Two Orders Acting as Analyzers In the scalar regime, it was possible to prove that a phase-only grating may have one or infinite diffraction orders. For two specific examples (the octahedron and tetrahedron gratings) complex amplitude and polarization control is used for an exact solution, encapsulated in FIG. 7. Can a linearly birefringent tensorial grating, which can be conveniently implemented practically, ever be the solution of the problem to solve? Can a tensorial grating ever direct all light into a finite number of orders whose Fourier matrix coefficients $J_k$ all behave as polarization state analyzers?

This proceeds in analogy to Sec. S1 A. Here, one can assume a 1D tensorial grating given by $J(x)$ (this can be generalized to 2D). Suppose all non-zero diffraction orders of the grating lie between $k=m$ and $k=n$, with $n>m$ with $n-m=N$. Each grating order $k$ has an operator $J_k$ which one can insist takes the form of an analyzer so that one can have $$J_k = \tilde{a}_k |p_k\rangle\langle q_k|. \qquad (S17)$$

The tensorial grating $J(\vec{r})$ is then defined by the set of scalar weights $\{\tilde{a}_k\}$ the set of output polarization states $\{|p_k\rangle\}$, and the set of analyzer polarization states $\{|q_k\rangle\}$. If one can insist that the grating is linearly birefringent, it follows that $\{|p_k\rangle\}=\{|q^*_k\rangle\}$. Now, one can write a Fourier series for $J(x)$ as $$J(x) = \sum_{k=m}^{n} \tilde{a}_k |q^*_k\rangle\langle q_k| e^{ikx}. \qquad (S18)$$

This grating must/can be unitary everywhere, and so one can form the product $J^\dagger(x)J(x)$:

$$J^\dagger(x)J(x) = \sum_{k=m}^{n}\sum_{\ell=m}^{n} \tilde{a}^*_\ell \tilde{a}_k |q_\ell\rangle\langle q^*_\ell|q^*_k\rangle\langle q_k| e^{i(k-\ell)x} = \mathbb{1}. \qquad (S19)$$

Here $\mathbb{1}$ is the 2×2 identity matrix. As before, if the matrix product is independent of the spatial coordinate $x$, all exponential terms for which $k-l\neq 0$ must/can cancel. This permits a regrouping of the sum as $$\tilde{a}^*_m \tilde{a}_n |q_m\rangle\langle q^*_m|q^*_n\rangle\langle q_n| = 0 \qquad (S20)$$
$$\tilde{a}^*_m \tilde{a}_{n-1}|q_m\rangle\langle q^*_m|q^*_{n-1}\rangle\langle q_{n-1}| + \tilde{a}^*_{m+1}\tilde{a}_n|q_{m+1}\rangle\langle q^*_{m+1}|q^*_n\rangle\langle q_n| = 0$$
$$\tilde{a}^*_m \tilde{a}_{n-2}|q_m\rangle\langle q^*_m|q^*_{n-2}\rangle\langle q_{n-2}| + \tilde{a}^*_{m+1}\tilde{a}_{n-1}|q_{m+1}\rangle\langle q^*_{m+1}|q^*_{n-1}\rangle\langle q_{n-1}| + \tilde{a}^*_{m+2}\tilde{a}_n|q_{m+2}\rangle\langle q^*_{m+2}|q^*_n\rangle\langle q_n| = 0$$
$$\vdots$$
$$\tilde{a}^*_m\tilde{a}_{m+2}|q_m\rangle\langle q^*_m|q^*_{m+2}\rangle\langle q_{m+2}| + \tilde{a}^*_{m+1}\tilde{a}_{m+3}|q_{m+1}\rangle\langle q^*_{m+1}|q^*_{m+3}\rangle\langle q_{m+3}| + \ldots + \tilde{a}^*_{n-2}\tilde{a}_n|q_{n-2}\rangle\langle q^*_{n-2}|q^*_n\rangle\langle q_n| = 0$$
$$\tilde{a}^*_m\tilde{a}_{m+1}|q_m\rangle\langle q^*_m|q^*_{m+1}\rangle\langle q_{m+1}| + \tilde{a}^*_{m+1}\tilde{a}_{m+2}|q_{m+1}\rangle\langle q^*_{m+1}|q^*_{m+2}\rangle\langle q_{m+2}| + \ldots + \tilde{a}_{n-1}|q_n\rangle\langle q^*_{n-1}|q^*_n\rangle\langle q_n| = 0$$
$$\sum_{k=m}^{n}|\tilde{a}_k|^2 |q_k\rangle\langle q_k| = \mathbb{1}$$

Figure 8B:
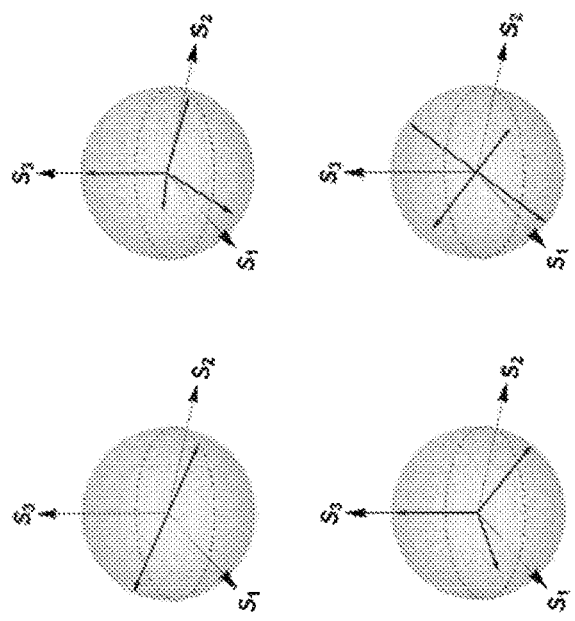
FIG. 8B shows some examples of analyzer configurations that obey a symmetry condition, according to some embodiments.
Figure 8A:
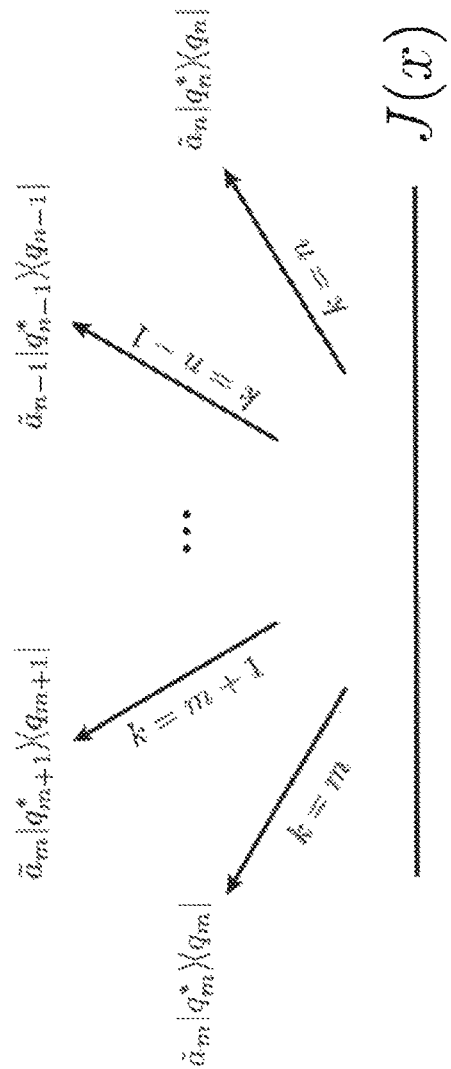
FIG. 8A shows parallel polarization analysis by a linearly birefringent tensorial grating, according to some embodiments.

Each equation in Eq. S20 examines the all pairs of orders separated by a given integer distance, starting with N in the first equation and proceeding downwards with the base case being nearest-neighbor diffraction orders. The imposing Eq. S20 is really no more complicated than Eq. S6 for phase-only gratings except that it involves matrix quantities, increasing the bulk of the mathematical notation. Each equation in Eq. S20 is the coefficient of one exponential in the expansion Eq. S19 and can again be understood with the aid of FIG. 6. At the top level, one can consider the term involving the most-distant-neighbors $k=m$ and $k=n$ and proceed downwards to the base case in which nearest-neighbors are considered. A schematic in FIG. 8A shows this pictorially, showing parallel polarization analysis by a linearly birefringent tensorial grating, using the same notation introduced in this section. Each order from $k=m$ to $k=n$ implements its own polarization analyzer matrix $J_k$.

Before considering the system Eq. S20 in its full complexity, it is worth remarking on the bottom line (reproduced here):

$$\sum_{k=m}^{n}|\tilde{a}_k|^2|q_k\rangle\langle q_k| = \mathbb{1}. \qquad (S21)$$

This is the "DC" term of the expansion. Since this term has no space dependence, it must/can account for the entire sum. This equation is a matrix statement of Parseval's equality from Fourier theory and is a statement of energy conservation in the tensorial grating. The outer product $|q_k\rangle\langle q_k|$ can be rewritten as $$|q_k\rangle\langle q_k| = \sqrt{1/2}(\mathbb{1} + \vec{q}_k \cdot \vec{\sigma})\langle q_k|q_k\rangle. \qquad (S22)$$

Here, $\vec{q}_k=[q_k^{(1)} \; q_k^{(2)} \; q_k^{(3)}]^T$ is the Stokes state-of-polarization (SOP) corresponding to the Jones vector $|q_k\rangle$. The SOP is the last three elements of the Stokes vector and gives the coordinates of $|q_k\rangle$'s polarization state on the Poincaré sphere. The vector $\vec{\sigma}=[\sigma_1 \; \sigma_2 \; \sigma_3]^T$ is a vector where $\sigma$ is the $k^{th}$ Pauli matrix. Assuming that all the $|q_k\rangle$ are normalized so that $\langle q_k|q_k\rangle=1 \forall k$, one can write from Eqs. S21 and S22

$$\sum_{k=m}^{n}\frac{|\tilde{a}_k|^2}{2}(\mathbb{1} + \vec{q}_k \cdot \vec{\sigma}) = \mathbb{1} \qquad (S23)$$

whose terms can be separated into the equations $$\sum_{k=m}^{n} \frac{|\tilde{a}_k|^2}{2} = 1 \text{ and} \quad (S24)$$

$$\sum_{k=m}^{n} \frac{|\tilde{a}_k|^2}{2} \vec{q}_k \cdot \vec{\sigma} = \mathbb{0} \quad (S25)$$

where $\mathbb{0}$ is a 2×2 matrix of zeros

Eq. S24 is a direct expression of energy conservation for this problem. In the case that all the orders are of equal strength (that is, that all $\tilde{a}_k = \tilde{a}$ with a constant), Eq. S24 implies that $$|\tilde{a}|^2 = \frac{2}{N} \quad (S26)$$

E where N is the number of diffraction orders that are to behave as polarization analyzers with $J_k = \tilde{a}|q^*_k\rangle\langle q_k|$. For each order in this equal-intensity case, $|a|$ is the percent of incident power directed into the order when its preferred polarization is incident and provides an upper bound for $I_q$ as defined in the text. There it was stated that for the tetrahedron grating with N=4 and the octahedron grating with N=6 the maximum value of $I_q$ for any order is ½ and ⅓, respectively. This follows here from Eq. S24.

Next turn to Eq. S25, which can be further reduced to yield $$\sum_{k=m}^{n} \frac{|\tilde{a}_k|^2}{2} \vec{q}_k = \vec{0} \quad (S27)$$

with $\vec{0}$ being a three-element vector of zeros. This is a symmetry condition. It says that the "center of mass" of the analyzer Stokes vectors $\{\vec{q}_k\}$ as weighted by their peak intensities $\{\tilde{a}_k\}$ must/can be at the center of the Poincaré sphere. In the case of equal intensities, the vectors $\{\vec{q}_k\}$ must/can be symmetrically distributed on the Poincaré sphere. A few examples of vector sets $\{\vec{q}_k\}$ that fulfill this condition are shown in FIG. 8B, which shows some examples of analyzer configurations $\{\vec{q}_k\}$ that obey the symmetry condition Eq. S27, including the tetrahedron of some embodiments. This makes sense intuitively: If the incident light is to be directed into a finite number of orders all of which behave as polarization state analyzers, the states analyzed by each order must/can be compatible with one another. If for some incident polarization one diffraction order is dark, the $|q_k\rangle$ of the other orders must/can assure that the lost light is directed there. These power and symmetry conditions Eqs. S24 and S27 are pre-conditions that must/can be satisfied.

Having examined just the DC term, one can return to the rest of Eq. S20. The top level equation N, $\tilde{a}^*_m \tilde{a}^*_{n-1} |q_m\rangle \langle q^*_m|q_n\rangle \langle q^*_n|=0$, which takes care of the exponential $e^{iNx}$, mandates that $\langle q^*_m|q^*_n\rangle=0$ (if orders m and n are to have non-zero weights $|\tilde{a}_m||\tilde{a}_n|$). Equivalently, $\langle q_m|q_n\rangle=0$ and the polarization states $|q_m\rangle$ and $|q_n\rangle$ analyzed by the outermost diffraction orders must/can be orthogonal.

The next equation, N−1 which addresses the term $e^{i(N-1)x}$ reads $$\tilde{a}^*_m \tilde{a}_{n-1}|q_m\rangle \langle q^*_m|q^*_{n-1}\rangle \langle q_{n-1}|+\tilde{a}^*_{m+1}\tilde{a}_n|q_{m+1}\rangle$$
$$\langle q^*_{m+1}|q^*_n\rangle \langle q_n|=0 \quad (S28)$$

stipulating that a sum of two matrix quantities is 0. For this to be accomplished without the requirement that $|a_{n-1}|=0$ and $|a_{m+1}|=0$, there are two possibilities:

1. Both $\langle *_m|q^*_{n-1}\rangle=0$ and $\langle q^*_{m+1}|q^*_n\rangle=0$, meaning that $|q_{n-1}\rangle=|q_n\rangle$ and $|q_{m+1}\rangle=|q_m\rangle$ (since the previous equation mandated $\langle q_m|q_n\rangle=0$).
2. The matrices $|q_m\rangle\langle q_{n-1}|$ and $|q_{m+1}\rangle\langle q_n|$ describe parallel matrices (that is, scaled versions of one another, so that they can add to 0 without both being zero). Since all the $\{|q_k\rangle\}$ are normalized, this implies that $|q_{n-1}\rangle=|q_n\rangle$ and $|q_{m+1}\rangle=|q_m\rangle$.

Both scenarios require that $|q_{n-1}\rangle=|q_n\rangle$ and $|q_{m+1}\rangle=q_m\rangle$, so one can accept this as a condition of solution. One can then proceed to the next equation, which weights an exponential of order N−2:

$$\tilde{a}^*_m \tilde{a}_{n-2}|q_m\rangle \langle q^*_m|q^*_{n-2}\rangle \langle q_{n-2}|+\tilde{a}^*_{m+1}\tilde{a}_{n-1}|q_{m+1}\rangle$$
$$\langle q^*_{m+1}|q^*_{n-1}\rangle \langle q_{n-1}|+\tilde{a}^*_{m+1}\tilde{a}_n|q_{m+2}\rangle$$
$$\langle q^*_{m+1}|q^*_n\rangle \langle q_n|=0 \quad (S29)$$

Since $|q_{n-1}\rangle=|q_n\rangle$ and $|q_{m+1}\rangle=|q_m\rangle$ and $\langle q_m|q_n\rangle=0$, $\langle q^*_{m+1}|q^*_{n-1}\rangle=0$ and the middle term can be eliminated. Now, the equation is exactly analogous to the last, and one can conclude that $|q_{n-w}\rangle=|q_n\rangle$ and $|q_{m+2}\rangle=|q_m\rangle$.

The equations proceed in this manner, with each equation successively mandating that a diffraction order one more index inwards from n must/can have its $|q_k\rangle=|q_n\rangle$, and one more inwards from m must/can have its $|q_k\rangle=|q_m\rangle$. To satisfy the Eqs. S20, the diffraction orders coming from the left side must/can all have the analyzer polarization $|q_m\rangle$ while from the right they must/can all have $|q_n\rangle$. Eventually, the right and left halves of the diffraction pattern meet.

FIG. 9 shows how a contradiction preventing the solution of Eqs. S20 emerges at the midpoint of the diffraction pattern. The first equation requires that the outermost diffraction orders take on orthogonal analyzer polarizations $|q_n\rangle$ and $|q_m\rangle$. Each successive equation mandates that one diffraction order closer to the center from the left or right take on $|q_m\rangle$ or $|q_n\rangle$, respectively (arrows, top). At the equation in Eqs. S20 dealing with terms that are half the diffraction pattern apart, two terms may survive (arrows, center) due to the orthogonality of analyzer vectors of the right and left halves of the diffraction pattern. In the case that N is odd, this equation mandates that the central order have an analyzer polarization state $|q_{cent}\rangle$ that takes on two states simultaneously (a contradiction). In the case that N is even, the inner two orders $|q_+\rangle$ and $|q_-\rangle$ are mandated by previous equations to be $|q_n\rangle$ and $|q_m\rangle$, but the next equation would require the opposite (also a contradiction). This midpoint contradiction can be avoided in the case that N=2 and $\langle q_m|q_n\rangle=0$.

In the case that N is odd, one can arrive at a unique "central" diffraction order whose analyzer polarization state $|q_{center}\rangle$ a does not clearly belong to the right or left half of the diffraction pattern. By examining the part of Eq. S20 that concerns diffraction orders that are (N−1)/2 integers apart, one can arrive at an equation that simplifies to $$\tilde{a}^*_n \tilde{a}_{center} |q_n\rangle \langle q^*_n | q^*_{center}\rangle \langle q_{center}| +$$
$$\tilde{a}^*_{center} \tilde{a}_m |q_{center}\rangle \langle q^*_{center}|q^*_m\rangle \langle q_m| = 0 \quad (S30)$$

These terms can survive since the right and left halves of the diffraction pattern (FIG. 9, left) have orthogonal polarizations $|q_m\rangle$ and $|q_n\rangle$. By inspection, Eq. S30 requires a contradiction. Its solution would require that $|q_{center}\rangle$ is equal to both $|q_n\rangle$ and $|q_m\rangle$ simultaneously, an impossibility given that the first equation stipulates that $\langle q_n|q_m\rangle = 0$.

If instead N is even (FIG. 9, right), there is no clear "central" order, but instead a central pair of orders. In between the two is the place where the $|q_k\rangle = |q_n\rangle$ and $|q_l\rangle = |q_m\rangle$ regions meet. Since there is no central order, it would appear that in this case there is no contradiction. However, by examining the part of Eq. S20 that concerns orders that are N/2−1 orders apart, one can get an equation of the form $$\tilde{a}^*_- \tilde{a}_m |q_-\rangle \langle q^*_- | q^*_m \rangle \langle q_m| + \tilde{a}^*_n \tilde{a}_+ |q_n\rangle \langle q^*_n|q^*_+\rangle$$
$$\langle q_+| = 0. \quad (S31)$$

Here, the diffraction orders − and + are those just left and right of center, respectively, as depicted in FIG. 9, right (there is no one center order because N is even). All other terms are 0 in Eq. S31 since $\langle q_m|q_n\rangle = 0$, and the left and right halves must/can take on the analyzer polarizations of the outer orders $|q_m\rangle$ and $|q_n\rangle$. This same reason means that Eq. S31 contains a contradiction: Working inward from the outside, the equation weighting an exponential term one higher than that of Eq. S31 requires that $|q_-\rangle = |q_m\rangle$, and $|q_+\rangle = |q_n\rangle$, but Eq. S31 just the opposite, that $|q_-\rangle = |q_n\rangle$, and $|q_+\rangle = |q_m\rangle$. Once again a contradiction is encountered at the crossing over the midpoint of the diffraction pattern.

If there are any more than two orders with non-zero $\tilde{a}_k$, one will/can encounter this midpoint crossing problem depicted in FIG. S5. In essence, this stems from the mathematical fact that only two different polarization states can be orthogonal to one another. If, however, there are only two diffraction orders which act as analyzers for an orthogonal basis of polarizations $|q_m\rangle$ and $|q_m\rangle$ with $\langle q_n|q_m\rangle = 0$, then Eq. S20 can always be satisfied if the $\tilde{a}_k$ of these orders are both equal to ½ (which is required by the power and symmetry conditions Eqs. S24 and S27). One may claim that this derivation only considered cases in which all diffraction orders in the set between k=m and k=n have non-zero intensity, or $\tilde{a}_k \neq 0$. Can selectively "skipping" some diffraction orders (allowing some to have $|a_k|=0$) sidestep the contradiction that occurs at the midpoint? However, by skipping some orders, the location of the midpoint simply moves, and a contradiction still occurs. Solution can be obtained if all intermediate orders are "skipped" and just two orders are left.

One can thus show by contradiction that if a linearly birefringent (if the grating is not constrained to be linearly birefringent, just unitary, one is free from the requirement that $|p_l\rangle = |q^*_k\rangle$ and the argument presented here breaks down. There are cases in which multiple orders can behave as analyzers), unitary directs all incident light into a finite set of diffraction orders acting as polarization state analyzers, there may only be two such orders. These orders must/can be of equal strength and must/can analyze for orthogonal polarizations $|q_m\rangle$ and $|q_m\rangle$ such that $\langle _n|q_m\rangle = 0$.

S2. Optimization-Based Design of Tensorial Gratings for Parallel Polarization Analysis A fundamental conclusion of Sec. S1 is that its direct implementation would involve complex spatially modulated amplitude and polarization behavior. In analogy with phase-only gratings in the scalar case, it is tempting to seek a solution that is unitary and linearly birefringent everywhere because this has a very straightforward, proven practical implementation in the form of dielectric metasurfaces which implement Jones matrices that are everywhere of the form of Eq. S14. In Sec. S1 it was also proven at some length that a linearly birefringent, unitary grating can never perfectly be the solution being sought—if all light is directed into a finite set of orders behaving as analyzers (polarizers), there can (only) be two such orders and they must/can analyze for orthogonal polarizations with the latter constraint following from energy conservation.

Similarly, in the beam splitting problem, a phase-only grating can be shown to—mathematically—yield (only) one or infinite non-zero diffraction orders (Sec. S1 B). If an imperfect solution is nonetheless accepted, with some light leaking into unwanted orders, optimized solutions with high efficiency can nonetheless be obtained (Sec. S1 C). It is tempting to follow the same logic here. Can an optimized grating that is unitary and linearly birefringent everywhere implement analyzers for desired polarization states on a finite set of diffraction orders with high efficiency, minimizing leakage into other diffraction orders?

In the phase-only case, this optimization could be framed as an optimization under constraints and an analytical solution for the global optimum found using the calculus of variations (Sec. S1 C). An analogous approach applied to the (more complex) tensorial case at hand is, in theory, also possible. Instead, one can concoct a simple numerical scheme to search for an optimum. One begins by acknowledging that the scheme used here is not ideal—it may yield (only) a local maximum, and does not necessarily yield the best solution in a computationally sophisticated way. What one instead seeks to show here is that an awareness of the tensorial picture of diffraction allows gratings with almost arbitrarily specified functions that admit straightforward design and realization.

A. Development of an Optimization Scheme

1. Parameterization of the Grating Unit Cell

In some embodiments, one can concern oneself with rectangular unit cells (actually, square in the gratings experimentally presented). These gratings are to be realized with a discrete grid of structures are denoted to be A×B in size where A and B are integers. The discrete element (a, b) in the grating will/can have a local Jones matrix J that takes the form of Eq. S14. The local J can then be defined by three parameters at each position: $\varphi_x$ (the phase imparted on light polarized along the local x axis of the element), $\varphi_y$ (the phase imparted on light polarized along the local y axis of the element), and $\theta$ (the angular orientation of the element). Each of these could be parameterized by the continuously varying functions $\varphi_x(\vec{r})$, $\varphi_y(\vec{r})$, $\theta(\vec{r})$ over the grating unit cell for the purposes of optimization and later sampled at the center of each position (a, b). Instead, one can acknowledge the spatially discrete nature of the ultimate metasurface implementation by parameterizing these three angles by a single number at each position in the A×B unit cell. This means that there will/can be A×B×3 parameters in total to optimize, three for each discrete polarization element of the grating.

At each discrete position (a, b) of the grating unit cell, the Jones matrix $J_{(a,b)}$ is given by $$J_{(a,b)} = R(-\theta_{(a,b)}) \begin{bmatrix} e^{i\phi_{x,(a,b)}} & 0 \\ 0 & e^{i\phi_{y,(a,b)}} \end{bmatrix} R(\theta_{(a,b)}). \tag{S32}$$

Here, $\theta_{(a,b)}$, $\phi_{x,(a,b)}$, and $\phi_{y,(a,b)}$ are the grating parameters at the $(a, b)^{th}$ location in the grating unit cell, R is the 2×2 rotation matrix. The spatially-dependent, periodic Jones matrix may then be written as $$J(x, y) = \left(\sum_{b=1}^{B}\sum_{a=1}^{A} J_{(a,b)} rect_{d_a,d_b}(x - a \cdot d_a, y - b \cdot d_b)\right) \circledast III_{A \cdot d_a, B \cdot d_b} \tag{S33}$$

where $d_a$ and $d_b$ are the inter-element separations along the x and y directions, respectively, and $rect_{da,db}$ $(x-a \cdot d_a, y-b \cdot d_b)$ is a function that is equal to 1 in a $d_a \times d_b$ rectangle about the point $(a \cdot d_a, b \cdot d_b)$ and 0 everywhere else. By using this rect box function in parameterizing the grating, one can presume that light above every polarization element experiences a uniform polarization element and the transition between adjacent elements is instantaneous. A more realistic model could be developed taking into account the radiation patterns of the actual metasurface polarization elements, which is not attempted here.

The symbol $III_{A \cdot d, B \cdot d}$ denotes an infinite 2D array of Dirac delta functions separated by the dimensions of one unit cell, $A \cdot d_a$ and $B \cdot d_b$ in x and y respectively. Convolution (denoted by $\circledast$) of the expression in parentheses which gives one unit cell of the grating with $X_{A \cdot d}a, B \cdot db$ is a way of expressing the infinite periodicity of the grating in 2D.

Given a grating which is fully defined by $\{\theta_{(a,b)}\}$, $\{\phi_{x,(a,b)}\}$, and $\{\phi_{x,(a,b)}\}$ (the set of these parameters at every discrete position in the unit cell), one can be interested in $J_{(m,n)}$ where $J_{(m,n)}$ is the $(m, n)^{th}$ coefficient in the Fourier series of the periodic function J(x, y). It is $J_{(m,n)}$ which gives the polarization-dependent behavior of diffraction order (m, n). $J_{(m,n)}$ is given by the projection of J(x, y) onto the $(m, n)^{th}$ grating order. Applying the convolution theorem to Eq. S33, this is given by $$J_{(m,n)} = \frac{\exp\left[-i\left(\frac{m}{A} + \frac{n}{B}\right)\right]}{AB} \tag{S34}$$

$$\sum_{b=1}^{B}\sum_{a=1}^{A} J_{(a,b)} sinc\frac{m}{A} sinc\frac{n}{B} \exp\left[-i\left(\frac{2am}{A} + \frac{2bn}{B}\right)\right] \text{ where}$$

$sinc(x) = sin(\pi x)/(\pi x)$.

Figure 10:
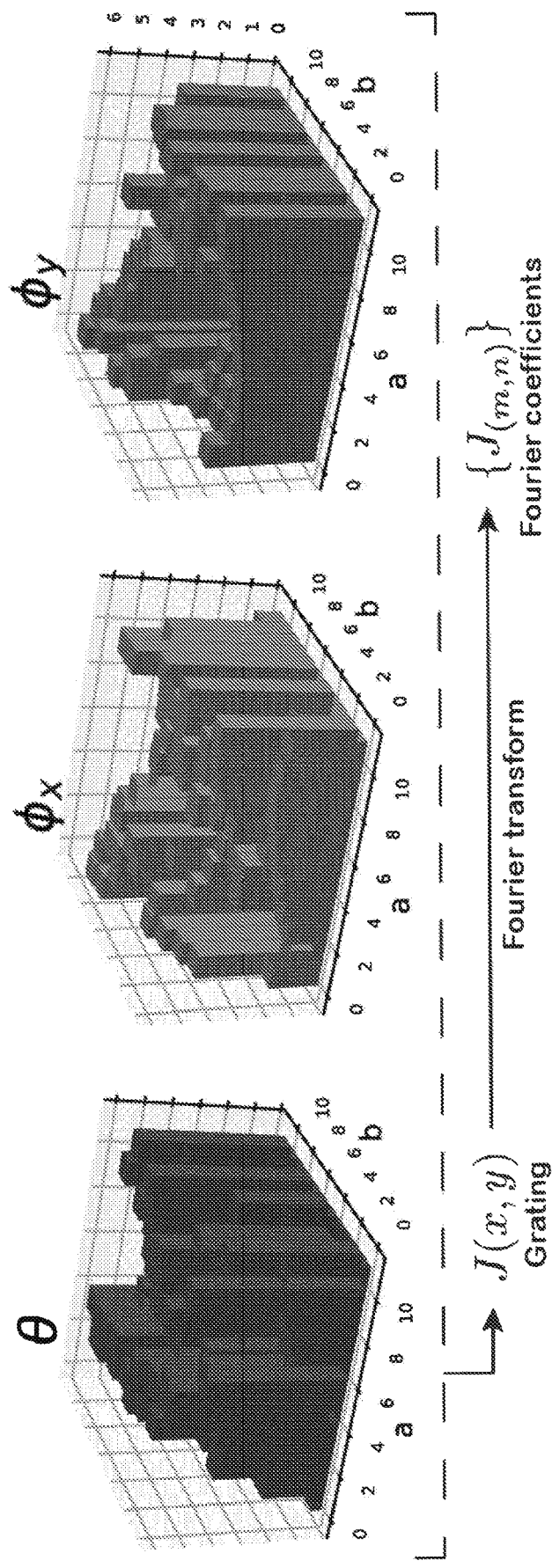
FIG. 10 shows a Fourier transform of a grating, according to some embodiments.

Given sets of parameters $\{\theta_{(a,b)}\}$, $\{\phi_{x,(a,b)}\}$, and $\{\phi_{x,(a,b)}\}$ defining the linearly birefringent waveplate at each point, one can then compute the Fourier Jones matrix coefficient $J_{(m,n)}$ for any (m, n). This is shown in FIG. 10. As shown in FIG. 10, at each discrete location (a, b) in the A×B grating unit cell (shown here for an 11×11 square grating) one can assume that there is a fixed value of $\theta$, $\phi_x$, and $\phi_y$. These are the parameters to be optimized. Together these define the expression for the Jones matrix over the grating and the Jones matrices $\{J_{(m,n)}\}$ of the diffraction orders, the Fourier coefficients.

2. Optimization

Eq. S34 permits analytical computation of the $J_{(m,n)}$ of the grating with knowledge of the A×B×3 parameters that define it at each point. Next, one can seek to address the inverse problem, that is to find the grating parameters that coax the $J_{(m,n)}$ to behave a certain way. First, one can state the optimization problem addressed here:

Problem. Given a set of grating orders (m, n)∈{l} and a corresponding set of Jones vectors $\{|q_{m,n}\rangle\}$ for which these orders should act as polarization state analyzers, find the parameters $\{\theta_{(a,b)}\}$, $\{\phi_{x,(a,b)}\}$, and $\{\phi_{x,(a,b)}\}$ at each location (a, b) of an A×B unitary, linearly birefringent grating that maximize the energy transmission into the orders {l} (minimizing leakage into all others) while mandating they behave as analyzers for the desired polarizations.

Figure 11:
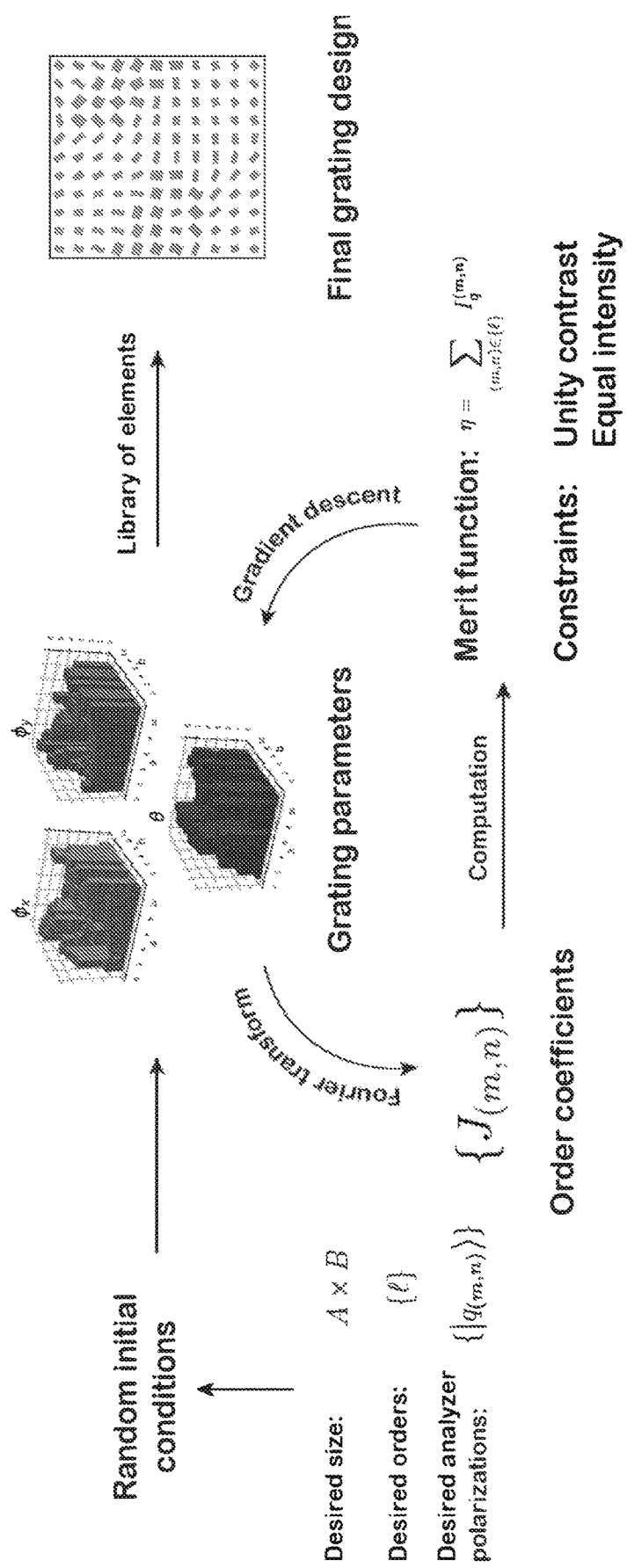
FIG. 11 shows an overview of the optimization-based design flow for the gratings of some embodiments, according to some embodiments.

FIG. 11 shows an overview of the optimization-based design flow for the gratings of some embodiments described in Sec. S2 A.

First, to solve the above problem, one can define the quantity $$I_q^{(m,n)} = \langle q_{(m,n)}|J_{(m,n)}^\dagger J_{(m,n)}|q_{(m,n)}\rangle \tag{S35}$$

$I_q^{(m,n)}$ gives the optical power (normalized to the incident power) on order (m, n) when its preferred polarization state $|q_{(m,n)}^T\rangle$ is incident. One can also define the polarization states $\{|q_{(m,n)}^T\rangle\}$ which are the polarizations orthogonal to those being analyzed, such that $\langle q_{(m,n)}^T|q_{(m,n)}\rangle = 0 \; \forall (m, n)$. That allows one to define the intensity:

$$I_{q,\perp}^{(m,n)} = \langle q_{(m,n)}^\perp|J_{(m,n)}^\dagger J_{(m,n)}|q_{(m,n)}^\perp\rangle \tag{S36}$$

$I_{q,\perp}^{(m,n)}$ gives the optical power (normalized to the incident power) on order (m, n) when $|q_{(m,n)}^T\angle$ is incident; ideally, this would be 0. Next, one can define the contrast of order (m, n) as $$\xi(m, n) = \frac{I_q^{(m,n)} - I_{q,\perp}^{(m,n)}}{I_q^{(m,n)} + I_{q,\perp}^{(m,n)}}. \tag{S37}$$

Ideally, this would be 1 for each order of interest so that the preferred polarization $|q_{(m,n)}\rangle$ is perfectly transmitted and the orthogonal polarization $|q_{(m,n)}^T\rangle$ is extinguished, in accordance with Malus' Law. Finally, one can define a merit function $$\eta = \sum_{(m,n)\in\{l\}} I_q^{(m,n)} \tag{S38}$$

Perform a gradient descent optimization of the A×B×3 parameters to maximize the merit function Eq. S38. This is done under constraints (using the method of Lagrange multipliers) that $$\xi_{(m,n)} = 1 \forall (m,n) \in \{l\} \tag{S39}$$

and $$\sigma(\{I_q^{(m,n)}\}) = 0 \forall (m,n) \in \{l\} \tag{S40}$$

where σ denotes the standard deviation operator. In words, optimizing the merit function Eq. S38 maximizes the total energy directed into the diffraction orders of interest and minimizes that leaked into other orders. The first constraint Eq. S39 forces the $J_{(m,n)}$ of the orders of interest into having the behavior of a polarization state analyzer for the desired polarization state by maximizing contrast for its desired polarization state. The second constraint Eq. S40 enforces that a situation will/may not occur in which one diffraction order is especially strong while others are very weak, encouraging an equal distribution of energy among the diffraction orders of interest.

Once the parameters of the unit cell have been optimized, J(x, y) can be constructed by Eq. S33 and the polarization-behavior of the diffraction orders $J_{(m,n)}$ examined by Eq. S34. Note that this procedure is purely a numerical scheme—it is not specific with regard to wavelength or any real optical material. Beyond the notion of the plane wave expansion, this representation of the grating does not contain any physics.

B. Results for 11-Element Grating

1. Progression of the Optimization

2. Optimized Results

Figure 12:
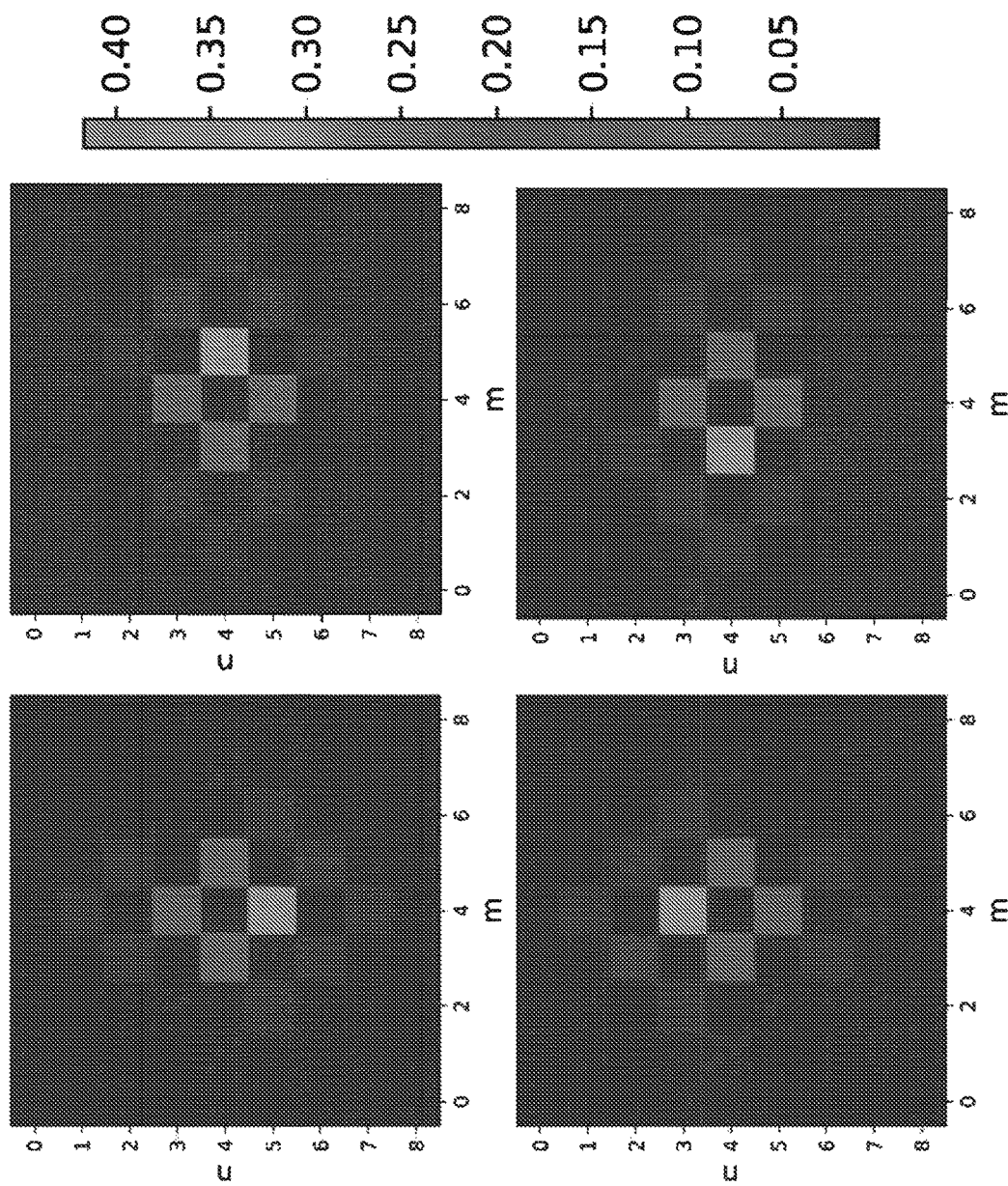
FIG. 12 shows calculated far-fields of an optimized tetrahedron grating, according to some embodiments.

The optimization yields $\{\theta_{(a,b)}\}$, $\{\varphi_{x,(a,b)}\}$, and $\{\varphi_{x,(a,b)}\}$. These can be translated into a spatially-varying Jones matrix by Eq. S33 and the Fourier coefficient matrices $J_{(m,n)}$ can found with Eq. S34. This can be done for many grating orders at once. For a particular incident polarization $|\lambda\rangle$, the power of each order can be calculated as $\langle \lambda | J_{(m,n)}^{\dagger} J_{(m,n)} | \lambda \rangle$. This permits plotting of the diffraction pattern predicted for the incident polarization $|\lambda\rangle$. For the optimized tetrahedron grating this has been done analytically in FIG. 12. FIG. 12 shows calculated far-fields of the mathematically optimized 11×11 tetrahedron grating when the four polarizations of interest are incident. For each diffraction order, the fraction of incident power directed there is given. It can be seen that in each case one order is very bright with most of the remaining intensity distributed among the other three orders, as desired. These plots show the innermost 64 orders. Each of the four plots in FIG. 12 corresponds to the diffraction pattern (the inner 64 diffraction orders) observed when each of the four preferred polarizations in $\{|q_{(m,n)}\rangle\}$ are incident. It can be seen that in each case, the corresponding diffraction order is very bright with most of the remaining intensity distributed equally into the other three design orders. This equal distribution is expected for the tetrahedron because its symmetry means that the projection of one vertex onto any of the others is identical. It can be seen that over 40% of the incident light is directed into a diffraction order when its preferred polarization is incident (recall from Eq. S26 that the maximum in the tetrahedron case is 50%). Leakage into orders outside of the central four is minimized.

Figure 13:
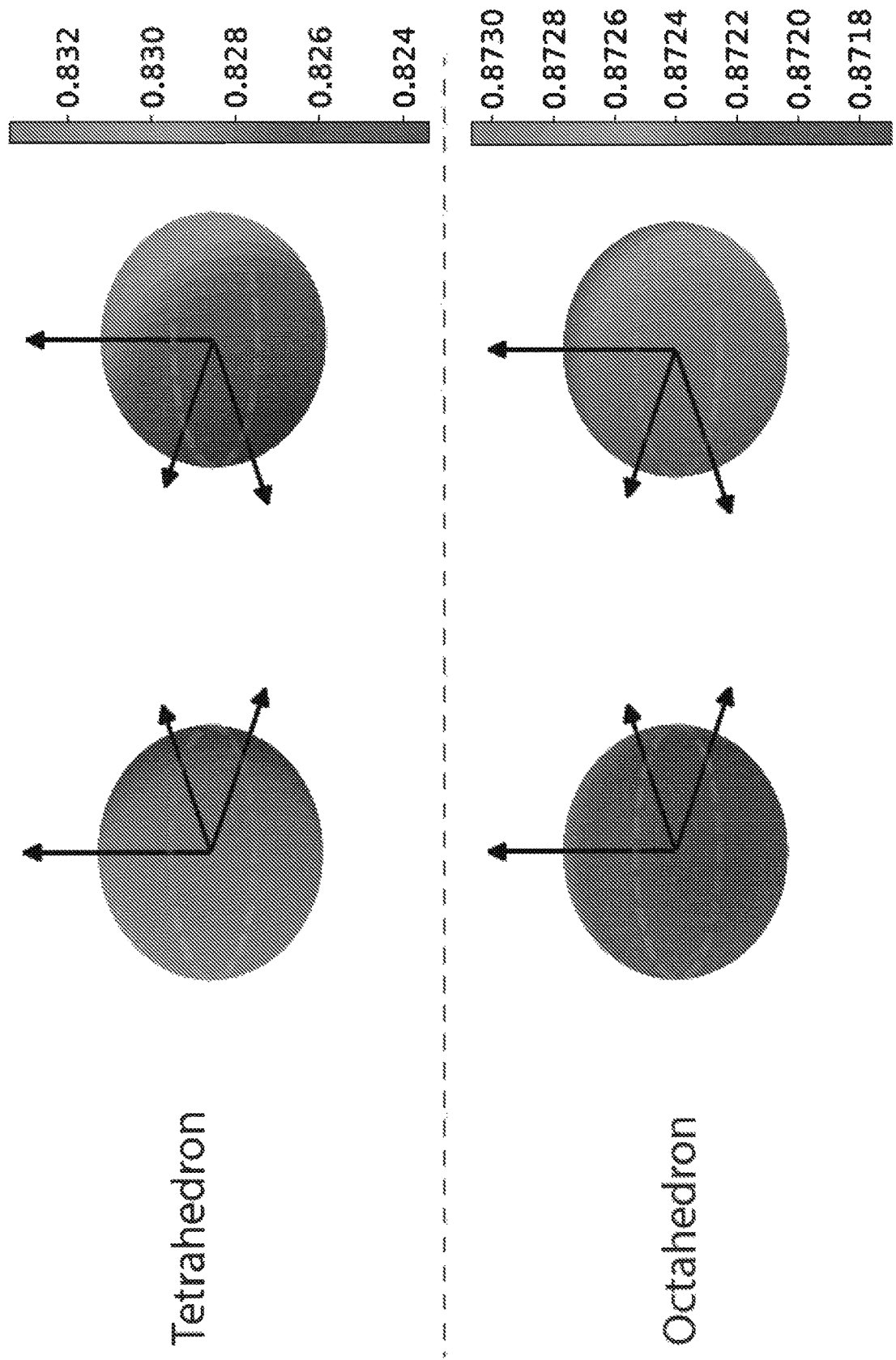
FIG. 13 shows optimized tetrahedron and octahedron gratings, according to some embodiments.

If one wants to assign a single efficiency figure to the optimized grating, one can do so by computing the fraction of the incident power contained in the diffraction orders of interest as a function of incident polarization. This has been done for the optimized 11-element tetrahedron and octahedron gratings with the results plotted as a function of incident angle on the Poincaré sphere in FIG. 13. FIG. 13 shows the mathematically optimized 11×11 tetrahedron and octahedron gratings are used to compute the fraction of power confined to the diffraction orders of interest as a function of the incident polarization state. The results are shown on the Poincare spheres (two views are shown for each case for clarity). In both cases, well over 80% of incident power is confined to the desired orders for all possible incident polarization states. It can be seen that for all possible incident polarizations, over 82% (or 87%) of power will/may be directed into the orders of interest in the tetrahedron (or octahedron) case. This high prediction is a testament to the success of this very simple optimization scheme and suggests that simple, linearly birefringent metasurface gratings are well-suited to this task even though they cannot achieve perfection.

C. Conversion to Metasurface Design

Once the grating is optimized by the scheme of Sec. S2 A, one can have the optimized sets $\{\theta_{(a,b)}\}$, $\{\varphi_{x,(a,b)}\}$, and $\{\varphi_{x,(a,b)}\}$ for each location in the unit cell of the diffraction grating. At each location, the geometry of a physical element implementing the desired $\varphi_x$ and $\varphi_y$ can be located in a material platform and wavelength of interest ($TiO_2$ and about 532 nm in some embodiments) and rotated by the angle θ. If many elements are simulated using full-wave numerical simulations (using, e.g., the RCWA or FDTD techniques), a library of elements can be assembled for which $\varphi_x^{actual}$, $\varphi_y^{actual}$, and overall transmission along x and y ($t_x$ and $t_y$) are known for each element geometry. Given a required $\varphi_x/\varphi_y$ pair, the quantity $$\left| t_x e^{i\phi_x^{actual}} - e^{i\phi_x} \right|^2 + \left| t_y e^{i\phi_y^{actual}} - e^{i\phi_y} \right|^2, \qquad (S41)$$

which is a sort of distance in complex space between desired and actual element performances, can be computed for each element in the library. The element which minimizes this distance is chosen. This can be done for each site in the grating unit cell, and the grating unit cell can be tesselated many times in the x and y directions to create the final grating.

S3. Experimental Characterization of Gratings

An important part of some embodiments is the claim that particular behaviors, being encapsulated in Jones matrices, can be embedded onto the orders of a diffraction grating allowing for arbitrary polarization-dependent functionality in parallel. In some embodiments one can focus on gratings whose orders act like polarizers, or polarization analyzers. Sec. S1 examined the mathematical restrictions of this problem, and Sec. S2 discussed an optimization-based design scheme for these gratings. Here, the present disclosure discusses how these gratings, once realized, can be tested to verify the extent to which the polarization-dependent behavior of each diffraction order matches the design.

Strictly speaking, this would involve the measurement of the Jones matrix of each diffraction order. The Jones matrix (and the Jones vector), however, are direct descriptions of the electric field which contain phase information of signals varying at optical frequencies. As such, they do not admit straightforward measurement. As a proxy, one can measure the Mueller matrix of each diffraction order because the Mueller formalism deals with beam which are directly measurable.

A. Fabrication

The gratings shown in some embodiments are based on dielectric metasurfaces consisting of rectangular $TiO_2$ pillars which operate across the visible range (certain embodiments disclosed herein implement λ=about 532 nm). Here, one can describe the fabrication of these gratings. However, note that some embodiments does not rely on any particular material, wavelength, or modality by which polarization-dependence is realized. Any polarization-dependent obstacle could fall under the formalism of some embodiments. The gratings are first written into an electron beam resist using a 125 keV electron beam lithography system. The resist is developed, and $TiO_2$ is deposited using atomic layer deposition (ALD) filling in the voids in the resist from the sidewalls. In addition to filling these voids, this creates an excess layer of $TiO_2$ on top of the pillars. This remaining oxide is etched away using a $Cl_2/BCl_3$ chemistry. Finally, excess electron beam resist is removed with a solvent, yielding free-standing pillars of $TiO_2$ which are about 600 nm in height.

Figure 14:
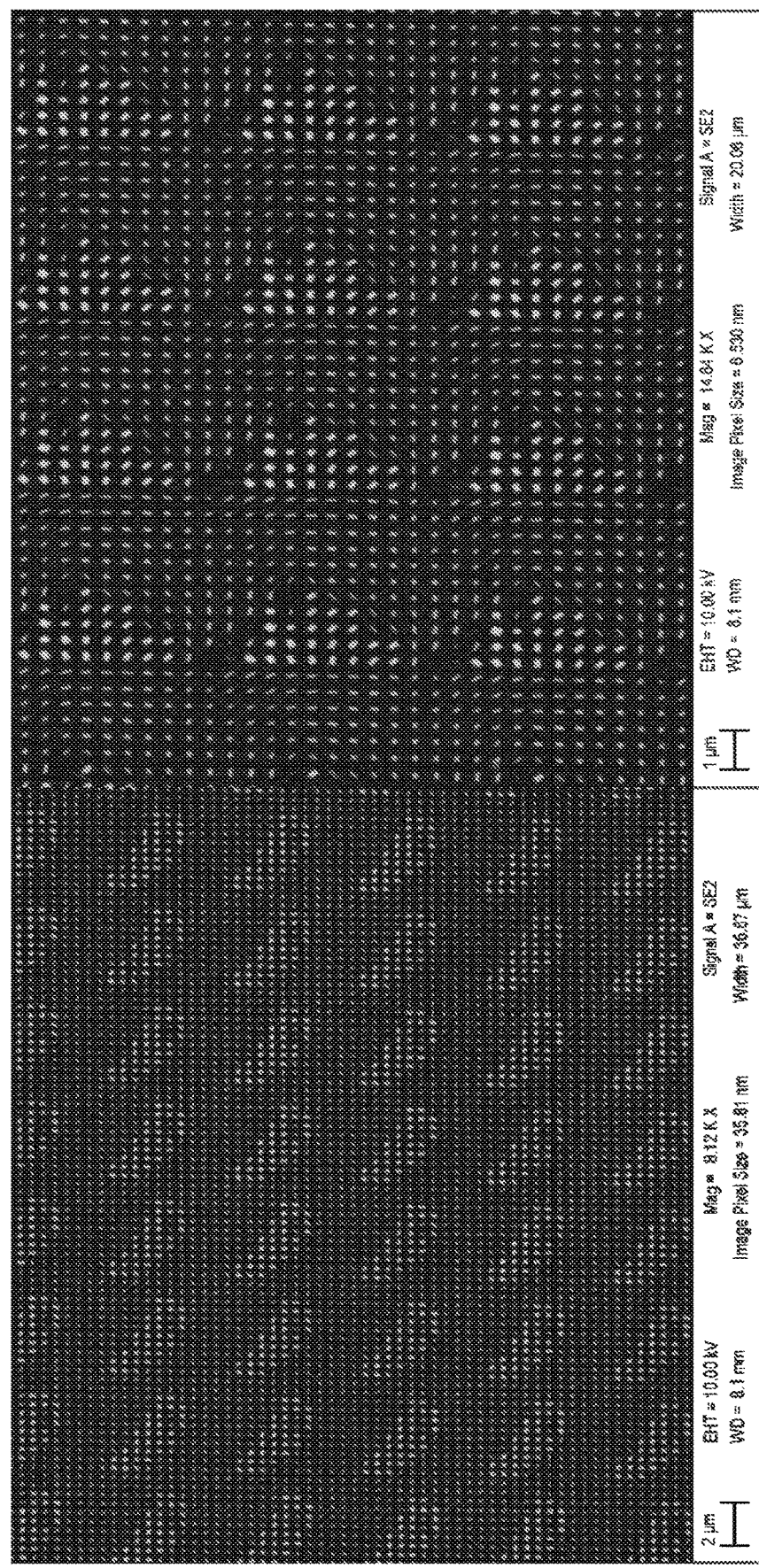
FIG. 14 shows scanning electron micrographs of octahedron and tetrahedron gratings, according to some embodiments.

In FIG. 14 one can provide additional SEM images of the two gratings considered in the main text. FIG. 14 shows additional scanning electron micrographs of the octahedron (left) and tetrahedron (right) gratings discussed in the main text.

B. Mueller Matrix Polarimetry

The process of measuring a sample's Mueller matrix is known as Mueller matrix polarimetry. For each grating order of interest (four of them in the tetrahedron case, six of them in the octahedron case) one can perform Mueller matrix polarimetry to measure the experimental Mueller matrix $\tilde{M}(m,n)$ of order (m, n).

The process involves illuminating the grating with a laser beam in a number of polarization states and observing the polarization and intensity of the outgoing beam with a full-Stokes polarimeter. If the polarization state of the incoming light is known, the transforming properties of the grating order can be deduced.

Figure 15:
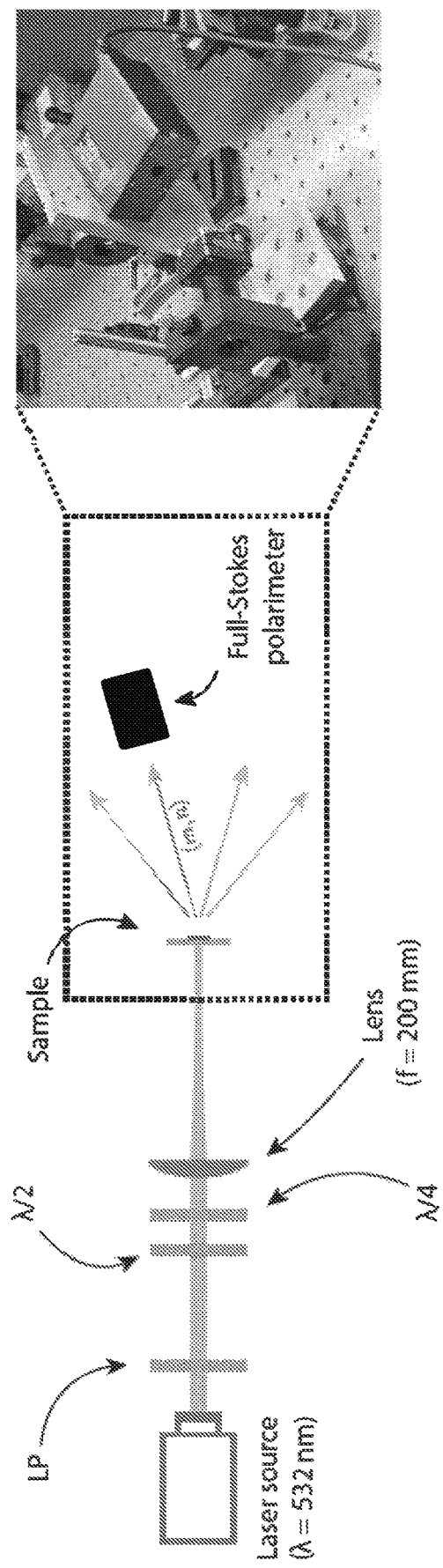
FIG. 15 shows Mueller matrix polarimetry, according to some embodiments.

Referring to the optical setup pictured in FIG. 15, FIG. 15 shows Mueller matrix polarimetry: optical setup for measuring the Mueller matrix $\tilde{M}(m,n)$ associated with grating order (m, n). The inset of FIG. 15 shows the full-Stokes polarimeter must/can "orbit" the sample on a spherical mount in order to see each grating order at normal incidence. A collimated laser beam (λ=about 532 nm) is passed through a linear polarizer (LP) to set a definite starting polarization state. This LP is aligned to the preferential polarization of the laser mode to maximize output power. Next, the beam encounters a half-wave plate followed by a quarter-wave plate. The angular orientations $\theta_{HWP}$ and $\theta_{QWP}$ of the waveplates are adjustable. K pairs of quarter and half-wave plate angular orientations are selected. The waveplates visit these angular orientations and the polarization state of the beam produced is recorded by a commercial full-Stokes polarimeter (the Stokes vector of the beam produced in the $k^{th}$ orientation is denoted by $\vec{S}_k$). One can refer to this procedure as the calibration of the experiment, and the results are stored in a calibration matrix $\tilde{C}$:

$$\tilde{C} = \begin{bmatrix} | & | & & | \\ \vec{S}_1^{in} & \vec{S}_2^{in} & \cdots & \vec{S}_K^{in} \\ | & | & & | \end{bmatrix} \quad (S42)$$

Here, $\tilde{C}$ is a 4×K matrix. In some measurements, K=16 and so 16 waveplate configurations are chosen so that the output beam covers the Poincare sphere more-or-less uniformly.

Next, the beam is allowed to illuminate the metasurface grating sample. Although the gratings are designed for normally incident plane-wave illumination, the beam first passes through a lens. Since the lens' focal length is very long (200 mm), the incident light is still plane wave-like. However, the lens means all incident light is confined to the boundaries of the grating (which at 500 μm 500 μm in size is quite small) so that measurements of the grating's efficiency can be made.

The full-Stokes polarimeter is placed so that it stares into grating order (m, n) it is particularly important that the polarimeter stares into the diffraction order of interest to redner an accurate measurement. A mount was constructed (inset, FIG. 15) that allows the polarimeter to move between diffraction orders while keeping the grating centered.

Next, the waveplates again visit all K orientations and the grating is illuminated with all of the polarizations recorded in $\tilde{C}$. The Stokes vector output on order (m, n) in response to the $k^{th}$ input polarization is recorded as $\vec{S}_k^{(m,n)}$ and all of these Stokes vectors are stored in the output matrix $\tilde{O}_{(m,n)}$:

$$\tilde{O}_{(m,n)} = \begin{bmatrix} | & | & & | \\ \vec{S}_1^{(m,n)} & \vec{S}_2^{(m,n)} & \cdots & \vec{S}_K^{(m,n)} \\ | & | & & | \end{bmatrix} \quad (S43)$$

Again, $\tilde{O}_{(m,n)}$ is a 4×K matrix. Note that it is the Mueller matrix $\tilde{M}_{(m,n)}$ of the grating order, the quantity desired to be measure, that maps the $k^{th}$ input polarization $\tilde{S}_k^{in}$ to the recorded polarization $\tilde{S}_k^{(m,n)}$:

$$\tilde{M}_{(m,n)} \vec{S}_k^{in} = \vec{S}_k^{(m,n)}. \quad (S44)$$

One can express this for all grating orders at once in matrix form:

$$\tilde{M}_{(m,n)} \tilde{C} = \tilde{O}_{(m,n)}. \quad (S45)$$

Since the matrix $\tilde{O}$ is not square (unless K=4), it cannot be inverted. one can use its (right) pseudo-inverse given by $\tilde{C}^\dagger (\tilde{C}\tilde{C}^\dagger)^{-1}$ where t denotes a Hermitian conjugate. Then, one can write $$\tilde{M}_{(m,n)} \tilde{O}_{(m,n)} \tilde{C}^\dagger (\tilde{C}\tilde{C}^\dagger)^{-1}. \quad (S46)$$

Eq. S46 represents the Mueller matrix of order (m, n) determined in the least-squares sense from the experimental data contained in $\tilde{C}$ and $\tilde{O}_{(m,n)}$.

1. Comparison of Optimized, Simulated, and Experimentally Measured Mueller Matrices In the main text, the properties of each diffraction order are compared in three domains: from the optimized spatially-varying J (obtained as described in Sec. S2), from a full-wave simulation, and from experiment (as described above).

From a Fourier transform of the analytical expression for $J(\vec{r})$ from the optimization, the Jones matrix of any desired diffraction order $J_{(m,n)}$.

The grating unit cells in some embodiments are simulated using finite difference time-domain (FDTD) simulation. A monitor is placed several wavelengths above the grating structure. The Jones vector of each physical diffraction order can be computed from the far-field projection of this monitor. If two-simulations are run—one for |x⟩ polarized illumination and one for |y⟩ polarized illumination—the Jones matrix $J_{(m,n)}$ can be determined. The Jones matrix is easy to directly reconstruct in the simulation case because phase information is preserved in the numerical simulation.

From experiment, however, one can obtain a Mueller matrix $\tilde{M}_{(m,n)}$, not a Jones matrix. For comparison, the Jones matrices obtained from the numerical optimization and full-wave simulation can be transformed into an equivalent Mueller matrix using the identity $$\tilde{M}_{j+1,k+1} = \tfrac{1}{2} Tr(J\sigma_k J^\dagger \sigma_j). \tag{S47}$$

Figure 16:
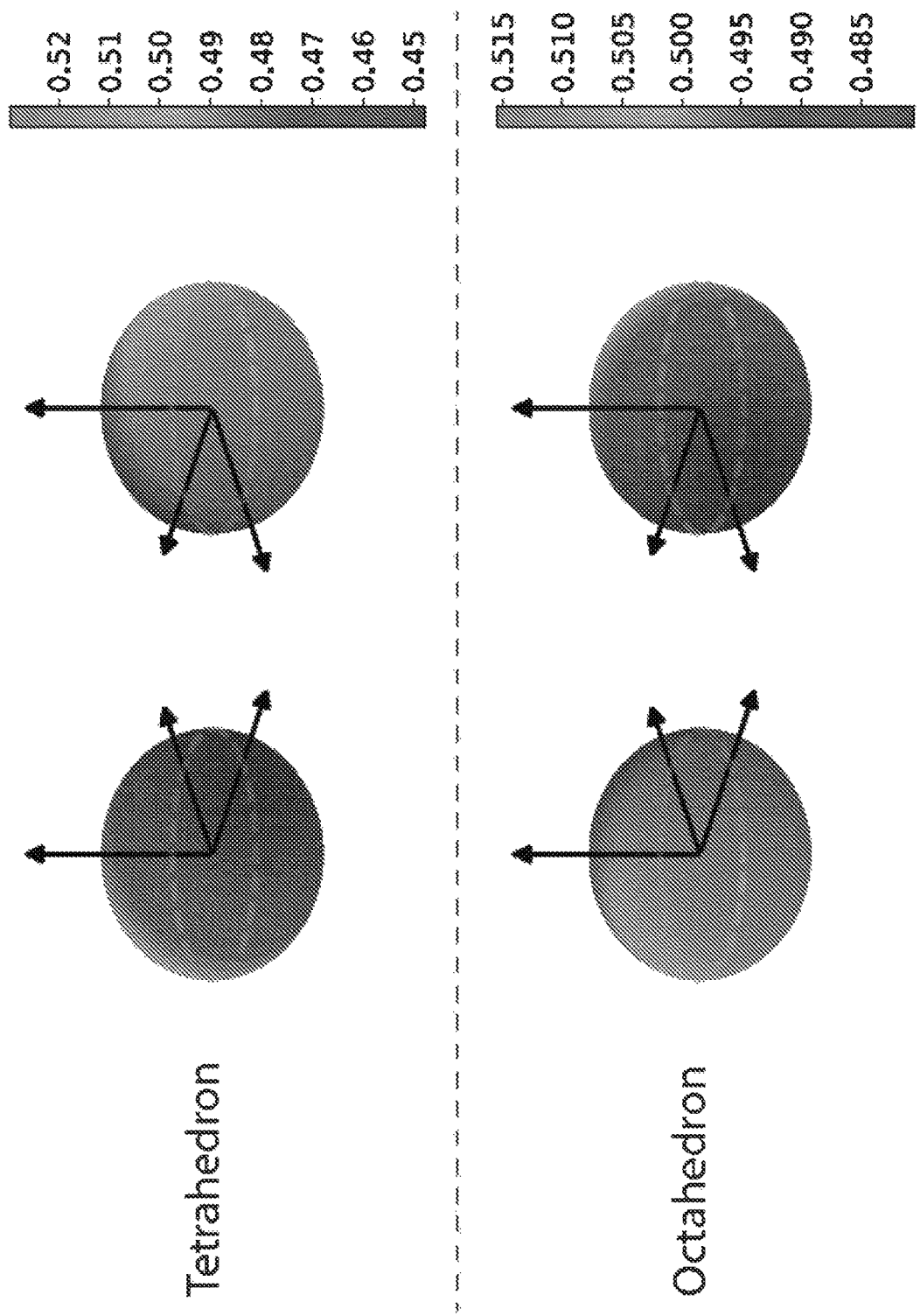
FIG. 16 shows a percentage of incident power directed into the four or six diffraction orders of interest, according to some embodiments.

Here, j and k are indices that run from 0 to 3 to cover all elements of the 4×4 Mueller matrix and $\sigma_i$ is the $i^{th}$ Pauli matrix (with go being the 2×2 identity matrix). FIG. 16 shows a percentage of incident power directed into the four or six diffraction orders of interest, as a function of incident polarization on the Poincaré sphere for the gratings experimentally measured in some embodiments. For both gratings this efficiency is above 45% for all possible incident polarizations. Two views are shown of each sphere for clarity.

C. Overall Grating Efficiency

The question of diffraction efficiency is one that naturally arises in some embodiments. The gratings here are polarization-dependent, so "efficiency" cannot be captured with one single number because the amount of incident light concentrated in the grating orders of interest is polarization-dependent.

The efficiency of diffraction into the orders of interest can be determined from the experimentally obtained Mueller matrices $\{\tilde{M}(m, n)\}$. The power in order (m, n) can be determined by operating on an incident Stokes vector $\vec{S}_{inc}$ with unit power and taking the first element of the resulting output Stokes vector. These can be summed over the orders of interest to get a measure of efficiency. This has been done in FIG. 16 as a function of all possible incident polarizations on the Poincare sphere. One can see that for both gratings efficiency is approximately 50%.

S4. Polarization Imaging

A. Optical Design of the Camera System

Some embodiments have so far been concerned with the design of gratings that split light based on its polarization. If the intensity of these diffraction orders is measured, the grating alone is sufficient to determine the polarization of the incident light as a full-Stokes polarimeter. This would permit the measurement of the polarization state of a laser beam. For a variety of practical applications—especially in remote sensing and machine vision—an imaging polarimeter, that is, a polarization camera, that allows for characterization of the Stokes vector of light forming every pixel of a photographic image is of far more interest.

Conceptually, the idea here is simple. The gratings presented here can split light based on its polarization state, so if the grating were incorporated into an imaging system, could it form four images of a scene on its diffraction orders that could later be combined pixel-wise in order to find a Stokes-vector polarization image of a scene in post-processing? The question then becomes how to incorporate the tensorial gratings of some embodiments into an imaging system to do this.

| Camera Parameter | Optimized Value |
|---|---|
| Grating angle | 7.28° |
| Radial phase profile | $\left(-231 \dfrac{\text{rad.}}{\text{mm.}^2}\right)\rho^2$ |
| Grating-lens separation | 11.5 mm |
| Lens-sensor separation | 3.9 mm |

Figure 17:
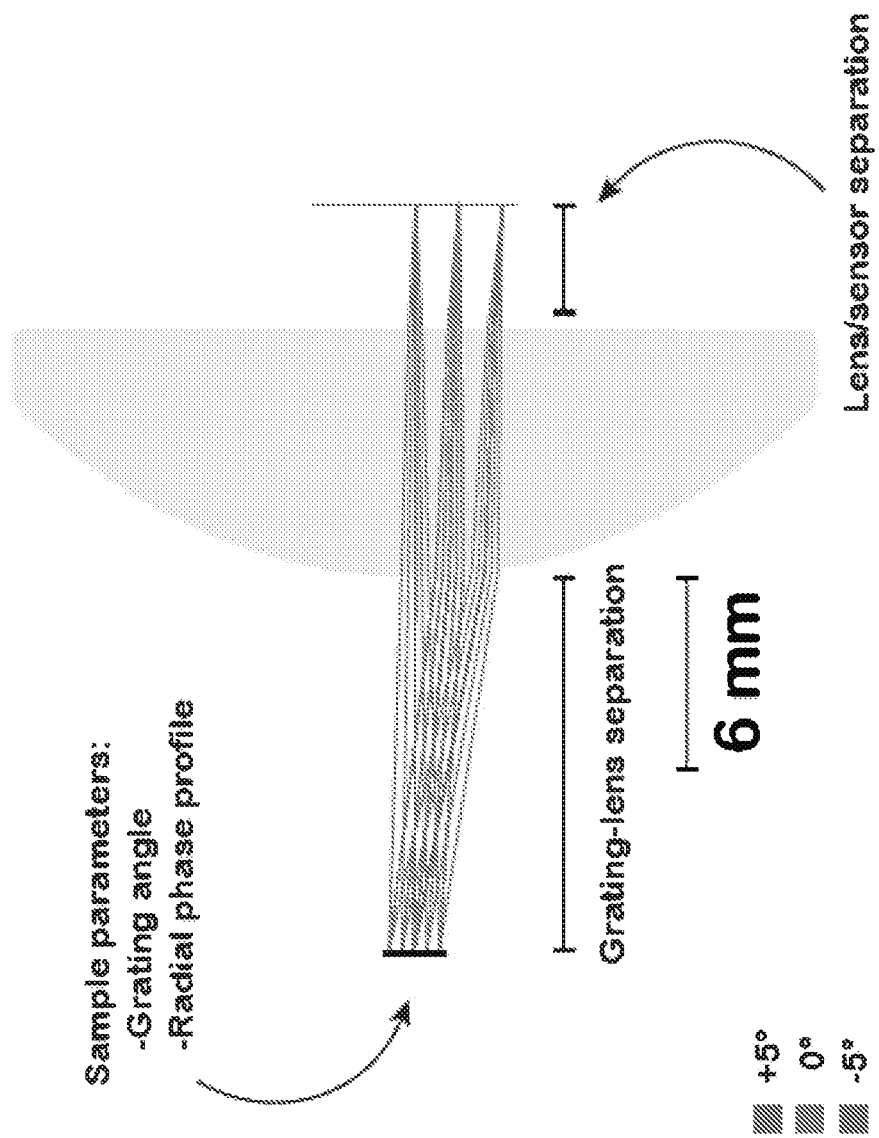
FIG. 17 shows a side-view schematic of a camera, according to some embodiments.

Table S2, showing optimized values of the variable parameters of the camera shown in FIG. 17. Here, ρ is the radial coordinate measured from the center of the lens in mm.

There is no one unique approach here. One can strive to show here that a simple full-Stokes polarization imaging system can be realized where all polarization optics is handled by a single diffraction grating and to demonstrate that this system can be used as a compact sensor in practical applications.

To that end, one can settle on a basic imaging architecture that includes just three elements—those being a grating sample, an off-the-shelf catalog lens, and a CMOS imaging sensor, in that order. The camera one can seek to design in some embodiments is infinite conjugate, it does not object an image at a given distance, but rather images objects that are very far away (measured relative to the focal length of any optics in the imaging system) so that ray bundles emanating from any point on the object can be thought of as parallel. Here, one can set the goal that the camera should image over a 10° (±5°) field-of-view (FOV), a modest goal that alleviates some constraints while still allowing for the imaging of real objects. For this imaging system, the FOV is the range of incident angles of ray bundles that can be imaged onto the sensor.

The tetrahedron grating from the main text is used in the camera. Its four diffraction orders implement analyzers that are sufficient for full-Stokes determination. Since the Stokes vector has four elements, four images are the minimum necessary for full-Stokes measurement. When mounted in the camera, the grating is turned 45° so that the orders deflect toward the corners of the imaging sensor, rather than toward the top, bottom, and sides.

FIG. 17 shows a side-view schematic of the camera considered here with all adjustable parameters labeled. Different colors here correspond to parallel ray bundles incident at different angles on the grating sample which are labeled in the key at bottom left. These are deflected from their original orientations before the sample by the grating (so that, e.g., +5° becomes nearly horizontal). The grating vector here is oriented at 45° so that one grating order is directed towards the corner of the imaging sensor. Not shown: 10 nm bandpass filter at λ=about 532 nm in front of the imaging system.

In the optical design procedure, one grating order is considered. If all aspects of the imaging system are symmetric about the optical axis, the imaging system will/may work identically for the three other orders by default in a way that is merely rotated by 90°, 180°, or 270°. The goal of the design is to take parallel ray bundles from the entire FOV (±5°) and focus them as well as possible within the bounds of one quadrant of the imaging sensor—the final result, the camera presented in the main text, is depicted in FIG. 17. As is shown there, one can have four degrees of freedom to exploit in accomplishing this task (once an off-the-shelf lens is chosen). These are the distance between the grating sample and the lens, the distance between the back plane of the lens and the imaging sensor, the grating angle (and thus period) of the sample, and an overall, azimuthally symmetric phase profile that is not polarization-dependent phase profile that can be imparted on top of the grating. This overall phase profile produces a weak lensing effect that can aid in imaging.

A ray trace of the system can be performed and these parameters can be varied by an optimization algorithm so that the −5°, 0°, and +5° ray bundles (or fields, in the terminology of ray tracing) are focused as well as possible at the plane of the imaging sensor under the constraint that they occupy the bounds of one quadrant. This "goodness" of focusing can be defined in terms of how many rays in the bundle fall within the Airy disk.

This optimization can be performed for many off-the-shelf lenses. The lens ultimately chosen (and depicted in FIG. 17) was ThorLabs part #AL2520. This is an aspheric lens with a focal length of f=20 mm (as of this writing listed here) made of the high-index optical glass S-LAH64. This lens was found to produce a high quality of focus throughout the FOV—it is perhaps unsurprising that an aspheric lens was found to be advantageous here. The complete optimized parameters of the system designed around the AL2520 asphere are listed in Table S2. It is curious that, though the focal length of the asphere is 20 mm, it may only be placed 3.9 mm from the imaging sensor in the final camera for image formation. This makes some intuitive sense: The imaging is not occurring in the center of the lens, but rather off-center where the gradient is steeper, decreasing the apparent focal length.

Not shown in FIG. 17 is a 10 nm bandpass filter at λ=about 532 nm in front of the camera. Everything in some embodiments, including this imaging, is monochrome. The grating is inherently dispersive and the inclusion of color complicates some embodiments. Note, however, that if an imaging sensor with a color filter is used, the approach presented here could be used for spectropolarimetry, or color polarization imaging (the different colors would form different images due to the dispersive nature of the grating).

A second element not depicted in FIG. 17 is an aperture whose size can be adjusted which is placed in front of the grating at some distance. This is used to control the FOV of the camera so that images do not overlap on the sensor and explains why the polarization images presented here are circular. Note that this aperture is used differently than apertures in traditional photographic imaging systems, since it is not in a Fourier plane and does not control the f number of the system. The aperture here possibly causes some mechanical vignetting which is not addressed in detail herein.

A 12-bit CMOS sensor is used here in order to increase the dynamic range of the system which is particularly helpful for indoor imaging.

The simplicity of the system enabled by this grating and the practical results it yields (with no traditional polarization optics) can be advantageous.

B. Angle-Dependent Calibration

The output of the camera is four copies of an image, each analyzed along different polarizations. What are these polarization states? These must/may be known to produce the pixel-wise polarization image $\vec{S}(x, y)$. Each pixel of the polarization image is actually a super-pixel of four pixels (how these are grouped and identified is known as image registration, and will/can be addressed in the next section).

The intensity at one pixel can be written as a vector $\vec{I}=[I_1\ I_2\ I_3\ I_4]^T$ where $I_1, I_2, I_3$, and $I_4$ are the pixel intensities from the individual sub-images. These intensities are the result of a projection of the incident light's polarization, $\vec{S}_{inc}$, onto the characteristic polarization of the quadrant k, $\vec{S}_k$. These characteristic polarizations can be grouped into the rows of a matrix $\tilde{A}$ so one can write $$\vec{I} = \begin{bmatrix} -\ \vec{S}_1\ - \\ -\ \vec{S}_2\ - \\ -\ \vec{S}_3\ - \\ -\ \vec{S}_4\ - \end{bmatrix} \vec{S}_{inc} = \tilde{A}\vec{S}_{inc}. \tag{S48}$$

In polarimetry, $\tilde{A}$ is known as the instrument matrix. If it is known, one can straightforwardly write that $\vec{S}=\tilde{A}^{-1}\vec{I}$. The process of determining this $\tilde{A}$ is known as polarimetric calibration.

Calibration of the polarization camera presented in some embodiments means determining the characteristic polarization of each quadrant. The camera presented here is infinite conjugate (it images objects that are imagined to be infinitely far away) and each pixel of the image corresponds to light incident from a given angular direction. Being a diffractive object based on nanostructures, it is possible to imagine that the characteristic polarization is a function of incident angle and so the instrument matrix itself must/can be a function of angle $\tilde{A}(\theta, \varphi)$. One can treat this empirically by utilizing a calibration procedure that can absorb angle-dependent effects.

Figure 18:
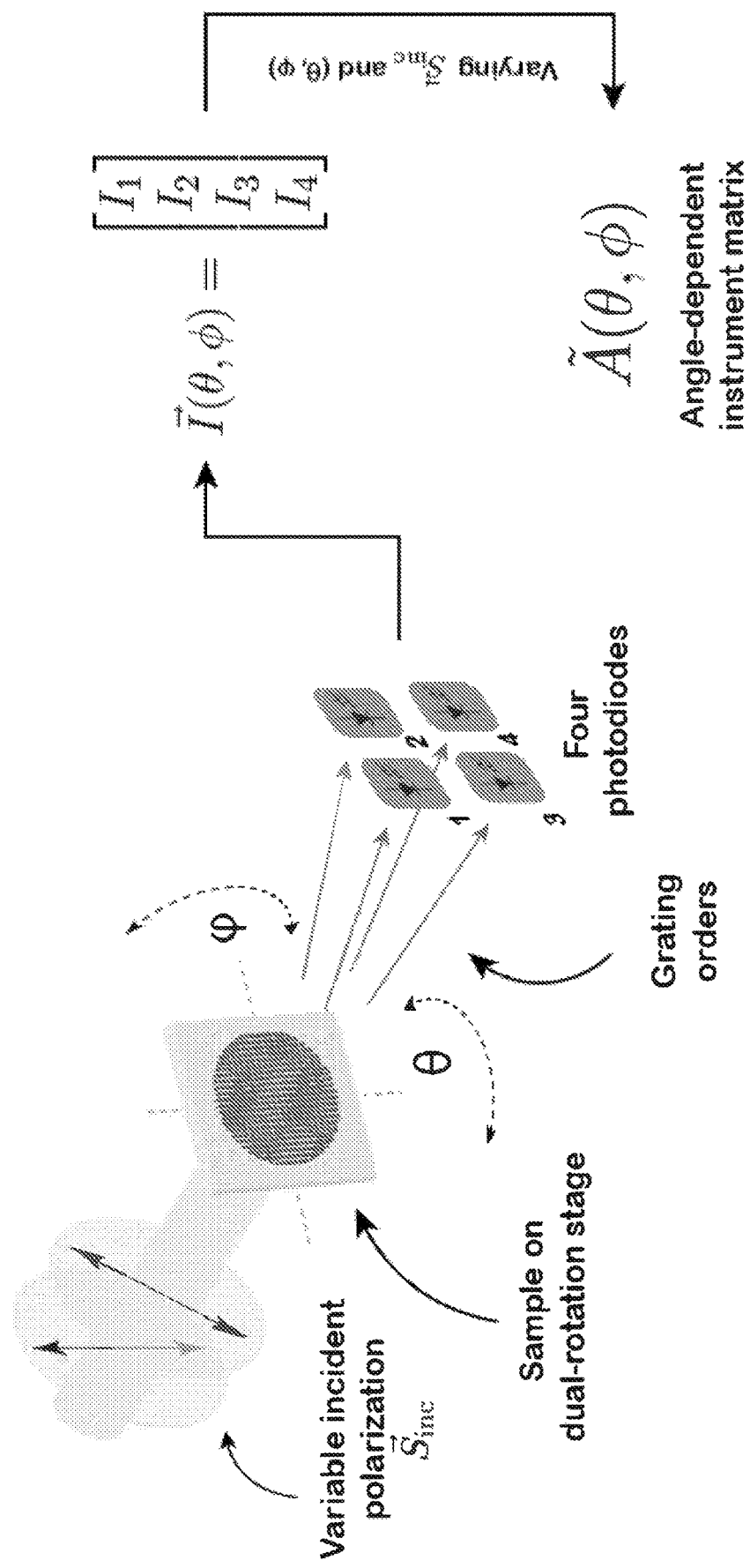
FIG. 18 shows an angle-dependent calibration, according to some embodiments.

FIG. 18 shows an angle-dependent calibration: The grating sample used in imaging is placed on a dual-rotation stage in front of a laser beam such that its orientation relative to the beam $(\theta, \varphi)$ can be adjusted. Light from the four diffraction orders to be used in imaging impinges on four photodiodes which report the intensity of the orders. The polarization of the laser beam is adjusted using waveplates and these photodiodes monitored, allowing for determination of the polarimetric instrument matrix $\tilde{A}$. This process is repeated at many different angular configurations $(\theta, \varphi)$ to determine the angle-dependent instrument matrix $\tilde{A}(\theta, \varphi)$.

This angle-dependent calibration is depicted in FIG. 18 and is conceptually very similar to the grating measurements discussed in Sec. S3 B and the main text. A collimated laser (λ=about 532 nm) beam whose polarization state $\vec{S}_{inc}$ can be adjusted with waveplates is incident on the grating. The grating is mounted on two rotation stages that are arranged so that the sample is located at the intersection point of the axes of these rotation stages. When the angles of these stages $(\theta, \varphi)$ are rotated it is as if light is incident on the grating from a different angular direction, as in the photography case. The grating is placed in its mount in the same orientation as it is placed in the camera system. At a given orientation of the stages $(\theta, \varphi)$ the polarization of the laser beam can be adjusted by waveplates to visit a number of fixed configurations where the $\vec{S}_{inc}$ is known (with a full-Stokes polarimeter, as in Sec. S3 B). The response of the imaging grating orders to the incident polarization is measured with four silicon photodiodes. If this is done for many incident polarizations, the instrument matrix at the configuration $(\theta, \varphi)$ can be found in a least squares sense by inversion (again as in Sec. S3 B).

This process is repeated at many angular positions (θ, φ) and the results are interpolated to yield the angle-dependent instrument matrix Ã(θ, φ). To be used in polarization image reconstruction pixel-by-pixel, the Ã(θ, φ) corresponding to each pixel must/may be known. This is described in the next section.

C. "Checkerboard" Image Registration

Since the camera is infinite-conjugate, each pixel (in each of the four quadrants) measures parallel ray bundles emanating from a specific angular direction (θ, φ). But, given a pixel coordinate (x, y) in the polarization image, how can one know its corresponding (θ, φ)? For that matter, since one has four copies of the image on the sensor, how does one align these to each other so that one knows which collections of four pixels on the sensor belong together? Once these questions are answered, one can form the polarization image as $\vec{S}(x, y) = \tilde{A}^{-1}(\theta, \varphi) \vec{I}(x, y)$—knowing the angular coordinates at each point permits use of the correct inverse angle-dependent instrument matrix $\tilde{A}^{-1}(\theta, \varphi)$ and correct image registration allows for the collection of the vector I(x, y) at each point.

Figure 19:
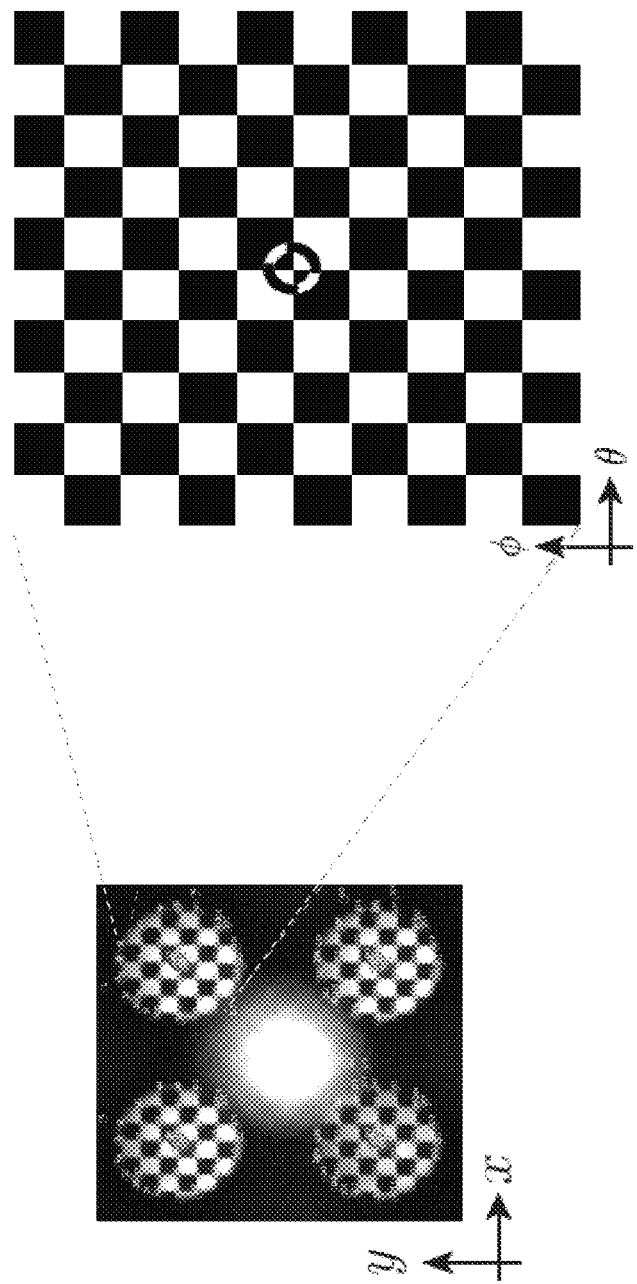
FIG. 19 shows an image of a checkerboard subjected to polarization analysis, according to some embodiments.

One can address both of these questions with one procedure which is depicted in FIG. 19. A checkerboard pattern is prepared in which each division corresponds to 1° of angle in the θ or φ directions when placed at a 14 inch viewing distance from the sample, and the center is well marked. This checkerboard is shown in the right inset of FIG. 19. The checkerboard here may appear as square and regular because it covers a narrow field-of-view (5°). Over a larger field-of-view it would appear considerably more distorted. The checkerboard is printed, mounted 14 inches from the camera, and illuminated with a green LED flashlight. A raw image of the checkerboard is acquired which is shown on the left of FIG. 19. The checkerboard in FIG. 19 appears to be out of focus. The checkerboard acquisition shown here was taken after outdoor photography—the configuration of the optics in the camera that renders faraway objects and the checkerboard (which is 14 inches away) in focus differs. However, the checkerboard acquisition must/can reflect the configuration of the camera when the images of interest were taken to assure proper image registration. This defocus does not present a problem.

FIG. 19 shows checkerboard image registration: a checkerboard pattern in which each division is 1° of angle in each direction is used as a calibration target for the camera. Corners are identified in the image and labeled, used to yield optimized functions mapping between pixel location (x, y) and angular coordinates (θ, φ) of light incident on the pixel.

This image undergoes adaptive thresholding to increase the contrast of the checkerboard. Next, the Harris corner detection algorithm is applied to the image and the coordinates of corner locations are noted and indexed (shown with dots in FIG. 19). These locations are labeled with angular coordinates (θ, φ) manually and a curve fitting algorithm is used to generate four functions—one for each quadrant of the imaging sensor—that map from pixel location (x, y) to angular coordinate (θ, φ).

These functions also contain the center position $(x_0, y_0)$ of each quadrant, information that can be used to super-impose the images on top of one another as a simple translation. In this way the images are very simply registered to one another.

D. Polarization Image Synthesis

The angle-dependent calibration yields the function Ã(x, y), the instrument matrix as a function of the angle of the incident ray bundle. The checkerboard image registration yields the functions θ(x, y) and φ(x, y) that show what angle in the field-of-view each pixel coordinate (x, y) corresponds to. Together, this yields the instrument matrix as a function of pixel coordinate Ã(x, y). This is shown in FIG. 20, which shows synthesis of a full-Stokes polarization image. Angle-dependent calibration and checkerboard image registration yield the instrument matrix Ã(x, y) as a function of pixel position (x, y).

Figure 21:
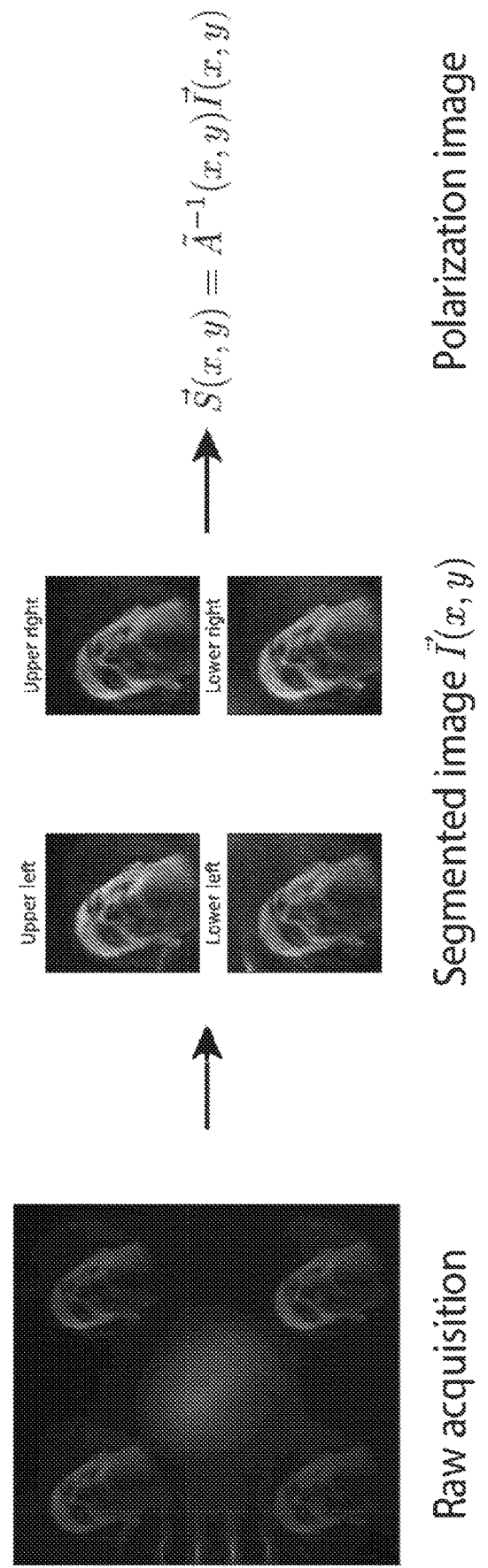
FIG. 21 shows a polarization process for an image, according to some embodiments.

As shown in FIG. 21, when a raw acquisition is taken, it can be segmented into four subimages and the Stokes vector $\vec{S}(x, y)$ computed as a function of position to form a final polarization image. When a raw acquisition is taken, the four quadrants can be registered to one another (the centers of these images are also known from the checkerboard image registration). This segmented image yields the four-element intensity vector $\vec{I}(x, y)$ where each element is one pixel drawn from the same place on all four quadrants. Finally, using the results of the calibration, the polarization image is calculated as $$\vec{S}(x,y) = \tilde{A}^{-1}(x,y) \vec{I}(x,y). \tag{S49}$$

In some embodiments, a metasurface grating includes a substrate and multiple nanoscale elements disposed on the substrate. The nanoscale elements define an angle-dependent phase profile that imparts a wavevector that varies depending on angles of incidence.

In some embodiments, a cross-section of at least one nanoscale element is rectangular or other polygonal shape. In some embodiments, a cross-section of at least one nanoscale element is elliptical or circular. In some embodiments, a cross-section of nanoscale elements can have a 2-fold rotational symmetry, or more generally, an n-fold rotational symmetry where n is an integer that is 2 or greater than 2.

In some embodiments, nanoscale elements are composed of a semiconductor, an oxide (e.g., a metal or non-metal oxide), a nitride (e.g., a metal or non-metal nitride), a sulfide (e.g., a metal or non-metal sulfide), a pure element, or a combination of two or more of these.

In some embodiments, a substrate is transparent in the visible spectrum, such as a polymer substrate, a glass substrate or one including fused silica. Suitable substrates that are transparent in the visible spectrum can have a light transmittance of at least about 40%, at least about 50%, at least about 60%, at least about 70%, at least about 80%, at least about 85%, at least about 90%, or at least about 95%, over the visible spectrum or a design or working wavelength in the visible spectrum.

In some embodiments, a substrate is curved or flexible, which offer alternative functionalities, for example to adjust the image distance to the eye or to focus light.

In some embodiments, nanoscale elements include a dielectric material. Examples of suitable dielectric materials include metal and non-metal oxides (such as an oxide of aluminum (e.g., $Al_2O_3$), silicon (e.g., $SiO_2$), hafnium (e.g., $HfO_2$), zinc (e.g., ZnO), magnesium (e.g., MgO), or titanium (e.g., $TiO_2$)), metal and non-metal nitrides (such as nitrides of silicon (e.g., $Si_3N_4$), boron (e.g., BN), or tungsten (e.g., WN)), metal and non-metal sulfides, and pure elements (e.g., silicon for operation at near-infrared and mid-infrared wavelengths).

In some embodiments, nanoscale elements have aspect ratios (e.g., height/width) greater than about one, such as at least about 1.5:1, at least about 2:1, at least about 3:1, at least about 4:1, or at least about 5:1, and up to about 10:1 or greater, or up to about 20:1 or greater. In some embodiments, geometric dimensions (e.g., height/width/length or diameter/height) of nanoscale elements are sub-wavelength, such as about 800 nm or less, about 700 nm or less, or about 600 nm or less.

In some embodiments, nanoscale elements are slanted nanopillars with a nonzero slant angle with respect to a surface normal of a metasurface grating. In some embodiments, the nonzero slanted angle is about 1 degree or greater, about 2 degrees or greater, about 5 degrees or greater, or about 10 degrees or greater.

As used herein, the singular terms "a," "an," and "the" may include plural referents unless the context clearly dictates otherwise.

Spatial descriptions, such as "above," "below," "up," "left," "right," "down," "top," "bottom," "vertical," "horizontal," "side," "higher," "lower," "upper," "over," "under," and so forth, are indicated with respect to the orientation shown in the figures unless otherwise specified. It should be understood that the spatial descriptions used herein are for purposes of illustration only, and that practical implementations of the structures described herein can be spatially arranged in any orientation or manner, provided that the merits of embodiments of this disclosure are not deviated by such arrangement.

As used herein, the terms "approximately," "substantially," "substantial" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, two numerical values can be deemed to be "substantially" the same if a difference between the values is less than or equal to ±10% of an average of the values, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified.

While the present disclosure has been described and illustrated with reference to specific embodiments thereof, these descriptions and illustrations do not limit the present disclosure. It should be understood by those skilled in the art that various changes may be made and equivalents may be substituted without departing from the true spirit and scope of the present disclosure as defined by the appended claims. The illustrations may not be necessarily drawn to scale. There may be distinctions between the artistic renditions in the present disclosure and the actual apparatus due to manufacturing processes and tolerances. There may be other embodiments of the present disclosure which are not specifically illustrated. The specification and drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations of the present disclosure.

What is claimed is:

1. An optical component comprising:
a substrate; and
a metasurface disposed on the substrate, the metasurface comprising one or more linearly birefringent elements,
wherein the one or more linearly birefringent elements define a grating configured to implement a parallel polarization analysis for a plurality of polarization orders for incident light of an arbitrary polarization, and
wherein the plurality of polarization orders corresponds to a tetrahedron inscribed in a Poincaré sphere.

2. The optical component of claim 1, wherein the grating is configured to implement the parallel polarization analysis without cascading the incident light through bulk polarization optics.

3. The optical component of claim 1, wherein the grating is not spatially interlaced with any other gratings.

4. The optical component of claim 1, wherein the metasurface is configured to output light and analyze four different polarizations in parallel, wherein none of the four different polarizations are orthogonal to any of the others.

5. The optical component of claim 1, wherein the one or more linearly birefringent elements comprise an array of dielectric pillars possessing form birefringence.

6. An optical component comprising:
a substrate; and
a metasurface disposed on the substrate, the metasurface comprising one or more linearly birefringent elements,
wherein the one or more linearly birefringent elements define a grating configured to implement a parallel polarization analysis for a plurality of polarization orders for incident light of an arbitrary polarization, and
wherein the plurality of polarization orders comprises six polarization orders corresponding to an octahedron inscribed in a Poincaré sphere.

7. An imaging system, comprising:
a metasurface comprising one or more linearly birefringent elements;
a lens; and
an imaging sensor,
wherein the metasurface is configured to provide, to the imaging sensor, a plurality of polarization orders sufficient for the imaging sensor to determine a full-Stokes vector, and
wherein the plurality of polarization orders corresponds to a tetrahedron inscribed in a Poincaré sphere.

8. The imaging system of claim 7, wherein the imaging sensor is configured to determine the full-Stokes vector using no polarization orders other than those provided by the metasurface.

9. The imaging system of claim 7, wherein the metasurface is a surface of a substrate, the substrate being a single substrate.

10. The imaging system of claim 7, wherein the metasurface defines a grating that is not spatially interlaced with any other gratings, and the grating is configured to provide the plurality of polarization orders.

11. The imaging system of claim 7, wherein the metasurface defines a grating, and the grating is configured to provide the plurality of polarization orders without cascading incident light through a plurality of gratings.

12. The imaging system of claim 7, wherein the metasurface is configured to receive incident light and to output the plurality of polarization orders without any moving parts.

13. The imaging system of claim 7, wherein the metasurface is configured to output light and analyze four different polarizations in parallel, wherein none of the four different polarizations are orthogonal to any of the others.

14. The imaging system of claim 7, wherein the one or more linearly birefringent elements comprise an array of dielectric pillars possessing form birefringence.

15. An imaging system, comprising:
a metasurface comprising one or more linearly birefringent elements;
a lens; and
an imaging sensor,
wherein the metasurface is configured to provide, to the imaging sensor, a plurality of polarization orders sufficient for the imaging sensor to determine a full-Stokes vector, and
wherein the plurality of polarization orders comprises six polarization orders corresponding to an octahedron inscribed in a Poincaré sphere.

* * * * *